(12) United States Patent
Nechitailo et al.

(10) Patent No.: US 6,922,515 B2
(45) Date of Patent: Jul. 26, 2005

(54) METHOD AND APPARATUS TO REDUCE VARIATION OF EXCESS FIBER LENGTH IN BUFFER TUBES OF FIBER OPTIC CABLES

(75) Inventors: Nicholas V. Nechitailo, Conover, NC (US); Dean J. Rattazzi, Hickory, NC (US); Matthew Soltis, Claremont, NC (US); Michael Rossi, Maiden, NC (US)

(73) Assignee: ALCATEL, Paris (FR)

( * ) Notice: Subject to any disclaimer, the term of this patent is extended or adjusted under 35 U.S.C. 154(b) by 181 days.

(21) Appl. No.: 09/973,015

(22) Filed: Oct. 10, 2001

(65) Prior Publication Data

US 2002/0145069 A1 Oct. 10, 2002

Related U.S. Application Data

(60) Provisional application No. 60/256,454, filed on Dec. 20, 2000.

(51) Int. Cl.[7] .................................................. G02B 6/00
(52) U.S. Cl. ...................................... 385/134; 242/176
(58) Field of Search .......................... 385/134; 156/179, 156/169; 242/174–178, 324, 327.1, 334, 476.2, 331.5, 159, 412.1; 264/1.25

(56) References Cited

U.S. PATENT DOCUMENTS

| | | | |
|---|---|---|---|
| 3,694,711 A | | 9/1972 | Bonikowski et al. |
| 3,792,826 A | | 2/1974 | Zebley |
| 3,800,196 A | | 3/1974 | Zimmermann |
| 3,910,521 A | | 10/1975 | O'Callaghan et al. |
| 3,989,578 A | | 11/1976 | Hashimoto |
| 4,096,010 A | | 6/1978 | Parham et al. |
| 4,445,649 A | | 5/1984 | Yataki et al. |
| 4,655,410 A | | 4/1987 | Ruffin et al. |
| 4,752,043 A | * | 6/1988 | Heinzer .................... 242/412.1 |
| 4,848,687 A | | 7/1989 | Myers et al. |
| 4,920,738 A | | 5/1990 | White et al. |
| 4,983,333 A | * | 1/1991 | Blew .......................... 264/1.25 |
| 5,029,960 A | * | 7/1991 | Hulderman et al. ......... 385/134 |
| 5,064,490 A | | 11/1991 | Chapin et al. |
| 5,181,270 A | * | 1/1993 | Hsu et al. .................... 385/134 |
| 5,186,781 A | * | 2/1993 | Verville ........................ 156/169 |
| 5,205,510 A | * | 4/1993 | Schotter ....................... 242/159 |
| 5,211,789 A | * | 5/1993 | Christian et al. ............ 156/169 |
| 5,220,632 A | * | 6/1993 | LoStracco .................... 385/134 |
| 5,593,101 A | | 1/1997 | Varga |
| 5,607,532 A | * | 3/1997 | LoStracco .................... 156/169 |
| 5,841,932 A | | 11/1998 | Page et al. |
| 5,967,454 A | | 10/1999 | Yarnell et al. |
| 5,988,556 A | | 11/1999 | Bednarczyk et al. |
| 6,024,319 A | | 2/2000 | Kawabata et al. |
| 6,066,275 A | | 5/2000 | Robinson et al. |
| 6,137,940 A | * | 10/2000 | Rageot ........................ 385/134 |
| 6,390,406 B1 | * | 5/2002 | Wood ........................... 242/443 |

* cited by examiner

*Primary Examiner*—Ellen E. Kim
(74) *Attorney, Agent, or Firm*—Sughrue Mion, PLLC

(57) ABSTRACT

The present invention provides a method for reducing and/or controlling the variations of excess fiber length along the length of reeled fiber optic buffer tubes during the manufacture of the buffer tubes. The present invention varies any number, or combination, of parameters during the manufacture of buffer tubes to achieve a substantially uniform excess fiber length along a reeled buffer tube. One embodiment of the inventive method uses monotonically decaying draw or take-up tension of the buffer tubes during winding, combined with a stiffness-compliant pad placed on the reel core to aid in providing a substantially uniform excess fiber length in the tube, while another embodiment uses a monotonically increasing angular speed of the reel in combination with the stiffness-compliant pad on the reel core. In yet another embodiment a pad is placed either periodically or continuously in the windings of the buffer tube to provide an absorbing layer for the residual stresses existing in the buffer tube as it is reeled and after the reeling is complete, combined with re-reeling the buffer tube onto a second reel after the buffer tube has cooled (after manufacture), where the pad is removed during the re-reeling process. Additionally, the present invention can have the layers of buffer tube separated with rigid, cylindrical panels separating the layers. The present inventive method also combines any, or all, of the above steps to aid in achieving a substantially uniform excess fiber length along the length of the reeled buffer tube.

78 Claims, 39 Drawing Sheets

Take-up Tension, MPa

Monotonically decaying take-up tension can be achieved using a bucket of water with a valve.

METHOD AND APPARATUS TO REDUCE VARIATION OF EXCESS FIBER LENGTH IN BUFFER TUBES OF FIBER OPTIC CABLES

This application claims benefit of U.S. Provisional Application No. 60/256,454 filed on Dec. 20, 2000, under the provisions of 35 USC 119(e).

BACKGROUND OF THE INVENTION

1. Field of the Invention

The present invention generally relates to the field of optical fibers, in particular to the manufacture of fiber optic buffer tubes having a substantially constant excess fiber length ("EFL") ratio throughout the length of the buffer tube.

2. Discussion of Related Art

Optical fibers are very small diameter glass strands which are capable of transmitting an optical signal over great distances, at high speeds, and with relatively low signal loss as compared to standard wire or cable (including wire cable) networks. The use of optical fibers in today's technology has developed into many widespread areas, such as: medicine, aviation, communications, etc. Most applications of optical fibers require the individual fibers to be placed into groupings, such as in fiber optic cables.

There are many ways to manufacture and configure fiber optic cables. One of the most common methods of manufacturing a fiber optic cable is by placing a number of fiber optic buffer tubes in a single cable jacket, where each of the buffer tubes is a separate tube having a number of individual optical fibers or optical fiber ribbons. The buffer tubes themselves are hollow tubes generally made from thermoplastic materials.

When a cable construction uses a number of buffer tubes, each containing a number of fibers, the quality of the finished cable greatly depends on the quality of the components it uses, in particular, the buffer tubes. The quality of the individual buffer tubes can be affected by a large number of factors, and the manufacture of the buffer tubes, with the fibers, is one of the most critical of these factors. A common method of manufacturing the buffer tubes is to draw the tubes with the fibers placed inside of the tubes. The buffer tube is then wrapped around a spool and left to cool at room temperature. During this process the tubes are reeled (in the drawing process) onto a hard or rigid spool (made of any sturdy material for example, wood or steel), and are drawn at a constant draw or take-up tension (on the tube itself) and with a constant angular velocity of the spool.

However, when reeling of the buffer tubes occurs with constant tensile draw on the tubes and constant angular speed of the spool the result is non-uniform distribution of residual stresses along the length of the buffer tube as it sits on the spool. In some cases, the non-uniform distribution of EFL remains after taking the tube off the spool and subsequently negatively affecting attenuation in the finished cable. The main components, or origins, of the non-uniform, along the tube length, residual deformation stem from (1) stresses along the reeled buffer tube axis (i.e. circumferential stresses) which is a function of the distance from the reel surface, i.e. current radius and (2) in a transverse direction (i.e. radial stresses) typically varying from zero on the roll surface to a maximum amount on the reel surface. It is noted that this problem not only exists in the fiber optic industry, but also in any other industry where the extended rolling of a product is required. For example, the same problems exist in the manufacture of paper, electrical cable, aluminum sheet, etc. Resulting from these non-uniform stresses on the spool is the permanent or residual deformation of the rolled material (i.e. buffer tubes) and the creation of residual strains in the tubes and the fibers within the tubes. The creation of residual strain in the fibers is a very serious problem in the manufacture of fiber optic cables and buffer tubes that causes variation of EFL along the length of the tubes and subsequently attenuation problems.

Excess Fiber Length ("EFL") is an important parameter affecting the quality and performance of a fiber optic cable. EFL is generally defined as a relative difference between the actual individual fiber length (defined as "$L_F$") and the length of the buffer tube from which the fiber came (defined as "$L_B$"), where the % EFL=$[(L_F-L_B)/L_B]\times 100$. EFL is important in the proper operation of a fiber optic cable. In general, it is desirable to have a small positive EFL. This means that the length of the fibers is larger than the length of the buffer tube in which the fibers are disposed. This added length allows delayed stretching of the buffer tube under a tensile load during installation or its use without adding any tensile loads on the fibers meaning that, to a certain level of tensile load, the load will be carried by the strength rods or tapes, and not involve the fibers. However, it is important that the EFL should not be too large and have a relatively even distribution throughout the length of the buffer tube. When the EFL distribution throughout the length of a tube is non-uniform it can adversely affect the operation and efficiency of the cable as a whole.

Through testing, it has been discovered that measurements of EFL in buffer tubes wrapped according to prior art methods results in buffer tubes which show an EFL distribution having a skewed parabolic shape. This is depicted in FIG. 1, which shows a graphical representation of a typical EFL distribution in a buffer tube wound under the prior art methodology. As shown, the EFL curve 1 is of a typical buffer tube length after manufacture. The left side of the graph indicates the EFL at the early stages of the tube manufacture (i.e. the beginning portion of the tube on the reel). The rapid or steep change in the left part of the EFL curve occurs in the tube length during the initial wraps of the tube on the reel. The remaining portion of the curve shows that the EFL peaks at some point near the center of the tube length and then tapers off near the end of the tube winding.

This is a significant problem with long buffer tubes (approximately 10 km in length) and having a relatively small core radius for the take-up reel (around 100 mm). When the parabolic variation becomes too large the fiber attenuation near the middle of the length of the cable can be significant, thus making the cable useless.

An additional problem of the prior art methods of manufacturing buffer tubes is the limiting effect on the line speeds of the manufacturing process due to the uneven EFL distributions. As line speeds increase the EFL distribution problems become more significant. Therefore, to avoid these problems, manufacturing speeds are limited so as to prevent significant EFL problems.

SUMMARY OF THE INVENTION

The present invention is directed to eliminating or greatly reducing the impact of the above problems by the use of prior art methods of manufacturing buffer tubes with optical fibers.

The present invention uses the variation of a number of different parameters or physical characteristics of the manufacturing process or equipment, either individually or in combination, to provide a substantially uniform EFL distribution along the entire length of a manufactured buffer tube.

In a first embodiment of the present invention, a pad having a compliant stiffness is placed on the core of the take-up reel prior to the winding of the manufactured buffer tube, and the take-up tension of the tube as it is being drawn is monotonically decayed according to a set function so as to ensure an even EFL distribution along the entire length of the buffer tube. Although it is contemplated that the present invention can provide an even EFL distribution without the use of a stiffness-compliant pad, it is to be used in the preferred embodiment to provide stress relief in the initial layers of the buffer tube, located closest to the core.

In a second embodiment of the present invention, a substantially even EFL distribution is accomplished by using a combination of the stiffness compliant pad on the core of the reel with varying the angular speed of the take-up spool during the spooling of the buffer tube. Similar to the first embodiment, the variation in the speed of the take-up spool combined with the stiffness-compliant pad is used to provide a substantially even stress and strain distribution throughout the length of the tube, thus resulting in a substantially even EFL distribution. As with the first embodiment, it is contemplated that only the variation in the angular speed of the take-up spool can be used to provide an even EFL distribution, but in the preferred embodiment the combination is to be used.

In a third embodiment of the present invention, stiffness-compliant pads are placed between layers of tube windings at intervals throughout the reeling of the buffer tube, as well as on the spool core. The use of these pads at intervals allow the excess stress and strain in the tubes and fibers to be absorbed in the pads. It is preferred, in this embodiment, that the use of the stiffness-compliant pads be combined with either varying the take-up tension or the angular speed of the spool, as discussed in the previous two embodiments. Further, in this embodiment, pads can be placed between each winding or at regular intervals in the tube winding. Additionally, this embodiment can be used with a stiffness-compliant pad on the reel core, as described above. It is preferred in this embodiment, that the tubes be re-reeled after the initial reeling step and the tube is allowed to cool to room temperature to aid in achieving a more uniform EFL distribution. The re-reeling step can be used with any of the above embodiments.

In the fourth embodiment, the layers are separated with rigid, preferably metal or composite cylindrical panels separating the layers and thus "breaking" up the stress compounding from upper layers. The panels can have slots to allow the tube to continue onto the next level.

It is to be noted that it is further contemplated that although the above embodiments can be used individually to obtain a substantially even EFL distribution, it is contemplated that any combination of the embodiments, or components thereof, can be used without altering the scope or spirit of the present invention. For instance, monotonically decaying the take-up tension may be combined with the varying of the angular spool speed and the use of stiffness-compliant pads or stiff cylindrical separators in the windings of the spool to achieve an even EFL distribution.

BRIEF DESCRIPTION OF THE DRAWINGS

The advantages, nature and various additional features of the invention will appear more fully upon consideration of the illustrative embodiments of the invention which are schematically set forth in the drawings, in which:

FIG. 5A-1 is a graphical representation of the distribution of circumferential stress for 10 and 50 buffer wrappings of a thick walled cylinder as shown in FIG. 4A, along the roll radius;

FIG. 5A-2 is a graphical representation of the distribution of radial stress for 10 and 50 buffer wrappings of a thick walled cylinder as shown in FIG. 4A, along the roll radius;

FIG. 5A-3 is a graphical representation of the distribution of circumferential and radial stress for 10 and 50 buffer wrappings of a thick walled cylinder as shown in FIG. 4A, along the roll radius;

FIG. 5B-1 is a graphical representation of the influence of maximum roll radius on the distribution of compressive stresses for a roll with 460 wraps; 2500 wraps and 5000 wraps;

FIG. 5B-2 is a graphical representation of the influence of maximum roll radius on the distribution of compressive stresses for a roll with 50000 wraps;

FIG. 6-1 is a graphical representation of the distribution of circumferential and radial strains for 10 wraps along the roll radius of a wrapped thick walled cylinder with a constant reeling take-up stress;

FIG. 6-2 is a graphical representation of the distribution of circumferential and radial strains for 50 wraps along the roll radius of a wrapped thick walled cylinder with a constant reeling take-up stress;

FIG. 6-3 is a graphical representation of the distribution of circumferential and radial strains for 460 wraps along the roll radius of a wrapped thick walled cylinder with a constant reeling take-up stress;

FIG. 7-1 is a graphical representation of EFL along the roll radius of a wrapped buffer tube for 10 wraps, and 460 wraps with a constant reeling take-up stress;

FIG. 7-2 is a graphical representation of EFL along the roll radius of a wrapped buffer tube for 2500 wraps with a constant reeling take-up stress;

FIG. 9A-1 is a graphical representation of circumferential stress distribution for 10 wraps along the roll radius using an analytical model;

FIG. 9A-2 is a graphical representation of radial stress distribution for 10 wraps along the roll radius using an analytical model;

FIG. 9A-3 is a graphical representation of the circumferential and radial stress distributions for 10 wraps along the roll radius using an analytical model;

FIG. 9B-1 is a graphical representation of the circumferential and radial stress distributions for 10 wraps along the roll radius using two different analytical models;

FIG. 9B-2 is a graphical representation of the circumferential and radial stress distributions for 2460 wraps along the roll radius using two different analytical models;

FIG. 9C-1 is a graphical representation of the circumferential and radial strain distributions for 10 wraps along the roll radius using two different analytical models;

FIG. 9C-2 is a graphical representation of the circumferential and radial strain distributions for 2460 wraps along the roll radius using two different analytical models;

DETAILED DESCRIPTION OF THE INVENTION

The present invention will be explained in further detail by making reference to the accompanying drawings, which do not limit the scope of the invention in any way.

In the development of the present invention, a significant amount of testing and experimentation was conducted. The goal of this research was to better understand the cause of the EFL parabola, and to find a means to control and flatten the EFL parabola through a "smart process". As a final goal, the EFL distribution along the length of buffer tube should be a small constant, preferably from approximately 0.05% to 0.15%.

Figure 3:
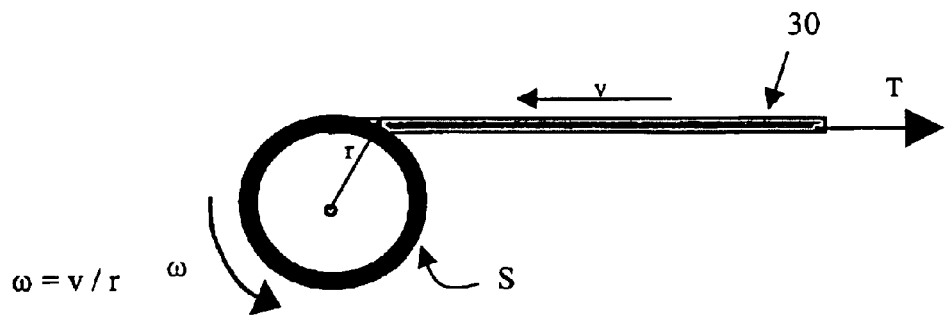
FIG. 3 is a diagrammatical representation of a buffer tube manufacturing apparatus.

In order to achieve the main research goal, it was necessary to model the winding process for buffer tubes (see FIG. 3 showing a buffer tube 30 under tensile force "T" reeled on a spool "S" that rotates at angular velocity "ω") and to analyze the stress distribution as a function of geometrical, process and material parameters. This was done using two main analytical tools, the first being analytical closed form solutions and the second being finite elements analysis, the results of which were then compared to experimental results. The goal of the analytical closed-form solutions was to obtain equations relating the variation in the EFL, strain and stress to the core radius, maximum radius of the roll, material properties and take-up tension. The goal of the finite element modeling was to better understand the influence of material parameters and the transient dynamic process (continual adding of stressed material to an already stressed deformed body), and to consider instability of motion and sliding of layers with friction.

Figure 2:
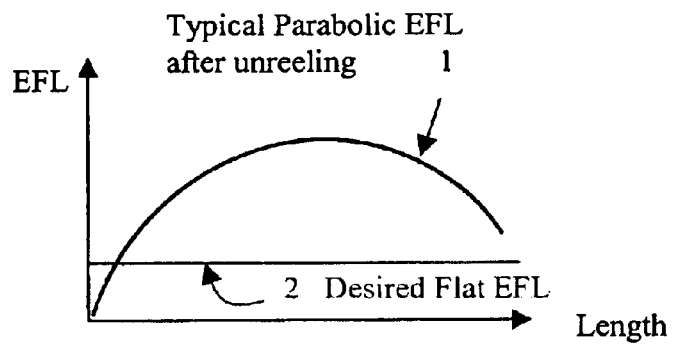
FIG. 2 is a graphical representation of the residual distribution of EFL along the length of a prior art buffer tube, along with a distribution of a buffer tube made in accordance with the present invention.

The desired outcome was to find a method and apparatus which allowed the manufacture of buffer tubes with relatively small EFL variation throughout the length. Such a distribution is shown in FIG. 2, where the distribution 2 is a substantially even EFL distribution, throughout the length, achieved by the present invention.

Based on preliminary analysis, it was suggested that the parabolic distribution of EFL was a result of the parabolic distribution in circumferential stress. Consequently, the solution to the problem of straightening the EFL parabola was determined to include straightening the circumferential stress curve.

In order to verify these assumptions, the research program included simplified analytical solutions, refined finite element models, and experiments to analyze the process of winding of buffer tubes. The contribution of major factors to the distribution of stresses in the wound material was analyzed. The first analytical model considered was a thick-walled cylinder under tensile stress. The second analytical model was based on the model of a shrunk ring; this model additionally took into consideration the difference between the stiffness of the wrapped material and that of the reel core. Also, the second analytical model allowed for the consideration of a variable winding tension, which according to the present invention, is one method used to create a substantially uniform EFL distribution.

The buffer tube roll geometry was characterized by initial radius, i.e. radius of the reel core, and the maximum radius of the roll. The maximum radius was expressed in terms of the number of wraps and thickness of the material (such as thickness of a tape or outer diameter of a buffer tube). The take-up tension was represented by a wrapping stress, which may or may not vary during the winding process. Considering the equations of equilibrium in terms of stresses provided a short and simple way to compute the stress distribution in the wound roll.

In order to compute the distribution of strains in the roll, additional equations relating stresses and strains through material properties were considered. The stresses and strains were related to each other through the equations of plane stress or plane strain.

In the computation of EFL, it was assumed that the fabrication process resulted in a close to constant value of $EFL_o$ (which is the EFL of the tube after the tube is manufactured but prior to the tube being reeled). This value, however, undergoes changes because of a non-uniform stress field in the structure on the reel. The optimization goal is to minimize the range of variation of EFL in the roll and to adjust the level of EFL to a small positive value, preferably about 0.10±0.05%.

In the first analytical model an analysis was accomplished on a isotropic thick-walled cylinder under tensile circumferential stress. Derivation of the equations of equilibrium in the stress form were developed which were similar to those disclosed in S. P. Timoshenko and J. N. Goodier, Theory of Elasticity, 3 rd edition, McGraw-Hill, 1970. Originally published in 1934. p 65–69, which is incorporated herein by reference. Computation results were presented for 10 and 50 layers of the tube showing the stress distribution in the roll. Equations relating stresses and strains were also presented for plane stress and plane strain models. Orthotropic and isotropic materials were considered. Computation results were also presented for the strain distribution, and the distribution of EFL.

Figure 4A:
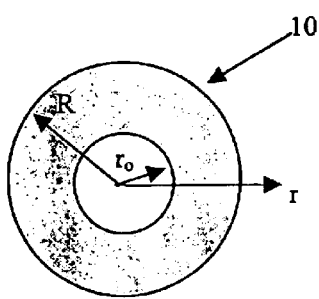
FIG. 4A is a diagrammatical representation of a thick walled cylinder used in an analytical model during the development of the present invention.
Figure 4B:
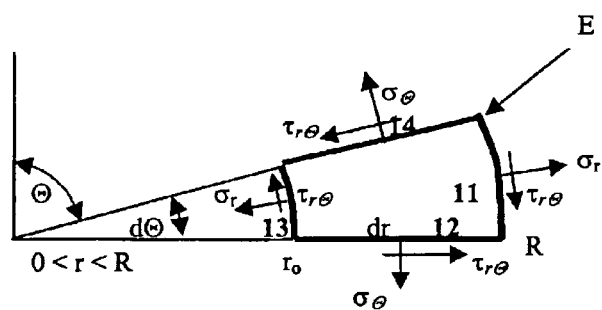
FIG. 4B is a diagrammatical representation of a single model element of the thick walled cylinder shown in FIG. 4A.
Figure 4C:
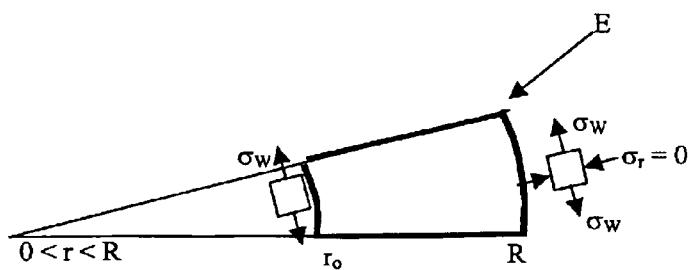
FIG. 4C is a diagrammatical representation of boundary conditions of the element shown in FIG. 4B.

The problem of stress distribution in a roll can be considered as an axisymmetric problem in the polar coordinate system. A typical model element of a thick walled cylinder 10, shown in a polar coordinate system, is shown in FIGS. 4A, 4B and 4C. In these Figures a element "E" of a thick-walled cylinder 10 is shown, where the element E has sides 11, 12, 13 and 14.

Timoshenko (1970) presented equations of equilibrium in the polar system of coordinates based on the equilibrium of a small element. This element is cut out of a ring or a cylinder by the radial sections normal to the plane of FIG. 4A and is shown by bold lines 11, 12, 13 and 14, in FIG. 4B. The normal stress in the circumferential direction is denoted by $\sigma_\Theta$, and the stress in the radial direction as $\sigma_r$. Components of shear stress are denoted by $\tau_{r\Theta}$. The radial force on the right side 11 of the element is equal to ($\sigma_r$ r d$\Theta$) and radial force on the left side 13 of the element is equal to ($-\sigma_r$ r d$\Theta$). The normal forces on the upper and lower perpendicular sides 14 and 12 are correspondingly ($-\sigma_\Theta$ dr d$\Theta$/2) and ($\sigma_\Theta$ dr d$\Theta$/2). The shearing forces on the upper and lower sides are $[(\tau_{r\Theta})_{12}-(\tau_{r\Theta})_{14}]$ dr.

Summing up forces in the radial direction, including the body force R per unit volume in the radial direction, produces the following equation:

$$(\sigma_r r)_{11} d\Theta - (\sigma_r r)_{13} d\Theta - (\sigma_\Theta)_{12} dr\, d\Theta/2 - (\sigma_\Theta)_{14} dr\, d\Theta/2 + [(\tau_{r\Theta})_{12} - (\tau_{r\Theta})_{14}] dr + R\, r\, dr\, d\Theta = 0;$$

Dividing by (dr d$\Theta$) results in:

$$\frac{(\sigma_r r)_{11} - (\sigma_r r)_{13}}{dr} - \frac{1}{2}[(\sigma_\Theta)_{12} + (\sigma_\Theta)_{14}] + \frac{(\tau_{r\Theta})_{12} - (\tau_{r\Theta})_{14}}{d\Theta} + Rr = 0.$$

When the element dimensions approach infinitesimally small values, the first and third term of this equation represent the first derivatives, while the second term is an average value of $\sigma_\Theta$. The equation of equilibrium in the tangential direction can be derived in the same manner. The two equations take the following final form:

$$\frac{\partial \sigma_r}{\partial r} + \frac{1}{r}\frac{\partial \tau_{r\Theta}}{\partial \Theta} + \frac{\sigma_r - \sigma_\Theta}{r} + R = 0 \tag{3.1}$$

$$\frac{1}{r}\frac{\partial \sigma_\Theta}{\partial \Theta} + \frac{\partial \tau_{r\Theta}}{\partial r} + \frac{2\tau_{r\Theta}}{r} + S = 0, \tag{3.2}$$

where S is the component of body force (per unit volume) in the tangential direction. When the body forces are equal to zero, equations 3.1 and 3.2 can be solved using the stress function, $\Phi$, that generally depends on radial coordinate, r, and angular coordinate, $\Theta$.

$$\sigma_\theta = \frac{\partial^2 \Phi}{\partial r^2}; \tag{3.3}$$

$$\sigma_r = \frac{1}{r}\frac{\partial \Phi}{\partial r} + \frac{1}{r^2}\frac{\partial^2 \Phi}{\partial \theta^2} \tag{3.4}$$

$$\tau_{\theta r} = \frac{1}{r}\frac{\partial \Phi}{\partial \theta} - \frac{1}{r}\frac{\partial^2 \Phi}{\partial r \partial \theta}. \tag{3.5}$$

The stress distribution in a roll can be considered as a function of radius only. Applying the condition of independence of the stress function from angular coordinate, $\Theta$, Equations 3.3–3.5 will change as follows:

$$\sigma_\theta = \frac{\partial^2 \Phi}{\partial r^2}; \tag{3.6}$$

$$\sigma_r = \frac{1}{r}\frac{\partial \Phi}{\partial r}; \tag{3.7}$$

$$\tau_{\theta r} = 0. \tag{3.8}$$

The form of stress function for this type of problem is suggested in Timoshenko (1970) to be:

$$\Phi = A\, Ln\, r + B\, r^2 Ln\, r + C\, r^2 + D, \tag{3.9}$$

where A, B, and C are unknown constants.

Substitution of Equation 3.9 into Equations 3.6 and 3.7 results in the following expressions for the stresses:

$$\sigma_\theta = -\frac{A}{r^2} + B(3 + 2Ln\, r) + 2C; \tag{3.10}$$

$$\sigma_r = \frac{A}{r^2} + B(1 + 2Ln\, r) + 2C. \tag{3.11}$$

In order to model stress conditions typical for reeled buffer tubes, the boundary conditions shown in FIG. 4C were considered. Three unknown constants can be found from the following three boundary conditions:

1. The first layer of tape was stretched at the constant wrapping stress, $\sigma_w$, and "glued" to the rigid core, meaning that during deformation the radius of the first layer will not change.

$$\sigma_\theta(r=r_o)=\sigma_w;$$

2. The outer layer is a layer of tape that is stretched at the constant wrapping stress, $\sigma_w$, and remains in the same stretched state, $$\sigma_\theta(r=R)=\sigma_w;$$

3. The outer surface of the tape has no additional normal or radial load (condition of free surface):

$$\sigma_r(r=R)=0.$$

The first boundary condition corresponds to the cases of glued tape and a rigid core. Compared to experiments, this boundary condition produces a higher level of circumferential stresses in the first layer. The second boundary condition represents the case of a stretched and fixed end. In the case when the upper layer is released after wrapping, which is typical for experiments, circumferential stresses on the outer layer drop to zero.

Application of the three boundary conditions to the system of Equations 3.10 and 3.11 results in the following solutions for the unknown constants:

$$A = \frac{R^2 r_o^2 \sigma_w Ln\frac{r_o}{R}}{R^2 - r_o^2 - 2r_o^2 Ln\frac{r_o}{R}}; \quad B = \frac{(R^2 - r_o^2)\sigma_w}{2\left(R^2 - r_o^2 - 2r_o^2 Ln\frac{r_o}{R}\right)};$$

$$C = -\sigma_w \frac{(R^2 - r_o^2)[1 + 2Ln(R)] + 2r_o^2 Ln\frac{r_o}{R}}{4\left(R^2 - r_o^2 - 2r_o^2 Ln\frac{r_o}{R}\right)}.$$

and subsequently the two stress components:

$$\sigma_\theta = \sigma_w \frac{(R^2 - r_o^2)\left(1 + Ln\frac{r}{R}\right) - \left(1 + \frac{R^2}{r^2}\right)r_o^2 Ln\frac{r_o}{R}}{R^2 - r_o^2 - 2r_o^2 Ln\frac{r_o}{R}}; \tag{3.12}$$

$$\sigma_r = \sigma_w \frac{(R^2 - r_o^2)Ln\frac{r}{R} - \left(1 - \frac{R^2}{r^2}\right)r_o^2 Ln\frac{r_o}{R}}{R^2 - r_o^2 - 2r_o^2 Ln\frac{r_o}{R}}. \tag{3.13}$$

As can be seen from Equations 3.12 and 3.13, stresses in the roll of material are linearly proportional to the wrapping stress. These stresses are a combination of logarithmic functions with respect to the roll radius, a hyperbolic function of $1/r^2$, and constants representing the core radius and outer radius of the roll.

Equations 3.12 and 3.13 were then employed to compute the stress distribution in the roll of tape wrapped at a constant tensile stress (or draw load) around a rigid core. The example below includes the following parameters: core radius 120 mm, outer radius of the roll 151.5 mm, representing 10 wraps of a 3 mm thick tape, and a constant wrapping stress of $1.38 \times 10^5$ kg/(mm s$^2$). The level of wrapping stress was chosen to be high in order to compare the solution with results of a finite element analysis. Young's modulus of the tape material is $1.637 \times 10^6$ kg/(mm s$^2$) and Poisson's ratio is 0.4.

Figure 1:
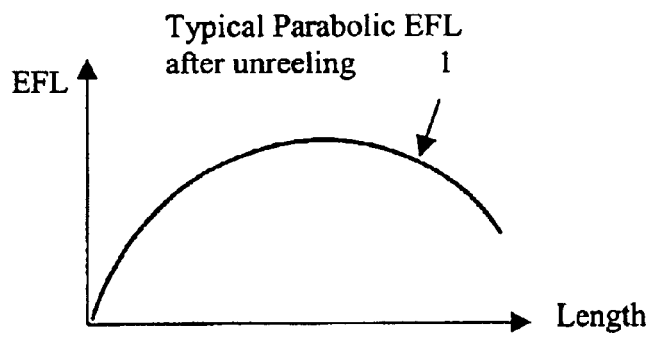
FIG. 1 is a graphical representation of a typical parabolic residual distribution of EFL along the length of a buffer tube.
Figures 1, 5A:
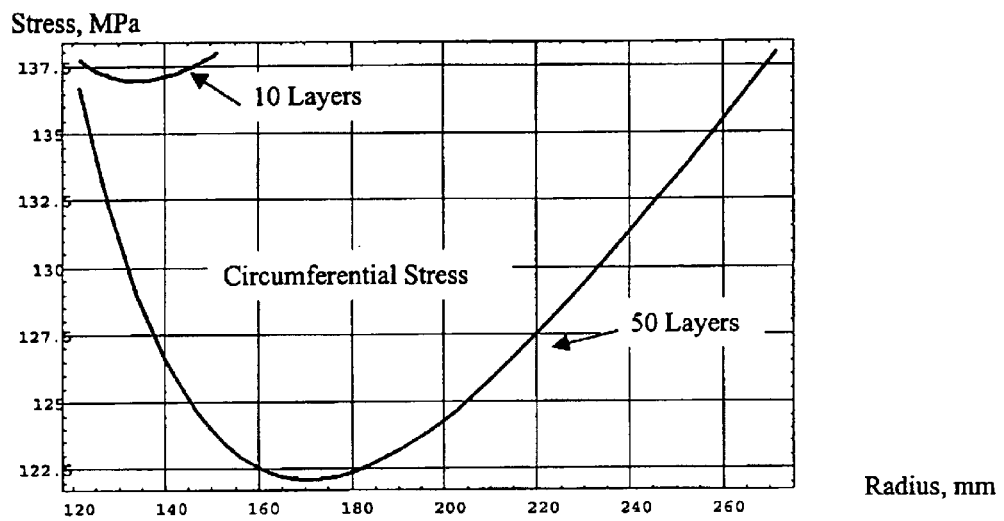
Figures 2, 5A:
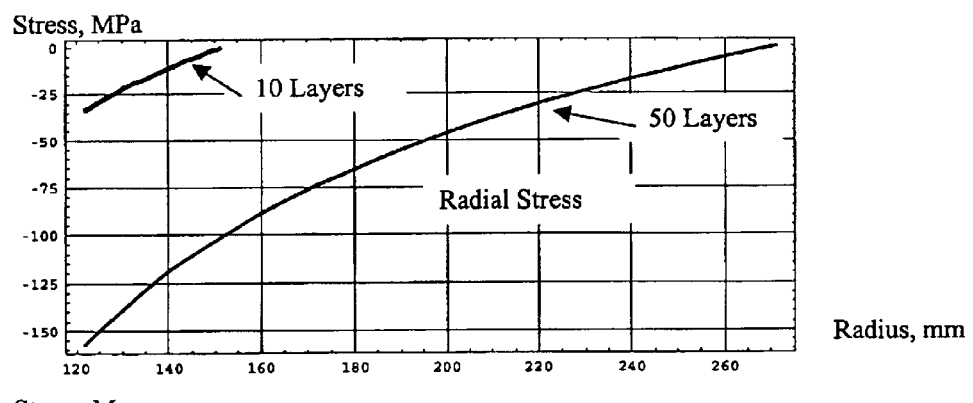
Figures 3, 5A:
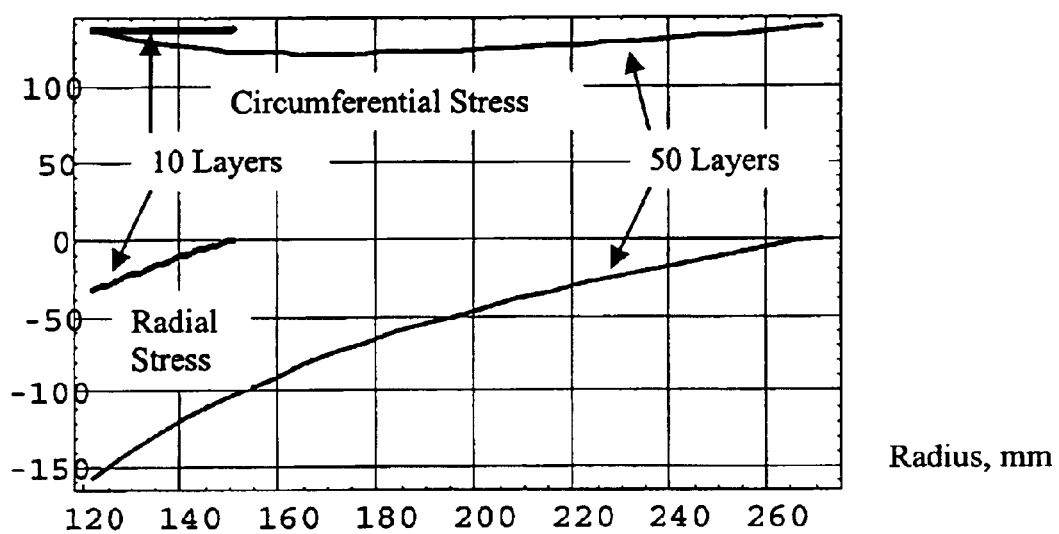
Figures 1, 5B:
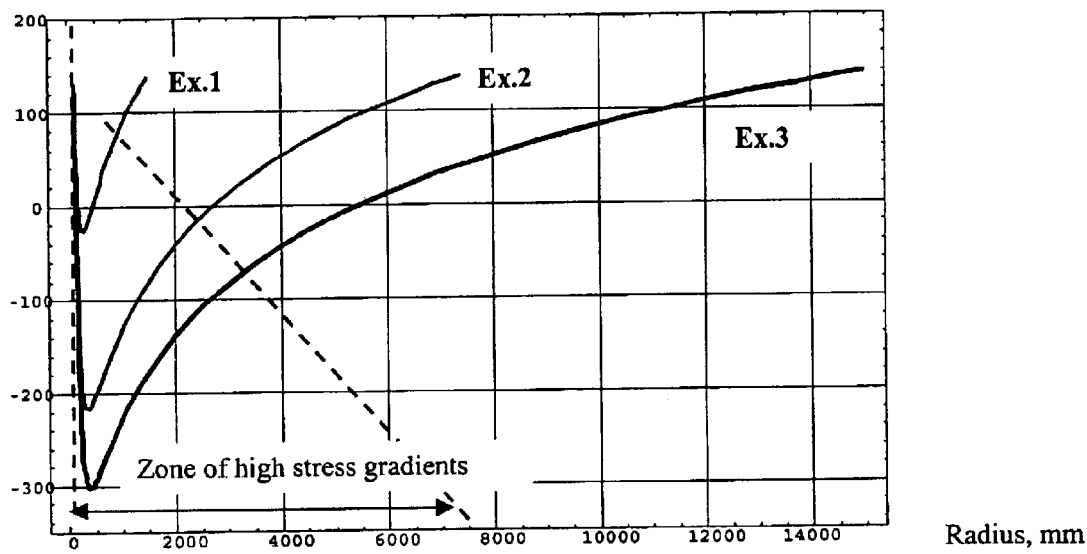
Figures 2, 5B:
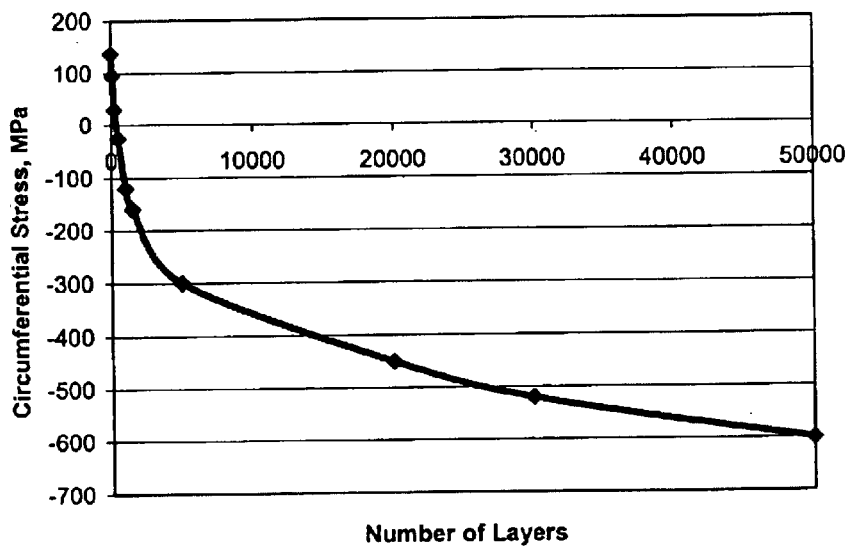

FIGS. 5A-1, -2 and -3 show the distribution of circumferential and radial stresses along the radius of the roll. The amplitude of circumferential stress (FIG. 5A-1) is higher than that of radial stress (FIG. 5B-2). The distribution of circumferential stress along the roll radius resembles a skewed parabola with the left and right ends at the values of wrapping stress prescribed as boundary conditions. When the first wrap is "glued" to a softer core, a certain reduction in circumferential stress in the first layers would occur. In the middle of the roll, reduction in circumferential stress occurs due to a superposition of initial tensile stress and compression from upper layers resulting in the shrinkage (radius reduction) of the layers. Similarly, if the upper layer is not held in the stretched state but released, the stress on the right end of the curve would also reduce. As a result, both ends of the tape would have lesser stress than the initial value, and the ends of the parabolic curve would move down producing a shallower curve. This outcome would be desirable in the fabrication process as a smaller variation in the stress curves result in lesser variations in the strains and most important, in EFL.

As can be seen from FIG. 5A-1, the "parabolic" circumferential stress curve for the 10-layer roll has depth of 0.72%, which is the difference between the maximum and minimum. For 50 layers, the depth of the circumferential stress parabola is 12.5%.

Comparison of the stress curves for 10 and 50 wraps indicated the following. For a smaller number of layers, the level of radial stress is smaller than that of circumferential stress. With the increase in the number of layers, the role of radial forces increases.

Calculations were also performed to evaluate changes in the circumferential stress curves when the radius of the reeled material is significantly increased. The calculations employed the first analytical model with constant core radius of 120 mm and wrapping stress of 138 MPa. Comparison of these curves (shown in FIGS. 5B-1 and -2) show that an increased number of layers produced stress curves with deeper minimums. The compressive stress for 460 wraps reached 20 MPa (Ex. 1), for 2500 wraps it was 220 MPa (Ex. 2), and for 5000 wraps (corresponds to a large roll with radius of 15 m) it was 300 MPa (Ex. 3). Additional computation with 50,000 wraps (corresponds to a roll with a very large radius of 150 m) showed a level of compressive stress of about 600 MPa (FIG. 5B-2).

These results suggest that during the reeling, the depth of the circumferential stress curve rapidly increases within the first 200–300 wraps. After the first 300 wraps, subsequent growth of the circumferential stress curve slows down (see FIGS. 5B-1 and -2). This indicates that the stress gradient and consequently rapid changes in EFL in the initial layers are higher than that in the outer layers.

From a practical point of view, this implies that very long buffer tubes (on the order of 1000 layers of tube per spool) can not be reeled using constant take-up tension on relatively small spools (core radius about 100 mm) without creating high stress gradients. These stress gradients would cause rapid changes in the EFL within the tube in a zone near the spool core that is approximately ⅓ of the total roll thickness. This implies that the roll should be multi-leveled with rigid interlayers to minimize the stress compounding effect. Also, this implies that special attention should be paid to the boundary conditions or physical characteristics at the reel core surface, which includes the stiffness of the reel core and the stiffness of compliant materials or soft pads on the core surface used in the present invention. In addition, the constant take-up tension should be replaced with a variable take-up tension, as contemplated by the present invention.

The next step taken was to equate the relationship between the stresses experienced by the roll with strains, which directly affect the EFL of a buffer tube. In order to compute the distribution of strains in the roll, equations are needed to relate stresses and strains through material parameters such as Young's modulus and Poisson's ratio. Typically, two major models are used; plane stress or plane strain.

Generally, for elastic orthotropic materials, the relationship between strains and stresses can be presented as follows:

$$\varepsilon_\theta = \frac{\sigma_\theta}{E_\theta} - \frac{v_{\theta r}\sigma_r}{E_r} - \frac{v_{z\theta}\sigma_z}{E_z}; \tag{3.14}$$

$$\varepsilon_r = \frac{\sigma_r}{E_r} - \frac{v_{r\theta}\sigma_\theta}{E_\theta} - \frac{v_{zr}\sigma_z}{E_z}; \tag{3.15}$$

$$\varepsilon_z = \frac{\sigma_z}{E_z} - \frac{v_{\theta z}\sigma_r}{E_\theta} - \frac{v_{rz}\sigma_r}{E_r}; \tag{3.16}$$

$$\tau_{\theta r} = \frac{\tau_{\theta z}}{G_{\theta z}}; \tau_{rz} = \frac{\tau_{rz}}{G_{rz}}; \tau_{zr} = \frac{\tau_{zr}}{G_{zr}}, \tag{3.17}$$

where $\epsilon_{74}$, $\epsilon_r$, and $\epsilon_z$ are strain components in the circumferential (tangential), radial, and normal to the roll cross section directions, respectively, and $\tau_{r\theta}$, $\tau_{\theta z}$, and $\tau_{rz}$ are components of shear strains.

In the plane stress model, component $\sigma_z = 0$ (in the direction perpendicular to the roll cross section or along the axis of winding). When shear strains are negligibly small compared to the normal strains, the system of Equations 3.14–3.17 can be reduced to the following two equations:

$$\varepsilon_\theta = \frac{\sigma_\theta}{E_\theta} - \frac{v_{\theta r}\sigma_r}{E_r}; \quad \varepsilon_r = \frac{\sigma_r}{E_r} - \frac{v_{r\theta}\sigma_\theta}{E_\theta}. \tag{3.18}$$

In the plane strain model, component $\epsilon_z = 0$ (in the direction perpendicular to the roll cross section or along the axis of winding). For an isotropic material the system of equations for plane strain can be presented in the following form:

$$\begin{Bmatrix} \varepsilon_\theta \\ \varepsilon_r \\ \varepsilon_z \end{Bmatrix} = \begin{bmatrix} \frac{1-v^2}{E} & \frac{-v(1+v)}{E} & 0 \\ \frac{-v(1+v)}{E} & \frac{1-v^2}{E} & 0 \\ 0 & 0 & 0 \end{bmatrix} \begin{Bmatrix} \sigma_\theta \\ \sigma_r \\ \sigma_z \end{Bmatrix}. \tag{3.19}$$

When shear strains are negligibly small compared to the normal strains, the system of Equations 3.19 can be reduced to the following two equations:

$$\varepsilon_\theta = \frac{1-v^2}{E}\sigma_\theta - \frac{v(1+v)}{E}\sigma_r \quad (3.20)$$

$$\varepsilon_r = \frac{1-v^2}{E}\sigma_r - \frac{v(1+v)}{E}\sigma_\theta. \quad (3.21)$$

As can be seen from Equations 3.20 and 3.21, Poisson's ratio plays a role of stress coupling. For low values of Poisson's ratio, $v \to 0$, coupling becomes weak and $$\varepsilon_\theta \to \frac{\sigma_\theta}{E}$$

and $$\varepsilon_r \to \frac{\sigma_r}{E},$$

which can be the case for buffer tubes.

Figures 1, 6:
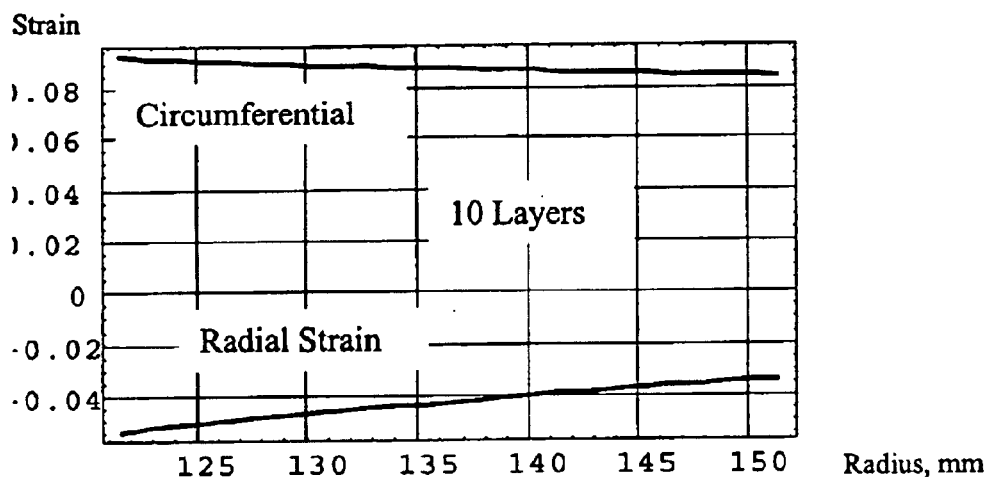
Figures 2, 6:
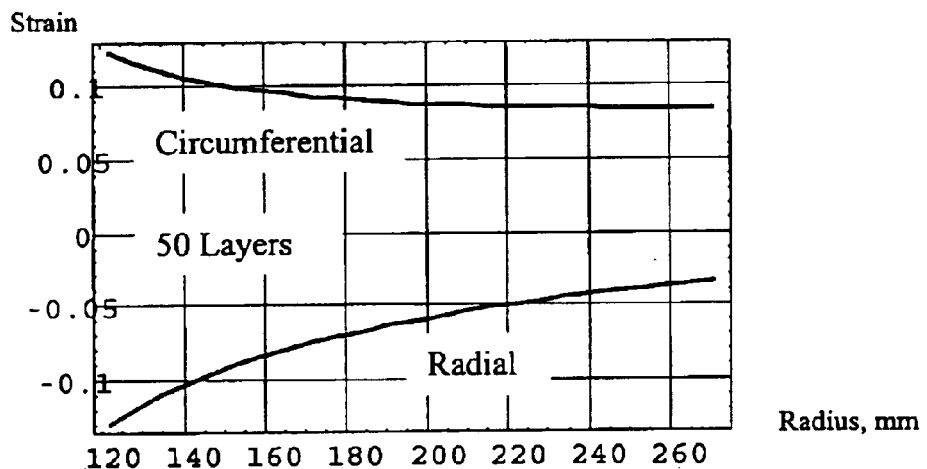
Figures 3, 6:
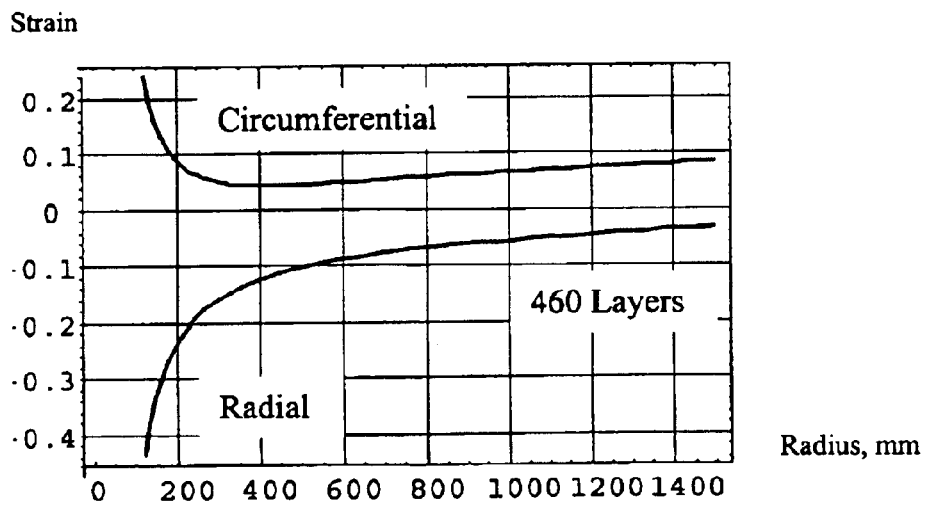

The computations of strains and EFL in the roll using the first analytical model with the plane stress model was accomplished. In this set of computations, Young's modulus of the tape material was $1.637 \times 10^3$ MPa and Poisson's ratio was 0.4. FIGS. 6-1, -2 and -3 depict the computed distribution of strains in the 10-layer roll of tape, which correspond to the stresses shown in FIGS. 5A-1, -2 and -3.

It can be seen that for 10 wraps both circumferential and radial strains are relatively small and circumferential strain monotonically decreases with an increase in radius (FIG. 6-1). For 50 wraps, the trend is similar, however, the level of strain is higher than that for 10 wraps. Also, the role of radial strain has increased compared to circumferential strain, especially in the first few layers (FIG. 6-2).

Additional computation revealed a parabolic upturn in the circumferential strain curve for 460 wraps (FIG. 6-3). The circumferential strain curve shows a monotonic increase in a major portion of the curve after approximately 100 layers. In the first few layers, the amplitude of radial strain is above the level of circumferential strain.

Figures 1, 7:
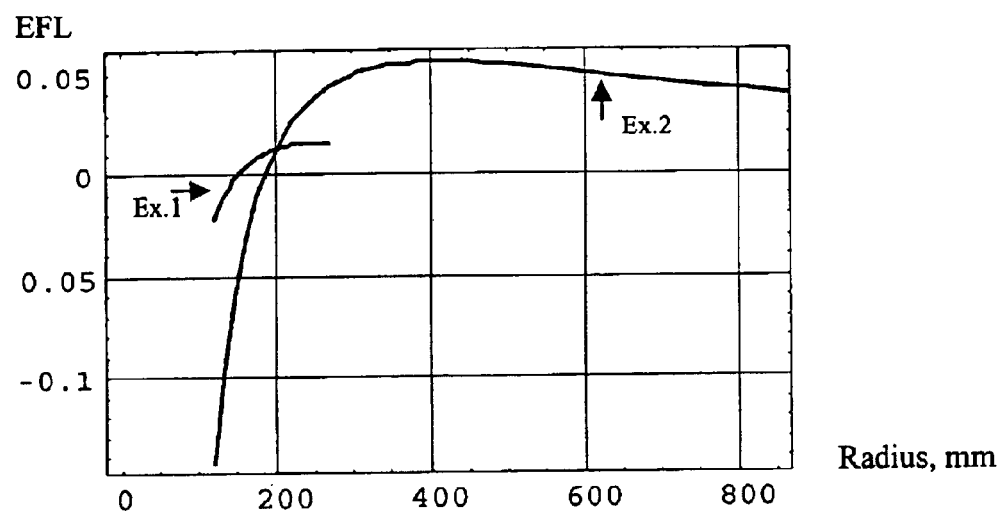
Figures 2, 7:
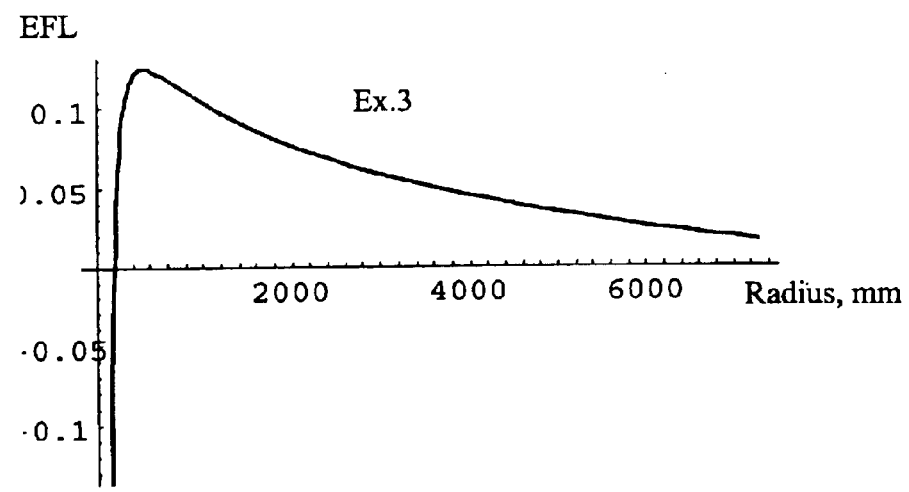

Assuming that the final distribution of EFL along the roll radius is a difference between the initial constant $EFL_o$ value before reeling, and the circumferential strain induced by reeling, one can obtain the EFL distribution shown in FIGS. 7-1 and -2. In these calculations, the initial constant value of $EFL_o$ was taken to be 0.1.

As can be seen from FIGS. 7-1 and -2 at a constant take up stress (i.e. draw tension), 10 layers produce a relatively small variation in the EFL distribution (Ex. 1). This variation significantly increases for 460 layers (Ex. 2). In both cases, the most dramatic change in EFL (curve Ex. 1) takes place in the zone close to the spool core. Computation for 2500 layers revealed enhanced sharpness in the EFL curvature at the spool core surface (FIG. 7-2).

To further investigate the relationship of stress and strain on EFL of reeled or wrapped buffer tubes, analysis under a second analytical model was also conducted. In this modeling variable wrapping stress and relative stiffness of the core of the reel and the wrapped material were analyzed to determine a method to obtain a relatively constant EFL throughout the length of a reeled buffer tube. In this analysis, an existing model was modified for constant and monotonically decaying take-up tension.

In Wolfermann, W. and Schröder D. (1987), "Web Forces and Internal Tensions for the Winding of an Elastic Web," *International Conf. "Winding Technology* 1987", Stockholm, Sweden, 1987, S. 25–37, which is incorporated herein by reference, the stress distribution in rolled materials based on the model of a circular ring that is shrunk by a winding tension, $\sigma_w$, was analyzed. The influence of a controlled variation of winding tension on the stress distribution was also investigated. For anisotropic materials, equations for circumferential and radial stresses were presented in the following form:

$$\sigma_\theta = \sigma_w - \left[\delta + \gamma\beta\left(\frac{r}{r_o}\right)^{2\kappa}\right]\Delta\sigma; \quad (4.1)$$

$$\sigma_r = \left[\beta\left(\frac{r}{r_o}\right)^{2\kappa} - 1\right]\Delta\sigma. \quad (4.2)$$

where $$\Delta\sigma = \frac{1}{r^{\delta+1}}\int_{r_o}^{R}\frac{\sigma_w r^\delta}{\beta\left(\frac{r}{r_o}\right)^{2\kappa} - 1}dr,$$

parameters $\gamma$, $\delta$ and $\kappa$ represent anisotropic properties of the wrapped material, and $\beta$ is the parameter relating stiffness of the wrapped material to that of the core.

When Young's modulus of the core material is much higher than that of the wrapped material, $\beta \approx -1$, and can be as low as $-2$ for very stiff core materials. This range of values for $\beta$ was considered by Wolferman and Schroder to model the stress distribution in paper rolled on a steel core. For the case of paper rolled on a paper roll, the authors suggested $\beta=2$. According to Wolferman and Schroder, radially shrinking layers influence the circumferential stresses in the middle part of the roll resulting in compressive circumferential stresses, with the largest compressive stresses achieved when $\beta=2$. Thus, it was recommended to use cores made of hard materials. Also, the authors recommended use of a two-stage function for wrapping stress to reduce the range of the stress variation. Initially, wrapping should be performed under a constant high level of wrapping stress. After a certain number of wraps, the wrapping stress should be monotonically reduced as shown in the figure below:

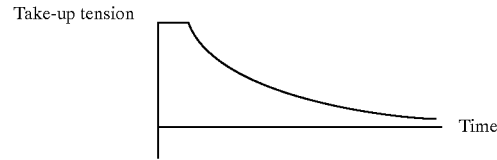

Two-stage Variable Take-up Tension from Wolfermann and Schroder.

For isotropic materials, $\gamma=\delta=\kappa=1$ and Equations 4.1 and 4.2 can be simplified to $$\sigma_\theta = \sigma_w - \frac{r_o^2 + \beta r^2}{r^2}\int_{r_o}^{R}\frac{\sigma_w r}{\beta r^2 - r_o^2}dr, \quad (4.3)$$

$$\sigma_r = \frac{r_o^2 + \beta r^2}{r^2}\int_{r_o}^{R}\frac{\sigma_w r}{\beta r^2 - r_o^2}dr. \quad (4.4)$$

Figure 8:
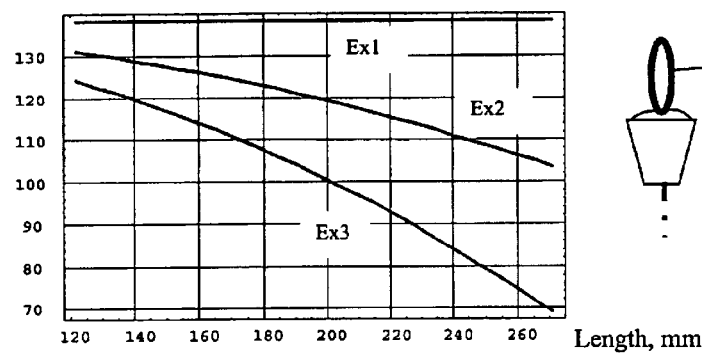
FIG. 8 is a graphical representation of a parabolic decay in tensile take-up stress at a constant tensile load, a slowly decaying tensile load and a rapidly decaying tensile load.
Figure 8:
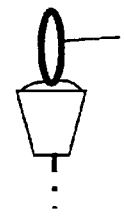

Several candidate functions were considered, mainly from a family of smooth functions for the radius-dependent take-up stress $\sigma_w$. Linearly decaying functions for $\sigma_w$ produced complicated integral expressions for which closed-form solutions were not obtained. In contrast, monotonically decaying take-up stress in the parabolic form produced a relatively simple integral expression. This type of parabolic function is shown below:

$$\sigma_w = \sigma_{wo}\left(1 - \frac{\alpha r^2}{2R^2}\right), \quad (4.5)$$

where the parameter $\sigma_{wo}$ is the initial value of take-up stress, and $\alpha$ defines the decay rate; $\alpha=0$ for constant take-up tension, small values of $\alpha$ for slow decay, and larger values of $\alpha$ for rapid decay. FIG. 8 depicts these three cases of decay rate. It is noted that monotonically decaying take-up tension can be achieved by, or is substantially equivalent to, using a bucket of water with a valve for the slow release of the water over time, thus decreasing the tension load over time.

For the family of take-up stress functions with parabolic decay, circumferential and radial stress components were found by substitution of Equation 4.5 into Equations 4.3 and 4.4:

$$\sigma_\theta = \sigma_{wo} \quad (4.5)$$
$$\left\{1 - \frac{\alpha r^2}{2R^2} + \frac{r_o^2 - \beta r^2}{(2\beta r R)^2}\left[\alpha\beta(r^2 - R^2) + (2\beta R^2 - \alpha r_o^2)Ln\frac{\beta R^2 - r_o^2}{\beta r^2 - r_o^2}\right]\right\},$$

$$\sigma_r = \sigma_{wo}\frac{r_o^2 - \beta r^2}{(2\beta r R)^2}\left[\alpha\beta(r^2 - R^2) + (2\beta R^2 - \alpha r_o^2)Ln\frac{\beta R^2 - r_o^2}{\beta r^2 - r_o^2}\right]. \quad (4.6)$$

In the case of constant take-up tensile stress, when $\alpha=0$, $$\sigma_\theta = \sigma_{wo}\frac{3\beta r^2 - r_o^2}{2\beta r^2}Ln\frac{\beta R^2 - r_o^2}{\beta r^2 - r_o^2} \text{ and} \quad (4.7)$$

$$\sigma_r = \sigma_{wo}\frac{r_o^2 - \beta r^2}{2\beta r^2}Ln\frac{\beta R^2 - r_o^2}{\beta r^2 - r_o^2}.$$

Computations were made using the Mathematica® software and involved complex numbers, $$Ln\frac{\beta R^2 - r_o^2}{\beta r^2 - r_o^2} \rightarrow = A + iB$$

and stresses appeared to be expressed as follows: $\{\sigma_{74}, \sigma_r\}=$ Function$\{D + iG\}$, where D and G are constants, and G is a negligibly small number. Thus, final expressions for stress components contained real numbers only.

Figures 1, 9A:
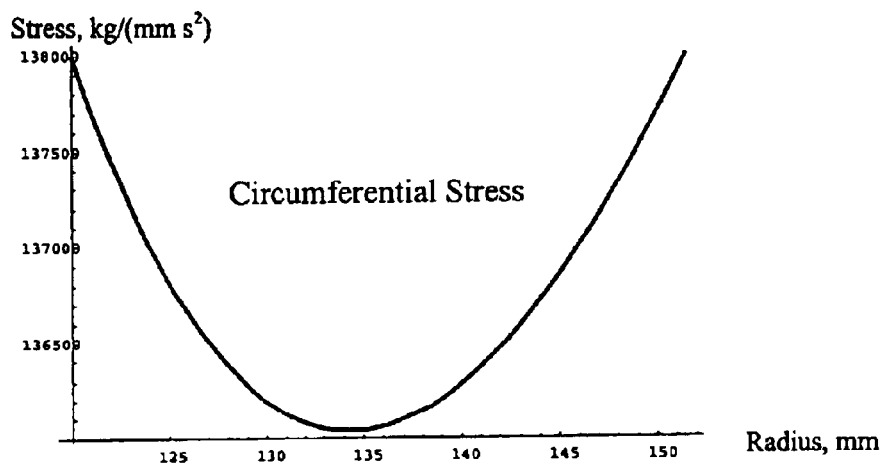
Figures 2, 9A:
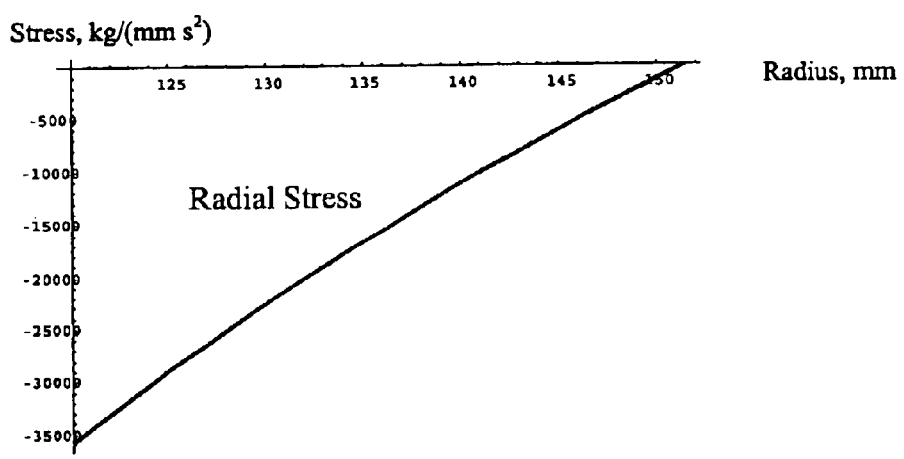
Figures 3, 9A:
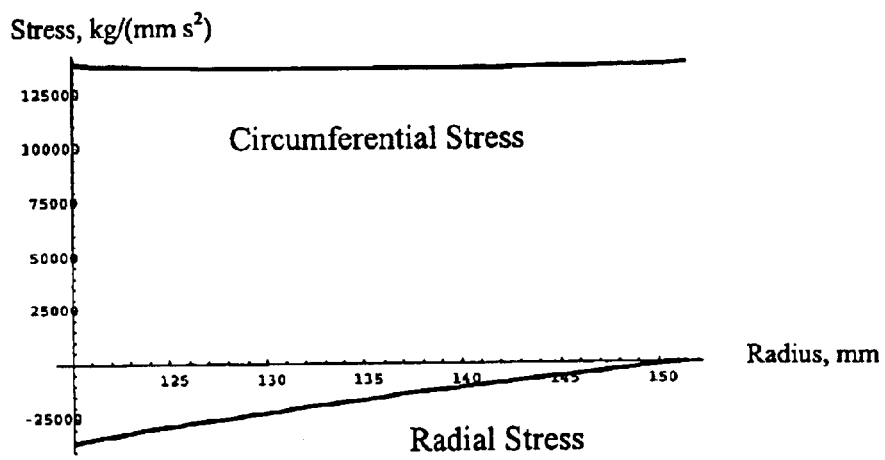

Equations 4.7 were applied to the following case: core radius is 120 mm, outer radius of the roll is 151.5 mm, and constant wrapping stress is $1.38 \times 10^5$ kg/(mm s$^2$). Young's modulus of the tape material is $1.637 \times 10^6$ kg/(mm s$^2$) and Poisson's ratio is 0.4. FIGS. 9A-1, -2 and -3 show the distribution of the stresses in the roll obtained by using the second model with a rigid core; i.e. $\beta=-1$.

Figures 1, 9B:
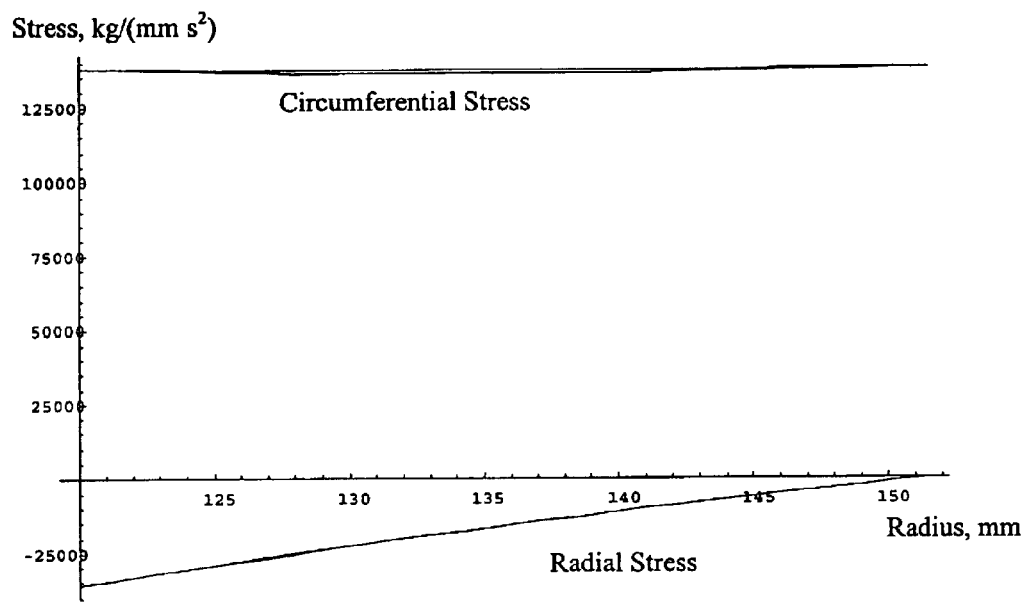
Figures 2, 9B:
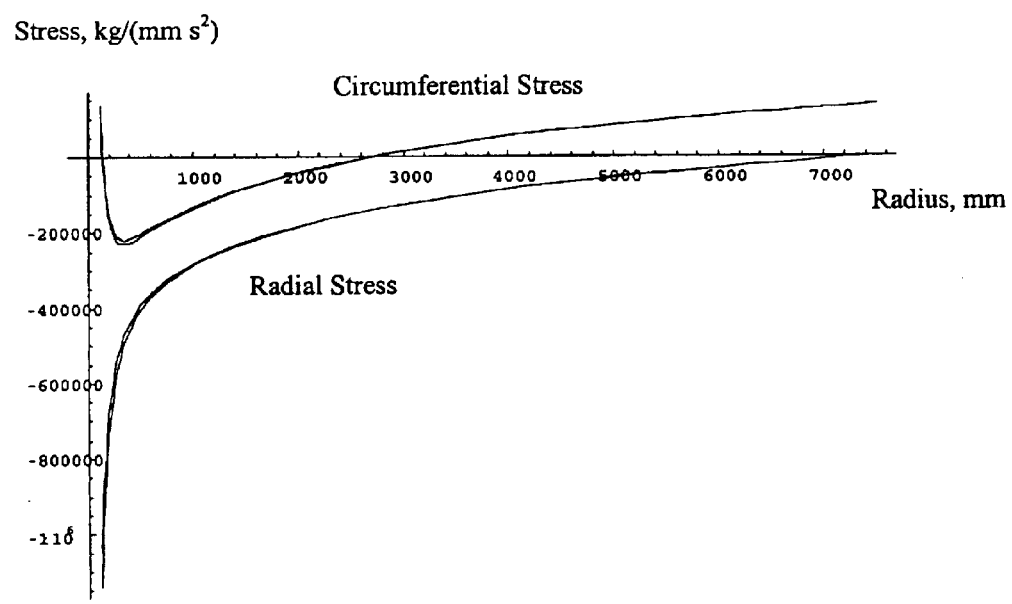

A comparison of the stress distribution computed using the first analytical model (a cylinder with tensile stresses) and the second analytical model (a shrunk ring) is shown in FIGS. 9B-1 and -2 for 10 (FIG. 9B-1) and 2460 layers (FIG. 9B-2). Curves for radial stresses almost coincide while the curves for circumferential stresses are very close to each other. The first model produced a curve with a parabolic shape and is located up to 0.7% above that obtained by using the second analytical model with $\beta=-1$. Additional computation for $\beta=-2$, which represents a very rigid core, showed a difference in circumferential stresses up to 4.4% between the first and the second models with the maximum difference occurring near the core at $r=r_o$. A small difference in the radial stresses was also found at the beginning of the roll.

Figures 1, 9C:
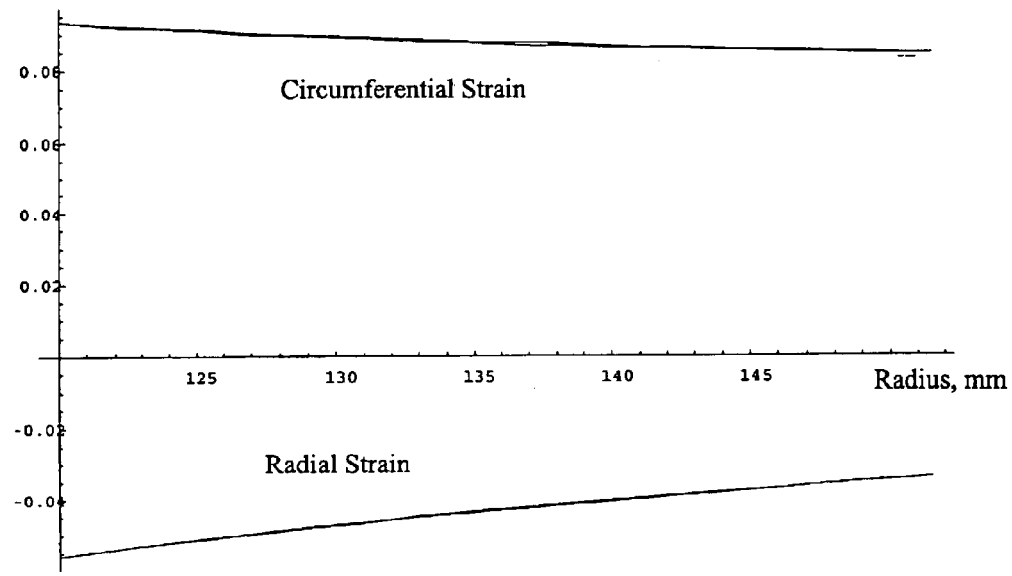
Figures 2, 9C:
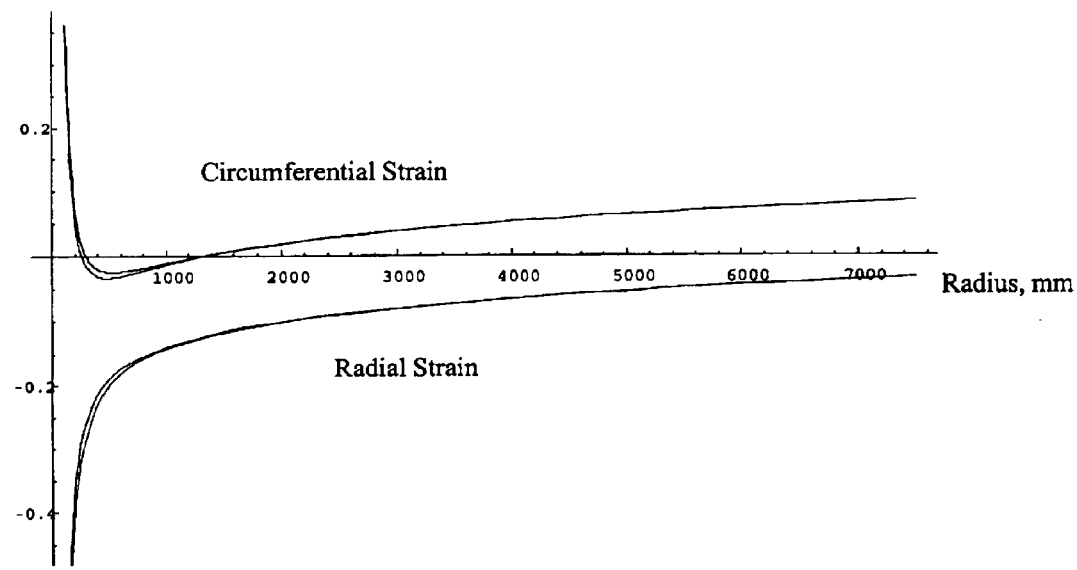

FIGS. 9C-1 and -2 show a comparison of the strain distribution obtained from the first and second models for 10 (FIG. 9C-1) and 2460 (FIG. 9C-2) layers of material using plane stress equations. As can be seen the curves obtained from the two models are very similar.

In conducting the above research it was needed to identify EFL as a function of several main parameters representing geometry, materials, and processing. During the research it was found that EFL is sensitive to the following parameters and factors:

Roll geometry—initial and final radius, $r_o < r < R$;

Stiffness of the reel core compared to that of buffer tube, $\beta$;

Young's modulus representing buffer tube material that depends on time and temperature, $E(t, T)$;

Poisson's ratio, $\nu$;

Initial level of EFL, before reeling; and

Take-up stress function, including amplitude and decay rate $\alpha$.

The EFL on the reel can be computed based on the value of $EFL_o$ before reeling and strain in circumferential direction as:

$$EFL = EFL_o - \epsilon_\theta \quad (4.8)$$

that is:

$$EFL = EFL_o - \quad (4.9)$$
$$\frac{\sigma_{wo}}{E(t, T^o)}\frac{(1+\nu)}{4}\left\{\left[(1-2\nu) + \frac{r_o^2}{\beta r^2}\right]\left(\frac{\alpha r_o^2}{\beta R^2} - 2\right)Ln\frac{\beta R^2 - r_o^2}{\beta r^2 - r_o^2} + \right.$$
$$\left. (4\nu - 3)\frac{\alpha r_o^2}{R^2} + \left(\frac{1}{r^2} - \frac{1}{R^2}\right)\frac{\alpha r_o^2}{\beta} + \alpha(1-2\nu) - 4(1-\nu)\right\}$$

or $$EFL = EFL_o + \frac{\sigma_{wo}(1-\nu^2)}{E(t, T^o)} - \quad (4.10)$$
$$\frac{\sigma_{wo}}{E(t, T^o)}\frac{(1+\nu)}{4}\left\{\left[(1-2\nu) + \frac{r_o^2}{\beta r^2}\right]\left(\frac{\alpha r_o^2}{\beta R^2} - 2\right)Ln\frac{\beta R^2 - r_o^2}{\beta r^2 - r_o^2} + \right.$$
$$\left. (4\nu - 3)\frac{\alpha r_o^2}{R^2} + \left(\frac{1}{r^2} - \frac{1}{R^2}\right)\frac{\alpha r_o^2}{\beta} + \alpha(1-2\nu)\right\}.$$

As can be seen from equations 4.8 and 4.9, EFL can be considered as a difference between the initial EFL (before reeling) and a strain on the reel. Also, the strain on the reel is a product of the initial tensile strain (initial stress divided by time- and temperature-dependent modulus of elasticity), shown as the term underlined in a solid line, and a reeling function, shown as the term underlined in a dashed line. These quantities depend on the Young's modulus, Poisson's ratio, relative stiffness of the buffer tube and reel core, and decay rate in the take-up tension. Poisson's ratio represents the degree of coupling between the circumferential and radial stresses. The expression for EFL can be rearranged, according to Equation 4.10, to show the contribution from the bending stiffness per unit area or unit thickness, $E/(1-\nu^2)$, and the stretching stiffness that is proportional to Young's modulus.

Several experiments revealed that when subjected to constant tension, thermoplastic materials exhibit a monotonic reduction in the Young's modulus apparently due to reorientation of molecular chains. For thermoplastic buffer tube materials, the reduction in the Young's modulus was as large as two times. Numerical computations performed using Mathematica®, and Equation 4.10 revealed that the depth of the EFL "parabola" increases with a decrease in Young's modulus.

The time factor and long-term stretching of buffer tubes influence not only Young's modulus, but also creep and shrinkage behavior of the tubes. For high line speeds, buffer tubes are subjected to tension (before the reeling stage) for a shorter duration. Consequently, elongation of thermoplastic materials are smaller than that for lower line speeds. As a result, the EFL obtained for high-speed lines are above that obtained for lower-speed lines.

Typically, an increase in the line speed is associated with a shorter time to cool the buffer tube in the cooling system 381 (because the tube T is passing through a cooling apparatus 381 quicker). See FIG. 38. Consequently there is an increased temperature of the reeled buffer tube after manufacture that in turn results in residual shrinkage in addition to that caused by the other residual forces experience while on the reel and during reeling. However, elongation of the reeled material under existing residual tension (circumferential stress) is generally more significant than the shrinkage of thermoplastic materials while cooling. The action of circumferential stresses can be related to the creep of thermoplastic materials. Reeled material under circumferential stress can undergo a certain amount of elongation, thus reducing the level of stresses. To some extent, a longer amount of time on the reel produces lower EFL. Consequently, creep as a function of the time spent on the reel can also be used with the present invention to adjust (reduce) EFL to the desired level.

Also, as discovered in a second embodiment of the present invention, variations in the line speed and the corresponding variation in angular velocity ("ω") of the reel produce a variation in temperature and tensile load through the radius of the buffer tube roll. In this embodiment, a monotonically variable angular velocity of the spool is used to control the stress state in the buffer tubes, and subsequently the EFL distribution. It should be noted that it is preferred to use the monotonically variable angular velocity of the spool of this embodiment with a stiffness-compliant pad on the reel core to achieve a substantially even EFL distribution. This will be discussed in more detail below.

Figure 10:
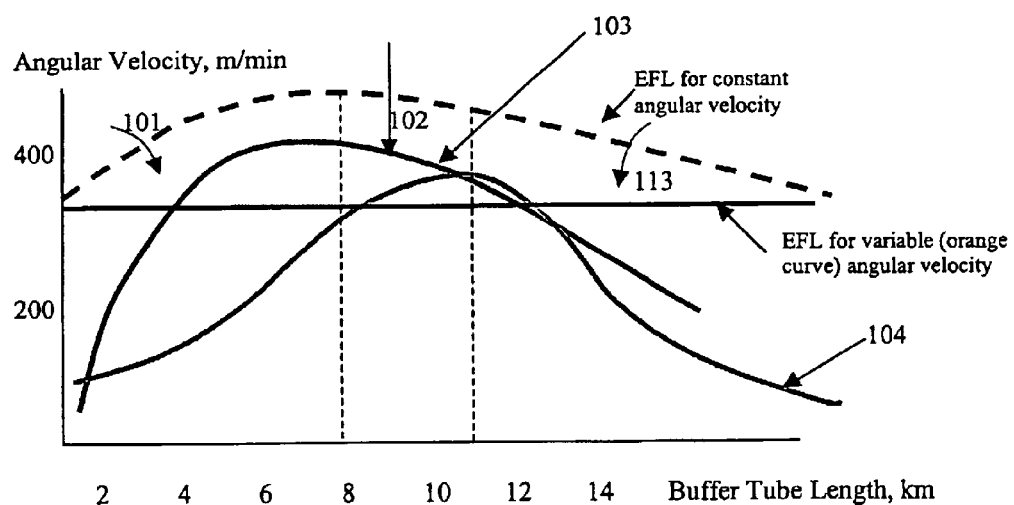
FIG. 10 is a graphical representation of proposed variable angular velocities to control the EFL distribution in rolls of buffer tubes on soft and rigid spool cores.

Examples of two possible monotonically variable curves for the angular speed of the spool are shown in FIG. 10. The curves shown 103 and 104 represent two out of many possible monotonically variable curves for angular velocity. It is noted that the exact shape of the monotonically variable curves will depend on several factors including material properties of the reeled material and spool, additional variation in take-up tension, and stiffness of pad(s) used, and is to be adjusted for each individual manufacturing line. For a typical case of a regular rigid (steel) spool core, the curve 104 in FIG. 10 is proposed (but any similar curve may be used), while if a pad is used on the spool the curve 103 is proposed. Initially, the angular velocity of the spool monotonically increases. This increase produces monotonically increased take-up tension. As a result, the buffer tube elongates, from a small level at the beginning of the tube to a higher level, causing corresponding changes in the EFL levels, from higher to lower. Because of this, the left side of initial EFL parabola (dashed curve representing an EFL for constant velocity spooling) turns down as shown by arrow 101.

Further, in the preferred embodiment, the ramping rate of angular velocity of the reel, or spool, slows down to produce smaller take-up tension and to increase the EFL. This is shown in FIG. 10 by arrow 102. This slow-down step is especially important for the middle part of the roll. Continuous slow down to the end of the buffer tube will provide a monotonically reduced tension and a flattened EFL curve as shown in FIG. 10 by arrow 113 which indicates flattening of the EFL curve.

It is anticipated that some deformations of thermoplastic materials are reversible (elastic) while the others are permanent (plastic). That is why the direct comparison of the EFL in the reeled material remaining on the spool to that unreeled is not always accurate. The EFL after reeling can be computed based on the value of EFL before reeling and plastic or residual strain, $\epsilon_\theta^p$, in the circumferential direction:

$$EFL_{Final} = EFL - \epsilon_\theta^p. \quad (4.11)$$

Figure 11:
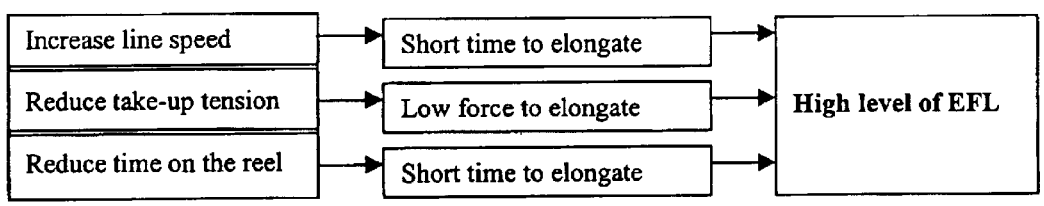
FIG. 11 is a diagrammatical representation of the relationship between Tensile Stress, Shrinkage, Time on the Reel and Creep of a buffer tube.

The changes in microstructural properties and associated elongations leading to changes in EFL are summarized in FIG. 11, which shows a relationship between tensile stress, shrinkage, time on reel and creep and how they may increase EFL of a buffer tube.

In the present invention, an expression for the decay parameter can be derived from Equation 4.10. As a practical approach, several cases with variable α should be considered to determine through iteration when the EFL is close to a desired constant level. The exact application of this formula would vary with relation to manufacturing facility and parameters, and should be optimized for each individual calculation to ensure that the desired level of EFL is maintained.

Figure 12:
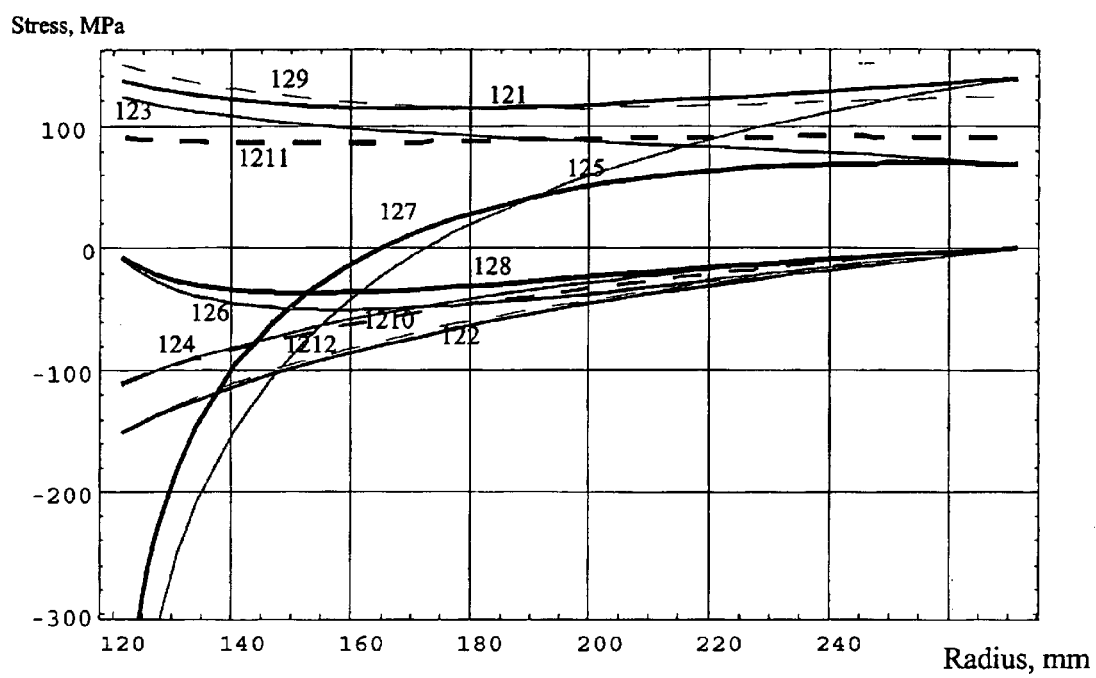
FIG. 12 is a graphical representation of shapes of circumferential and radial stresses as compared to roll radius with varying parameters.

An example of this is demonstrated in FIG. 12. In this Figure, a number of examples are shown, where the tension decay rate was varied for four typical cases of reel core stiffness. Odd numbered curves in FIG. 12 correspond to circumferential stress. The goal was to obtain a constant-value distribution of circumferential stress. Curves 121, 123, 125, 127, 129 and 1211 show a sequence of the variable core stiffness, from "regular" rigid (121 and 123) to soft core (125 and 127), then to a rigid core with a thin soft pad (curve 129) and finally, a core with increased stiffness (curve 1211). Numerical experiments revealed that the distribution of circumferential stress is very sensitive to the core stiffness and the decay rate in tension. The even number curves represent radial stresses as compared to roll radius.

Figure 13:
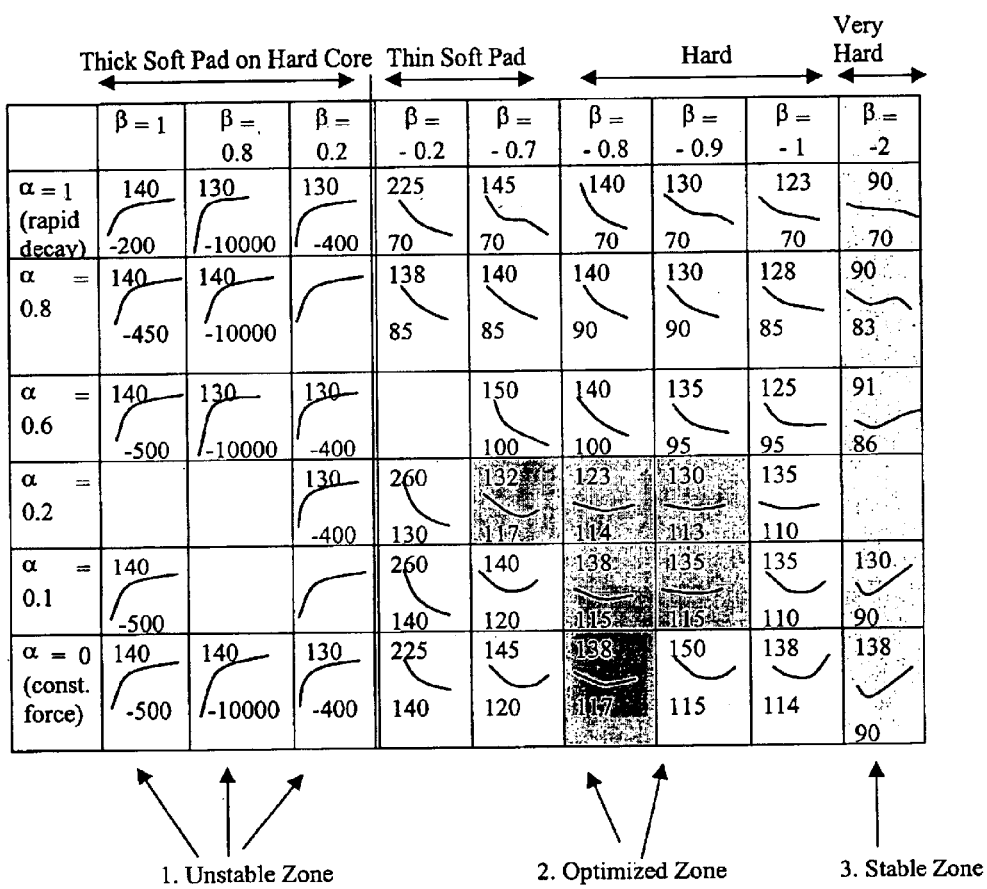
FIG. 13 is a tabular representation of shapes of circumferential stress curves as a function of the parameters $\alpha$ (Decay in the Take-up Stress) and $\beta$ (Core or Pad-on-the-core Stiffness)

FIG. 13 presents a wider variety of computed cases with different relative core stiffness and decay rates of take-up tension. The numbers in the Figure represent minimum and maximum levels of circumferential stress. The shapes of the curves in FIG. 13 show periodicity in the stress distribution and suggest how to control the stiffness of the core and take-up tension in order to achieve constant circumferential stress in the roll and subsequently, constant values of EFL. In particular, computations for α=0.6 and β=−1.2 produce a variation in the circumferential stress in the range from 92 to 96 MPa; i.e. within ±2.5%.

Analysis of the distribution of circumferential stress suggests that there are three major zones. The first one is a zone of unstable solutions (or unstable behavior) in the stress distribution when the parameter β is positive. For different rates of decay in take-up load, the curves show a sharp transition to lower (compressive) stresses at the core surface. This may or may not be attributed to the properties of the logarithmic functions alone. The second zone corresponds to negative values of the parameter β, in the range from −1 to 0. In most cases, the region near the core surface exhibits a higher level of circumferential stresses. The curves for circumferential stress decay from the point on the reel core to the outer layer, often forming a minimum in the middle part of the roll. Variation between the maximum and minimum values in this zone is smaller than that in the first zone. Also, this variation seems to be minimal for β close to −0.8 and small values of α (gray zone in the table). The third zone corresponds to a spool core with increased stiffness; i.e. β=−2. Several stress curve shapes are possible in this zone, generally with a small variation between the minimum and maximum values, with smaller variation more typical for a rapid decay in take-up tension.

Another validation analysis performed in the research and development of the present invention was a finite element analysis of a buffer tube wound on a reel. This was done because the stress distribution along the length of a buffer tube has an influence on the excess fiber length within the tube. A variation of stresses exists in the wound structure that results from the combined loading state of the applied longitudinal tension and radial compression due to the interaction of multiple layers. Several models were developed to simulate the process of winding a material under tension onto a reel. In each of the models, a wide sheet of material, with some given thickness, was used to approximate one full traverse of buffer tubes on a reel. This was done in order to reduce the problem to a two-dimensional, plane strain condition, since a full three-dimensional model of a long buffer tube would not be feasible. A plane strain analysis of the problem is reasonable because the most significant factor influencing the stress variation is the compression due to the multiple layers.

Figure 14A:
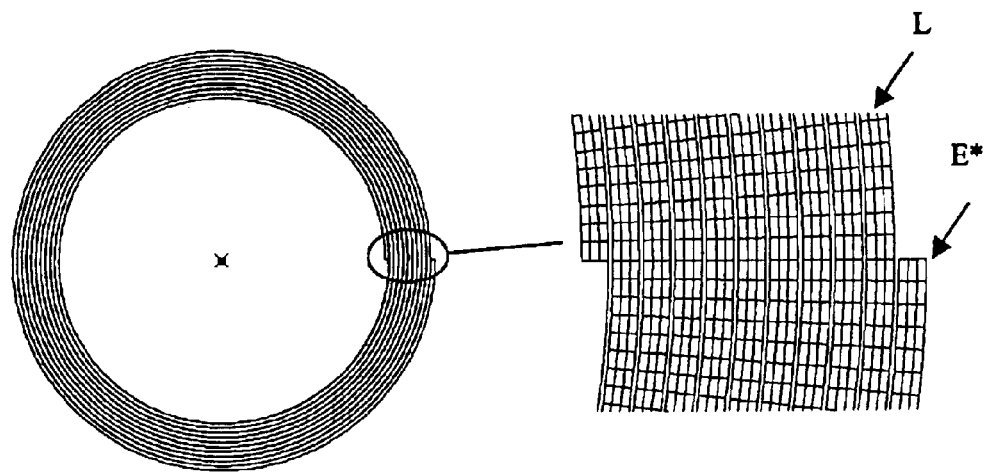
FIG. 14A is a diagrammatical representation of a finite element mesh model for an initially coiled model used in an analysis of the present invention.

The first FEA model developed included a spiral-shaped sheet of material initially coiled around a reel in a stress free state. The outer diameter of the reel was 200.0 mm, and the thickness of the sheet was 3.0 mm. The structure consisted of ten layers L, with a gap of 0.5 mm between the layers to allow for tightening of the coil. The pre-coiled state helps to eliminate the numerical difficulties associated with dynamic winding of the material around a rotating reel. The finite element mesh for this model is shown in FIG. 14A. The surface of the reel was created using a spiral so there would be a slight offset where the sheet is connected. This was done to eliminate a sharp corner at the attachment point, in order to prevent stress concentrations. Four noded quadrilateral plane strain elements, with reduced integration were used for the sheet. The sheet had three elements E* through the thickness, and 3800 elements along the length. Contact surfaces were established on the outer surface of the reel and inner surface of the sheet, and self-contact surfaces were established on the sheet to handle the contact between overlapping layers.

The reel was modeled as a rigid body, and the sheet was modeled as an elastic material with the properties of polypropylene at room temperature. The elastic modulus was taken to be 1.637 GPa, Poisson's ratio was taken as 0.40, and the density was taken to be 900 kg/m$^3$.

An explicit dynamic analysis was performed with a time-varying force applied to the nodes on the top surface of the outer layer of the sheet. The reel was constrained from translation and rotation, and the nodes on the bottom surface of the inner layer of the sheet were constrained from translation. A force of 10.0 N was applied to each node in the top three rows on the outer layer of the sheet. The rise time for the force was 10.0 seconds, and the analysis was conducted for a total time period of 20.0 seconds, in order to achieve a steady state solution. The density of the sheet material was scaled by a factor of $10^4$ in order to achieve a reasonable time step.

Figure 14B:
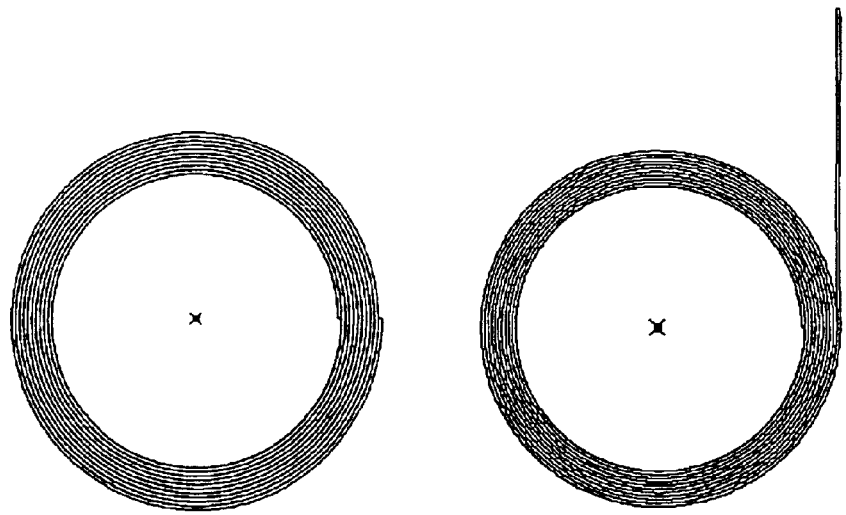
FIG. 14B is a diagrammatical representation of the finite element mesh model shown in FIG. 14A after deformation under a load.

FIG. 14B shows the reference and deformed configurations of the structure after 11.0 seconds. The deformed view shows the length increasing as the layers come into contact, and the gap between layers disappears.

Figure 14C:
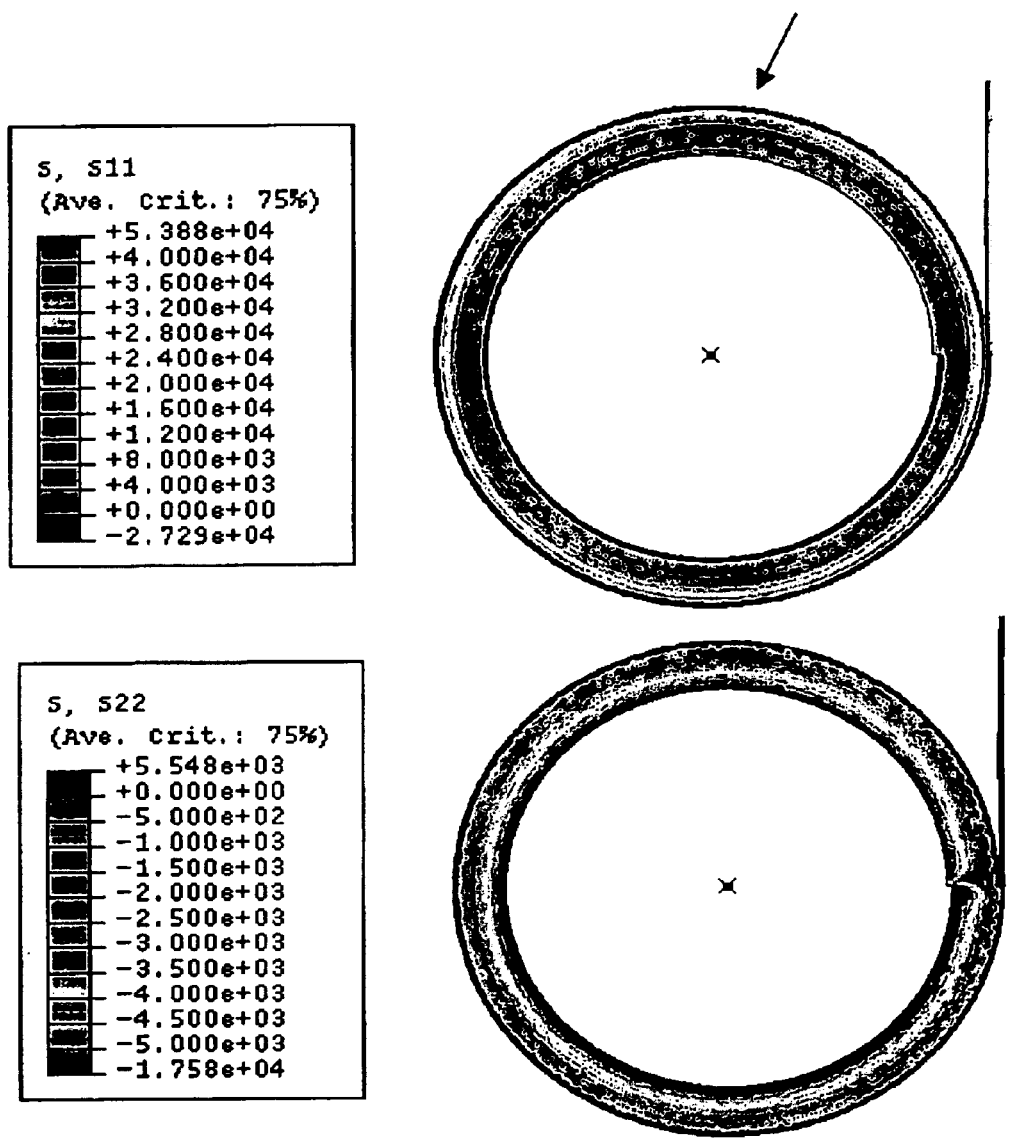
FIG. 14C is a graphical representation of circumferential and radial stress distributions of the model in FIG. 14A under a load.

FIG. 14C shows a plot of the stresses, $\sigma_{11}$ and $\sigma_{22}$, in the sheet at 11.0 seconds. A local coordinate system was used so that $\sigma_{11}$ is along the axis of the sheet, and $\sigma_{22}$ is through the thickness. When considering the wound structure, the stresses $\sigma_{11}$ and $\sigma_{22}$ correspond to stresses in the circumferential and radial directions, respectively. The main units used in the analysis were kg, mm, and seconds, so the magnitude of stresses shown in FIG. 14C needs to be multiplied by 1000 to obtain Pascals. The maximum circumferential stress is observed in the outer layer, and the value decays to zero at the inner layer. To compute the stresses for the plane strain condition, an effective width out of the plane of 1.0 mm is assumed. Using the total maximum applied force of 120 N, a simple static calculation of force divided by area for a rod gives a longitudinal stress of 40.0 MPa.

The distribution of radial stress shows the maximum stress occurring in the inner layer adjacent to the reel surface, and zero stress in the outer layer. The pattern of stress observed is reasonable for the type of load applied, but it does not show a strong interaction between the compressive forces and the circumferential stress. In the actual winding process, each layer of material added to the reel is under an applied tension, so the stresses evolve from the inner layer outwards. The model, however, has the stress starting at the outer layer due to the applied tension, and then propagating inwards towards the reel.

Figure 15A:
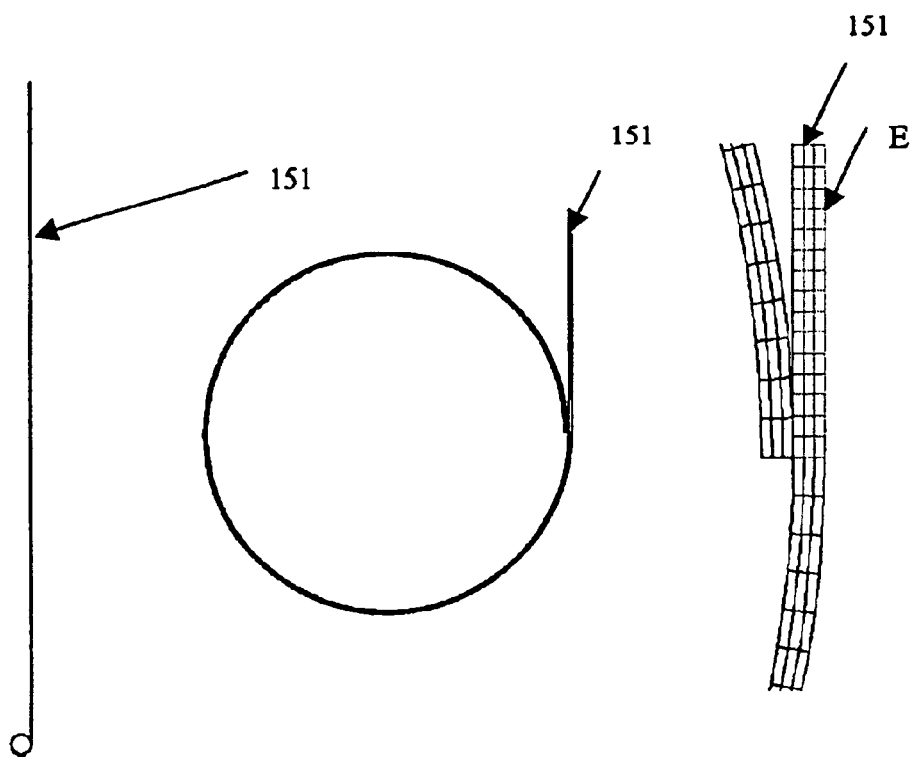
FIG. 15A is a diagrammatical representation of a finite element model and mesh used for a dynamic winding simulation in the development of the present invention.

In order to obtain a more accurate representation of the problem, a dynamic winding model was developed. This model included a reel with a long sheet of material attached to the side. The outer diameter of the reel was 240.0 mm, and the thickness and length of the sheet was 3.0 and 7000.0 mm, respectively. The length of the sheet was chosen to make approximately ten wraps around the reel. The model and finite element mesh used are shown in FIG. 15A. The surface of the reel was created using a spiral so there would be a slight offset where the sheet is attached. This was done to eliminate a sharp corner at the attachment point, in order to prevent any stress concentrations. The nodes on the bottom edge of the sheet were made coincident with the nodes on the reel surface to create a perfect bond. Four noded quadrilateral plane strain elements E, with reduced integration, were used for the sheet 151. The sheet 151 had three elements through the thickness, and 4000 elements along the length. Contact surfaces were established on the outer surface of the reel and inner surface of the sheet, and self-contact surfaces were established on the sheet to handle the contact between overlapping layers. The reel was modeled as a rigid body, and the sheet was modeled as an elastic material with the properties of polypropylene at room temperature. The elastic modulus was taken to be 1.637 GPa, Poisson's ratio was taken as 0.40, and the density was taken to be 900 kg/m$^3$.

An explicit dynamic analysis was performed with a force applied to the end of the sheet, followed by the application of angular velocity to the reel. The reel was constrained from translation, but was allowed to rotate under the action of the prescribed angular velocity.

Figure 15B:
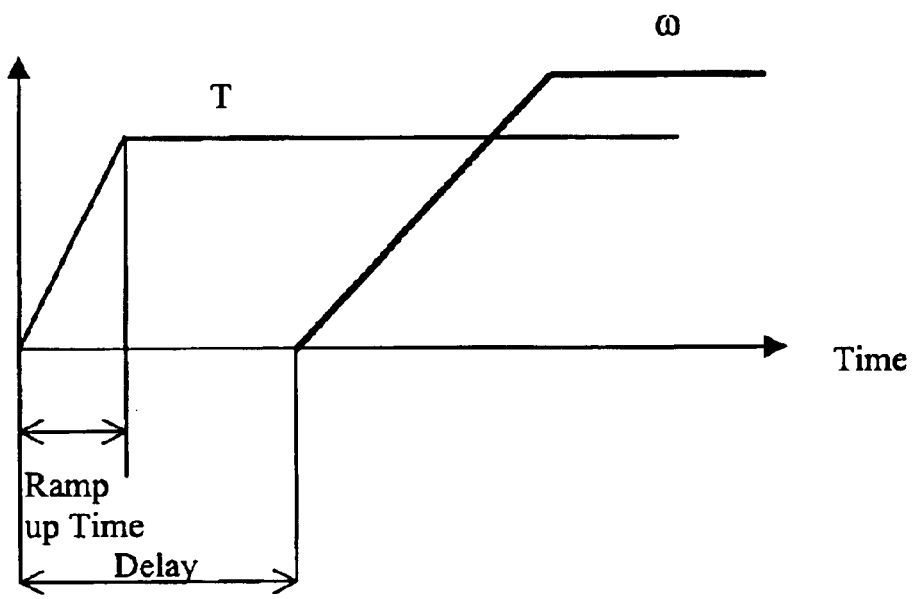
FIG. 15B is a graphical representation of curves representing the application of the tension and angular velocity for the dynamic winding model shown in FIG. 15A.

In the computations, a force of 10.0 N was applied to the first ten horizontal rows of nodes at the top end of the sheet. The ramp time on the force was 2.0 seconds, and the angular velocity started at 3.0 seconds and attained its steady value by 5.0 seconds. The force was applied before the angular velocity to allow the transients in the sheet to die out before winding occurred. An angular velocity of 9.7 rad/sec was chosen to achieve an approximate linear velocity of 70.0 m/min for the sheet. The variation of the force and velocity in time is depicted in FIG. 15B. The density of the sheet material was scaled by a factor of $10^4$ in order to achieve a reasonable time step.

Figure 15C:
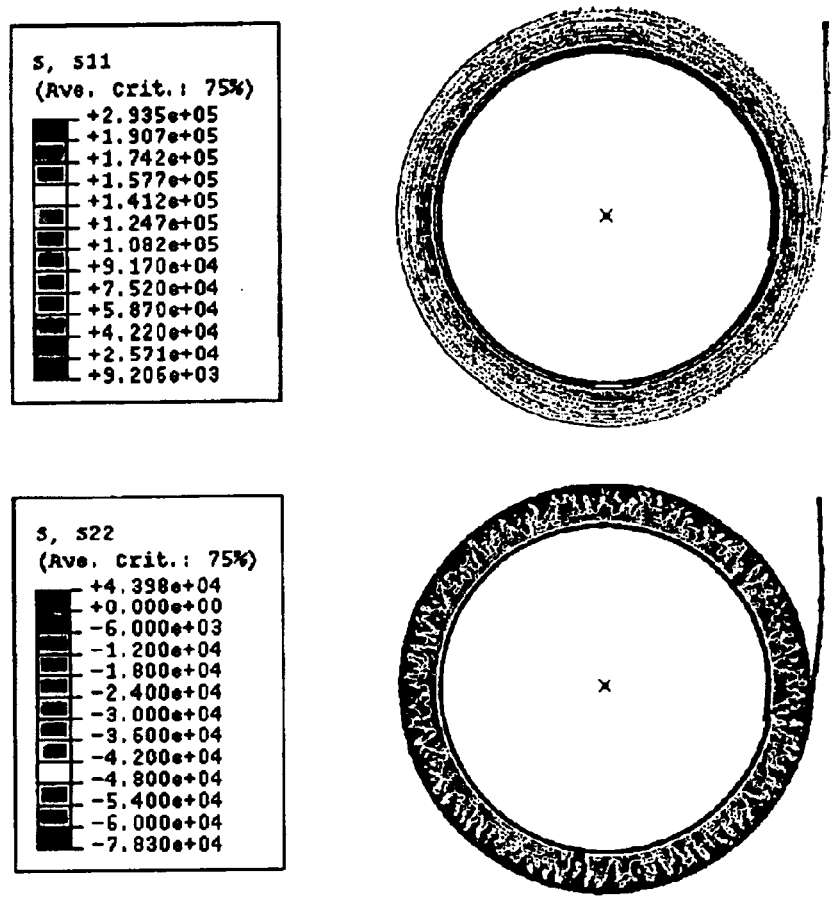
FIG. 15C is a graphical representation of circumferential and radial stress distributions of the model in FIG. 15A under a load.

FIG. 15C shows a plot of the circumferential and radial stresses in the wound sheet at 10.43 seconds. The magnitude of stress needs to be multiplied by 1000 in order to obtain units of Pascals. This plot shows a snapshot of the stresses at the time the sheet is almost completely wound. The circumferential stress is the highest in the layer closest to the reel surface, and it drops rapidly within the next few layers. The stress changes from 290 MPa in the first few layers, to approximately 90 MPa in the middle layers, and then to about 150 MPa in the outer layers. The plot of radial stresses shows that the inner layers near the surface of the reel are under compression, at about −40 MPa, and the middle layers have a stress level of approximately −20 MPa. In the outer layers, the radial stresses are close to zero. The plot of radial stress shows a significant amount of noise, but the trend of near zero stress in the outer layers, and increasing compressive stresses in the inner layers is as expected. The "noisy" distribution of stresses shown by the FEA model are most likely due to the contribution from bending. Layers of the buffer tube closer to the reel are subjected to higher bending stress gradients as compared to the outer layers.

Figure 15D:
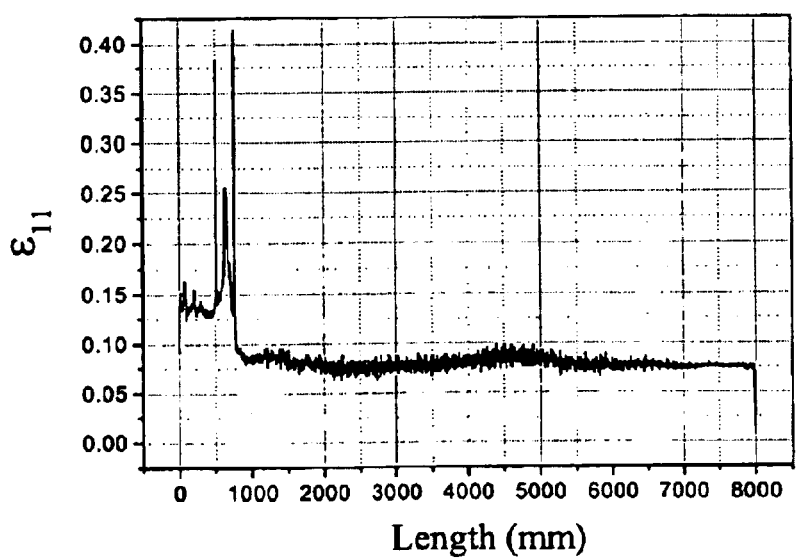
FIG. 15D is a graphical representation of axial strain over the length of the model in FIG. 15A under a load.

A graph of the circumferential strain over the length of the sheet is shown in FIG. 15D. This plot shows the high spike in strain that occurs near the inner surface of the reel, and a slight variation in strain over the rest of the length. The spike in strain could be the result of an instability that occurred during the winding process. After a few layers were taken up on the reel, the layers briefly loosened, and some slack was introduced into the wound structure. The slack quickly disappeared, however, and the winding continued smoothly for the rest of the analysis. The addition of slack to the system, and the subsequent recovery could have resulted in the sharp increase in the strain.

The major difficulty with the dynamic winding simulation is maintaining stability of the winding process. Simulations were performed in which the choice of tension and velocity values, and loading rates resulted in layers coming completely off the reel. The solution also consumes a large amount of computation time, so slowing down the velocity or the loading rate causes the analysis to take even longer to run.

Figure 16:
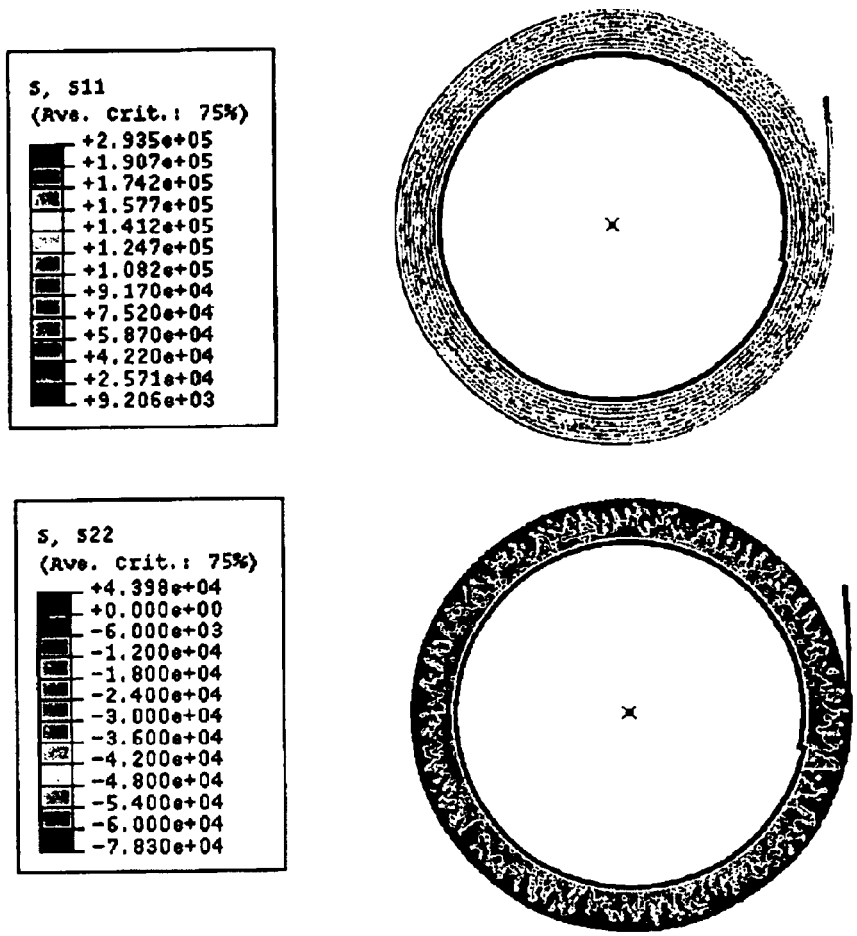
FIG. 16 is a graphical representation of circumferential and radial stresses in the dynamically wound sheet shown in FIG. 15A, for a slower loading rate case.
Figure 17:
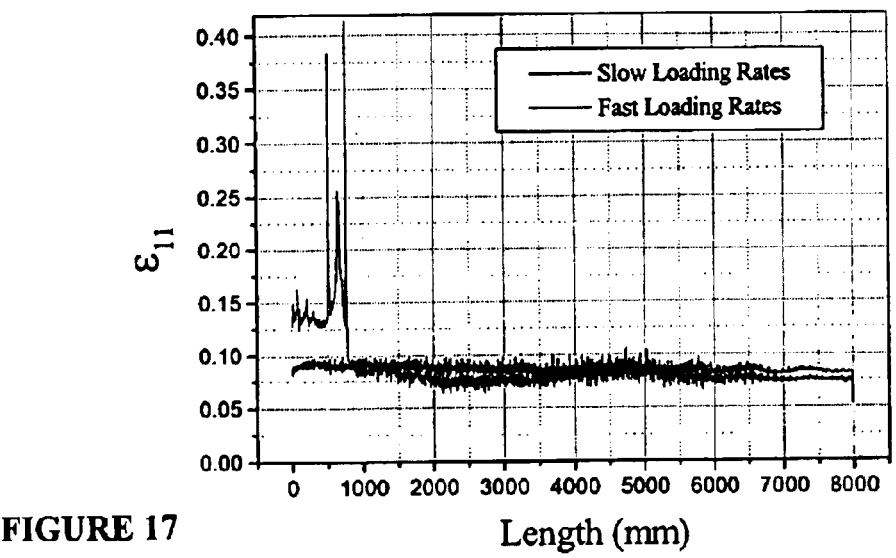
FIG. 17 is a graphical representation of circumferential strain over the length of the model in FIG. 15A for fast and slow loading rate dynamic winding cases.

A simulation was performed with a force rise time of 10.0 seconds, and with the velocity starting at 15.0 seconds and attaining its steady value by 25.0 seconds. The winding of the entire length of the sheet completed smoothly without any interruptions or instabilities. The distribution of circumferential and radial stress at 26.5 seconds is shown in FIG. 16. The stresses are very similar to the fast loading rate case, except the large circumferential stress near the surface of the reel is not present. A plot of the circumferential strain, shown in FIG. 17, illustrates the influence of the loading rate. The strain for the slower loading rate case is relatively smooth along the length, and does not have the large spike present in the higher loading rate case. Assuming that the faster loading rate case is not valid due to the instability, the slower case would have to be used to study the effect of winding on the stress and strain distribution. The strain for the slower case is relatively flat which suggests that there are not enough layers to cause a significant interaction between the radial compression and axial tension. This creates the need for a longer sheet of material, which would drastically increase computation time, and the possibility of instability.

The computation time for the slow loading rate case was approximately twenty hours, compared to ten for the fast case. An analysis was attempted on a longer sheet with a length of 12000.0 mm. The solution could not complete due to problems with excessive deformation after only about one wrap around the reel. Assuming a suitable set of loading conditions could be found to allow for complete winding, the solution time is still too large for the model to be practical.

Figure 18:
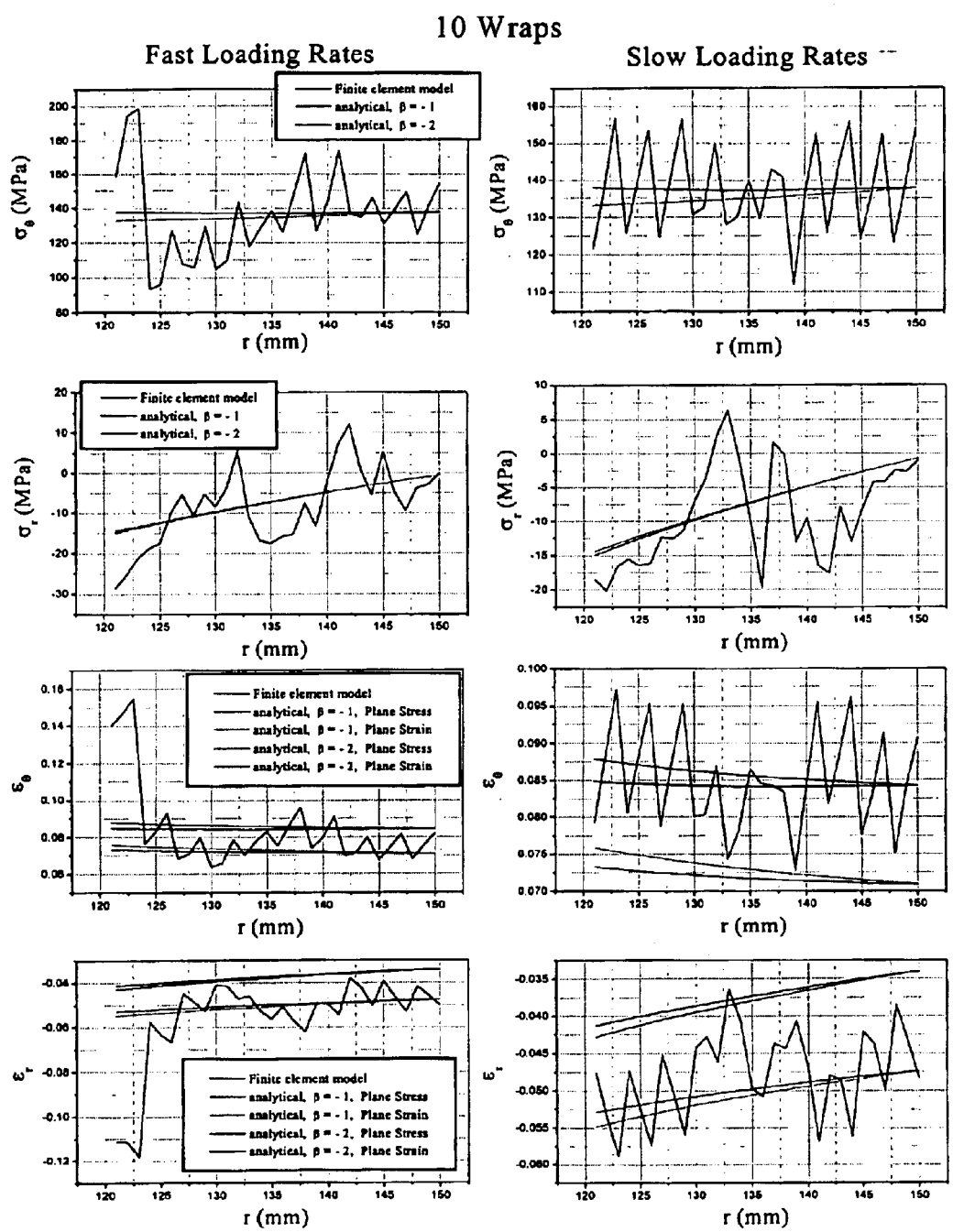
FIG. 18 is a graphical representation of a comparison of circumferential and radial stresses obtained using the a finite element model and an analytical model, for 10 wraps at different loading rates.

FIG. 18 depicts the results obtained from the second analytical model and the finite element model. As expected, due to inertia forces, fast ramping produced a wider level of "noise" in the stress curve as compared to slower ramping. Average levels of the circumferential stresses obtained from the FEA model are close to each other for fast and slower ramping. The range of stresses agrees with the the analytical solutions for the cases of $\beta=-1$ and $\beta=-2$.

A third model was developed that was suitable for studying the interaction between circumferential tension and radial compression within a reasonable amount of computation time. The model consisted of concentric rings, wrapped around a reel, which were incrementally activated into the solution with an initial tensile stress. A static equilibrium solution was obtained for each underlying layer before additional layers were added. This model also used a two dimensional, plane strain assumption for approximating the interaction of layers of buffer tubes on a reel.

Figure 19A:
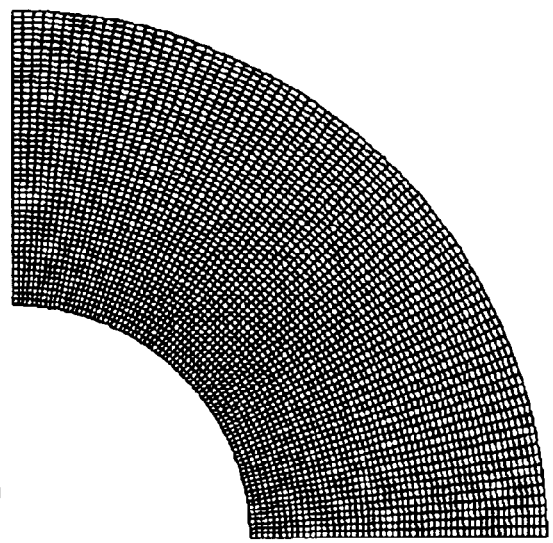
FIG. 19A is a diagrammatical representation of a finite element mesh for a concentric layer model of a wound buffer tube.

Since each layer is a complete ring, quarter symmetry was used for the problem. A smaller section could have been modeled, but the quarter section makes the application of boundary conditions easier, and allows the solution to be obtained away from any end effects. The outer diameter of the reel was 240.0 mm, and the thickness of each layer was 3.0 mm. Fifty layers were modeled in order to have a significant amount of radial compression. Each layer was modeled with a single element through the thickness, and 80 elements along the length of the quarter section. Four-noded quadrilateral plane strain elements, with reduced integration, were used. The finite element mesh is shown in FIG. 19A.

The nodes on the inner surface of the first layer were constrained in order to simulate the rigid surface of the reel. Symmetry conditions were applied to the horizontal and vertical surfaces. All the layers were perfectly bonded together so there were no contact surfaces defined. The layers were modeled as a linear elastic material with an elastic modulus of 1.637 GPa, and a Poisson's ratio of 0.10. The Poisson ratio was lowered from the typical value of 0.40 because it seems to have an amplifying effect on the variation in stresses. Since buffer tubes are typically hollow and gel filled, the Poisson ratio is different than that of solid polypropylene material.

The analysis for the concentric layer model starts with an initial tensile stress applied to the first layer, for which an equilibrium solution is then computed. The remaining layers are not considered in the solution for this step. At the next step, the first layer will have some stress state, and the second layer will be activated with the initial stress value. The equilibrium solution will then be computed for both layers. At the end of the first step, the nodes common to the first and second layer may have moved, but the second layer will be activated strain free in the second step. The deformations are small, so the shape of the elements did not change significantly. The analysis was continued until all layers have been activated, and a final equilibrium state is determined.

Figure 19B:
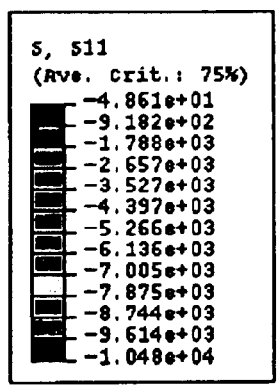
FIG. 19B is a graphical representation of radial and circumferential stress distributions for the concentric layer model in FIG. 19A.
Figure 19B:
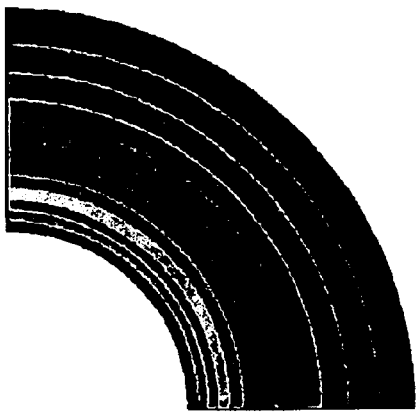
Figure 19B:
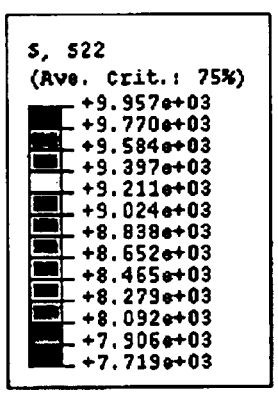
Figure 19B:
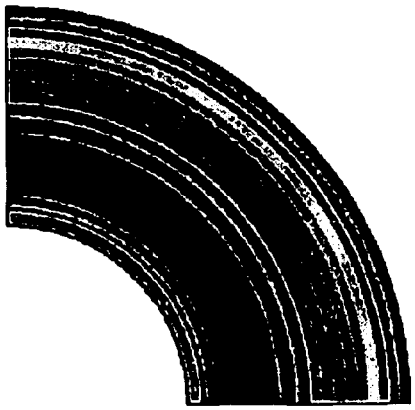

The analysis was performed with an initial stress value of 10.0 MPa, to simulate a winding tension of 30.0 N. FIG. 19B shows the circumferential and radial stress distributions at the final state. The stress values shown need to be multiplied by 1000 to obtain units of Pascals. The radial stress plot indicates zero stress at the outer surface, and the highest compression at the inner surface. The circumferential stress plot shows a high stress in the inner and outer layers, but a lower stress in the interior. This stress distribution would translate into a variation in stress or strain along the length of a wound material such as a buffer tube.

Figure 19C:
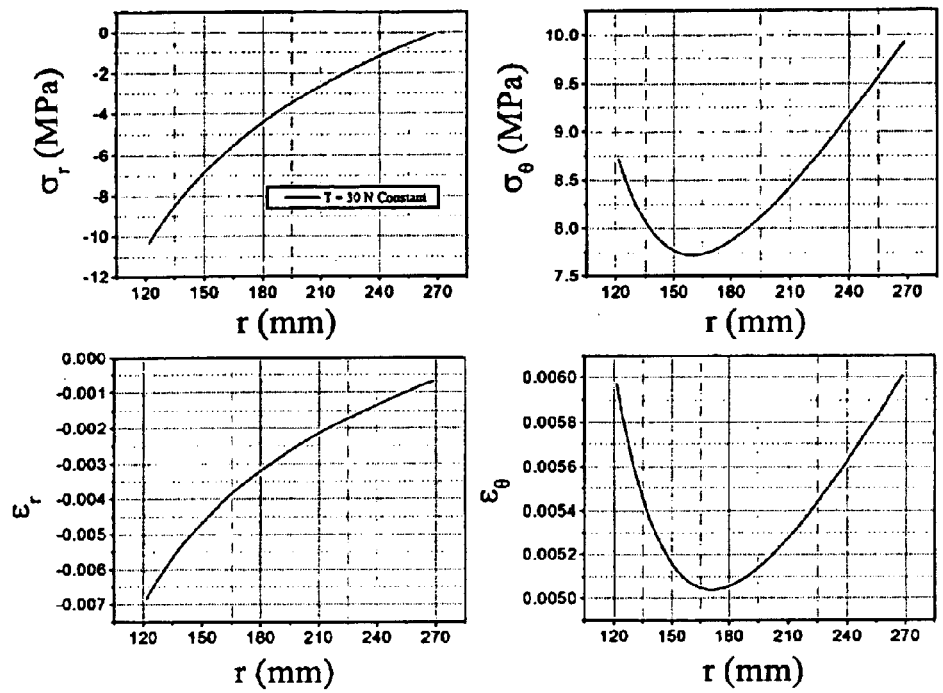
FIG. 19C is a graphical representation of radial and circumferential stress and strain distributions through the radius of the concentric layer model shown in FIG. 19A.

The circumferential strain, which is a function of both the circumferential and radial stresses, can be interpreted as the circumferential strain in each layer of wound material. In order to understand how the EFL would vary along the length of a buffer tube, it is necessary to look at the circumferential strain. The shape of the circumferential strain distribution along the length can be ascertained from the circumferential strain through the thickness of the layers. If the concentric layers represent a wound buffer tube, the strain in each layer can be interpreted as a sampling of the strain along the length. The stress and strain distribution through the thickness of the layers is shown in FIG. 19C.

Figure 19D:
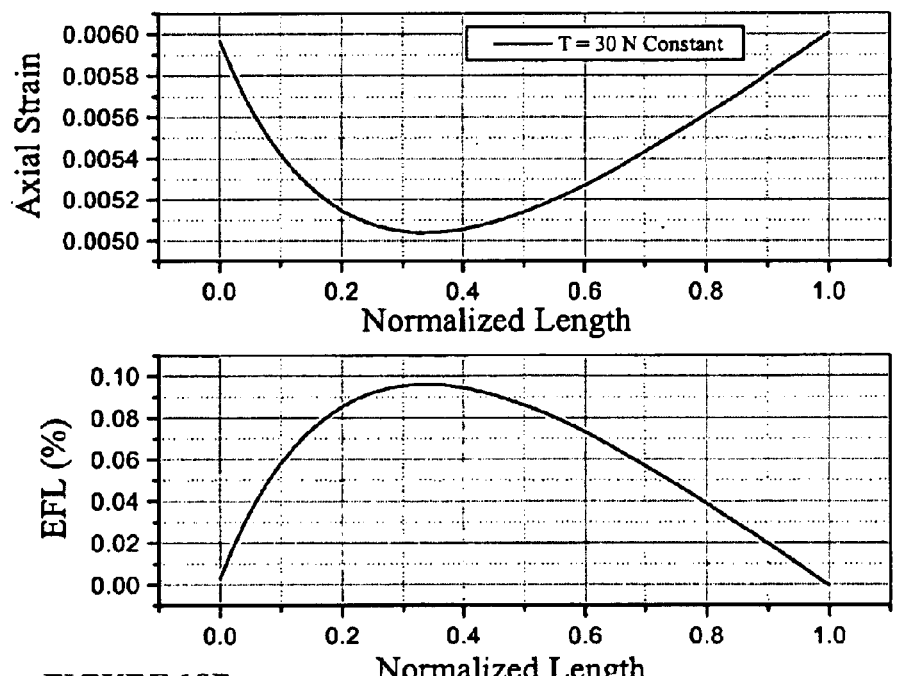
FIG. 19D is a graphical representation of circumferential strain and EFL distribution for the model shown in FIG. 19A under constant tension during manufacture.

If the EFL in the buffer tube is constant before the tube is taken up on the reel, it can be assumed that the circumferential strain induced by the winding will directly affect the amount of EFL. The relation between strain and percent EFL can be stated as:

$$EFL = EFL_o - 100 * \epsilon \qquad (5.1)$$

where $\epsilon$ is the circumferential strain, and $EFL_o$ is the initial percent EFL. The EFL distribution computed for the case of 30.0 N constant tension is shown in FIG. 19D. The circumferential strain has been used to approximate the axial strain, and the length has been normalized to one. An initial EFL of 0.6% was assumed for this case. The EFL curve has the distinct parabolic shape that is observed in the experiments.

Figure 20:
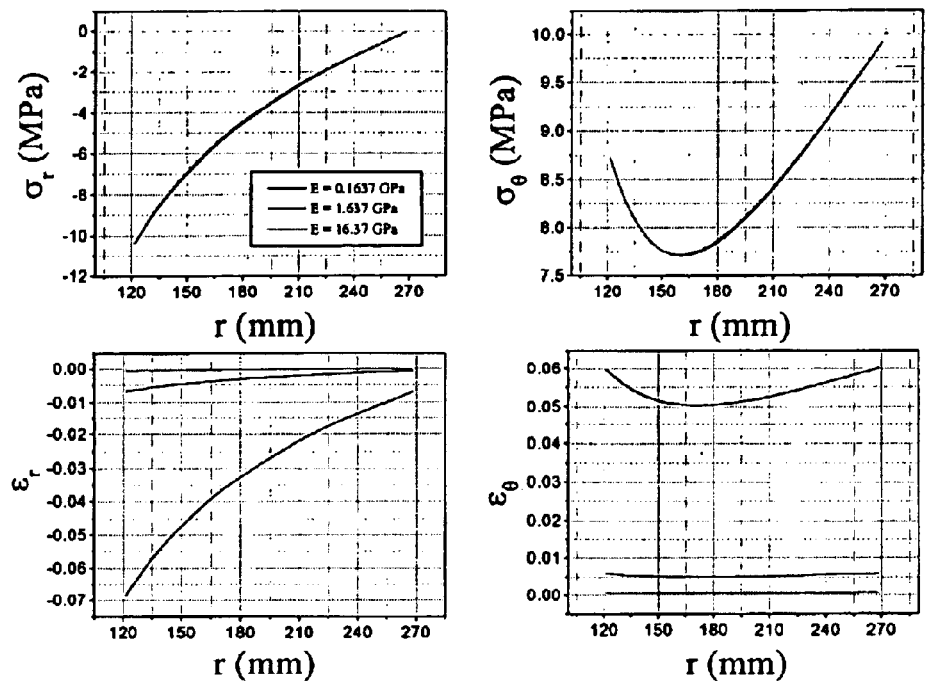
FIG. 20 is a graphical representation of radial and circumferential stress and strain distributions for different values of elastic modulus for the model shown in FIG. 19A.

The concentric layer model was used to run various cases in order to provide a better understanding of the mechanisms influencing the strain distribution. Simulations were performed to determine the effect of material modulus on the strain. Three values of elastic modulus were chosen, 0.1637, 1.637, and 16.37 GPa. The Poisson ratio was kept at 0.1 for each case, and a constant tension of 30.0 N was used. Plots of the radial and circumferential stress and strain are shown in FIG. 20. As expected, a higher Young's modulus decreases the circumferential strain, and flattens out the curve. This indicates that the winding process would have less of an effect on the EFL distribution for a stiffer material. This is consistent with observations of a more uniform EFL distribution in PBT buffer tubes, which have a higher modulus than the polypropylene equivalent.

Figure 21:
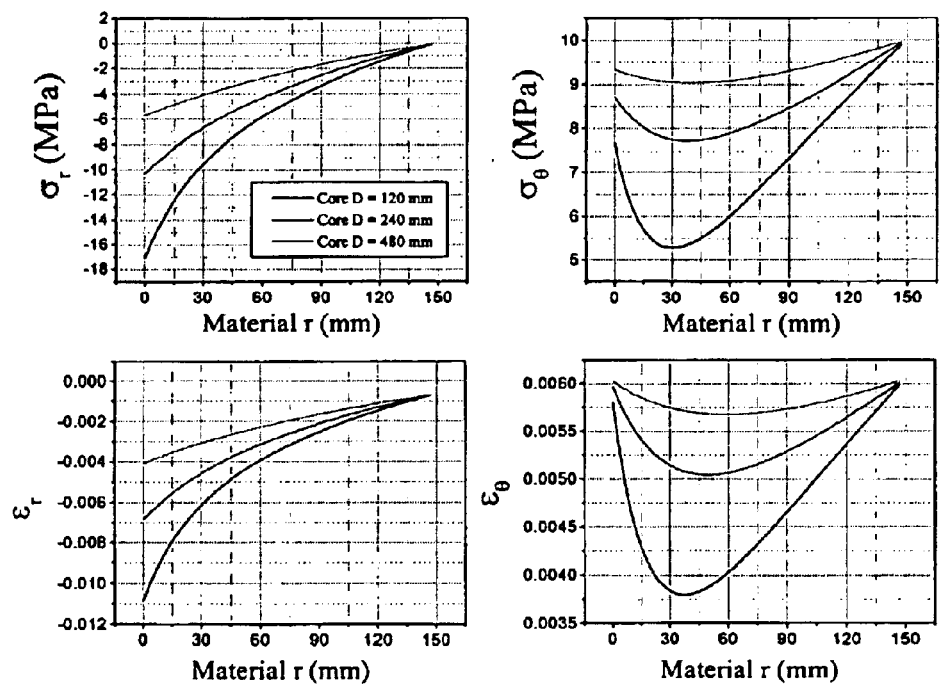
FIG. 21 is a graphical representation of radial and circumferential stress and strain distributions for different core diameters of the model shown in FIG. 19A.

Another parameter influencing the strain distribution is the diameter of the reel core. Simulations were performed with core diameters of 120.0, 240.0, and 480.0 mm. The total number of layers was kept the same for each case, so the total material thickness was 150.0 mm. The material properties and the applied tension were also kept the same for each case. The modulus was taken to be 1.637 GPa, Poisson's ratio was 0.1, and the tension was constant at 30.0N. Plots of the radial and circumferential stress and strain are shown in FIG. 21. The radius on the x-axis was changed to start at the outer surface of the core instead of at the center, in order to directly compare the results. The stress and strain variation is much larger for the smaller core diameter, and the parabolic shape of the circumferential strain curve is much more pronounced. The length of material is greater for the larger core diameters, but since the thickness of the material is the same for each case, the influence of the bend radius can still be determined. The observation of a greater variation in stress and strain for the smaller core diameter is consistent with experiments conducted on two different sized reels.

Figure 22:
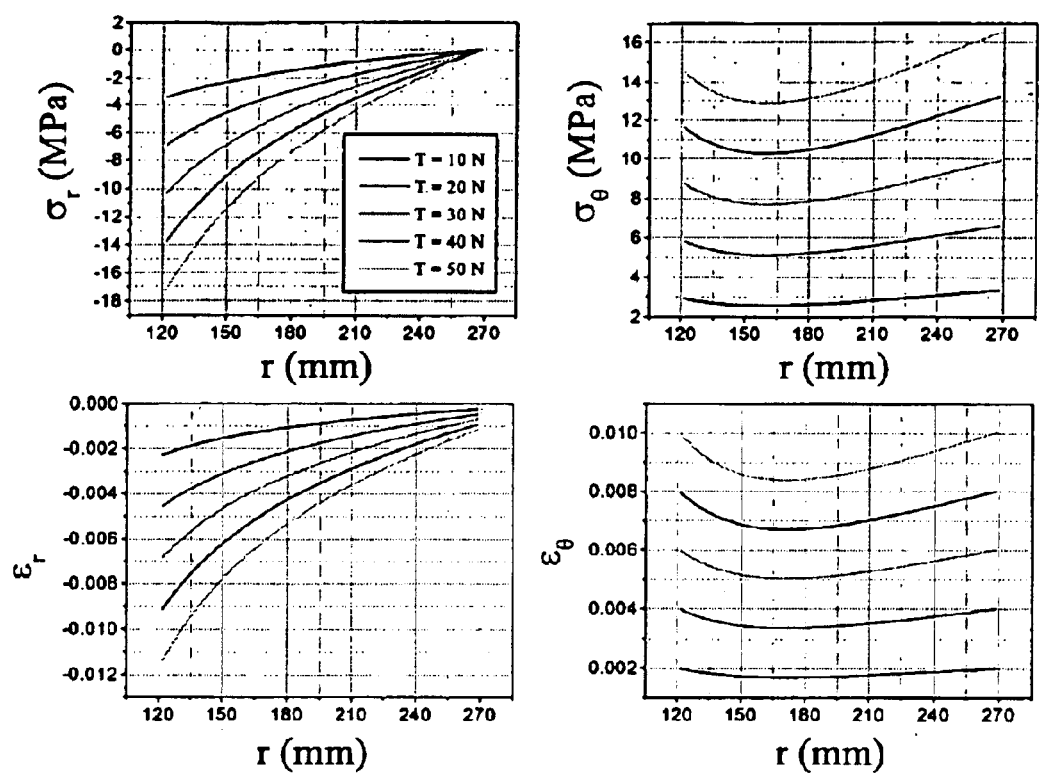
FIG. 22 is a graphical representation of radial and circumferential stress and strain distributions for different values of constant tension applied to the model shown in FIG. 19A.

Simulations were performed to investigate the effect of the tension level on the stress and strain distribution. The tension was kept constant in each case, and the values chosen were 10.0, 20.0, 30.0, 40.0, and 50.0 N. The modulus for each case was taken to be 1.637 GPa, and Poisson's ratio was 0.1. Plots of the radial and circumferential stress and strain are shown in FIG. 22. As expected, the increase in tension results in higher radial compression of the layers, and higher circumferential strain. Also, a larger variation in circumferential strain occurs with increasing tension, which would result in a greater variation in the EFL.

Figure 23:
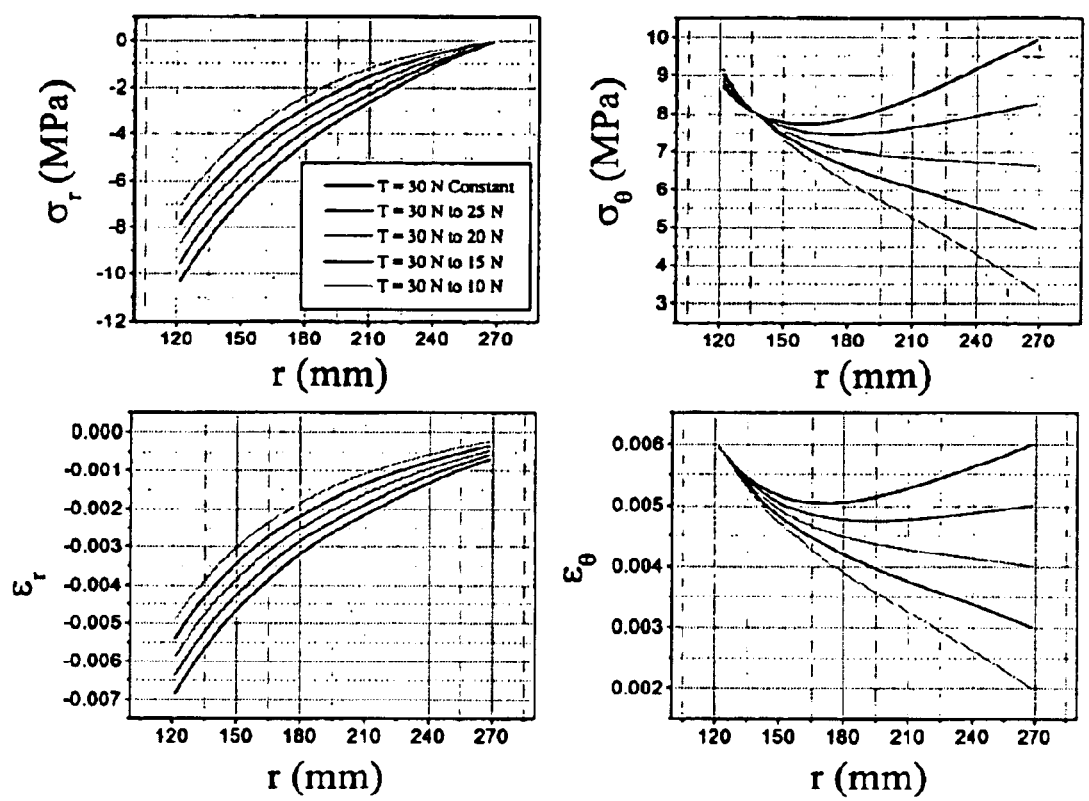
FIG. 23 is a graphical representation of radial and circumferential stress and strain distributions for different levels of linearly decaying tension applied to the model showing in FIG. 19A.

The effect of a variable tension was investigated by changing the initial stress for each of the layers. Simulations were performed with the tension starting at 30.0 N, and linearly decaying to values of 25.0, 20.0, 15.0 and 10.0 N, respectively. The range of tension values was broken into fifty increments, and the corresponding initial stresses were assigned to the appropriate layers. Plots of the radial and circumferential stress and strain are shown in FIG. 23. The 30.0 N constant tension case is also shown in the graph for comparison. The plot shows that the decay in tension has only a slight influence on the radial stress and strain, but has a very strong effect on the distribution of circumferential stress and strain. The appropriate choice of tension decay will flatten out the right portion of the circumferential strain curve, but a large variation will still exist between the left and right sides of the curve. If the starting tension was increased or decreased, the variation would still be present, but it may change in magnitude.

Figure 24:
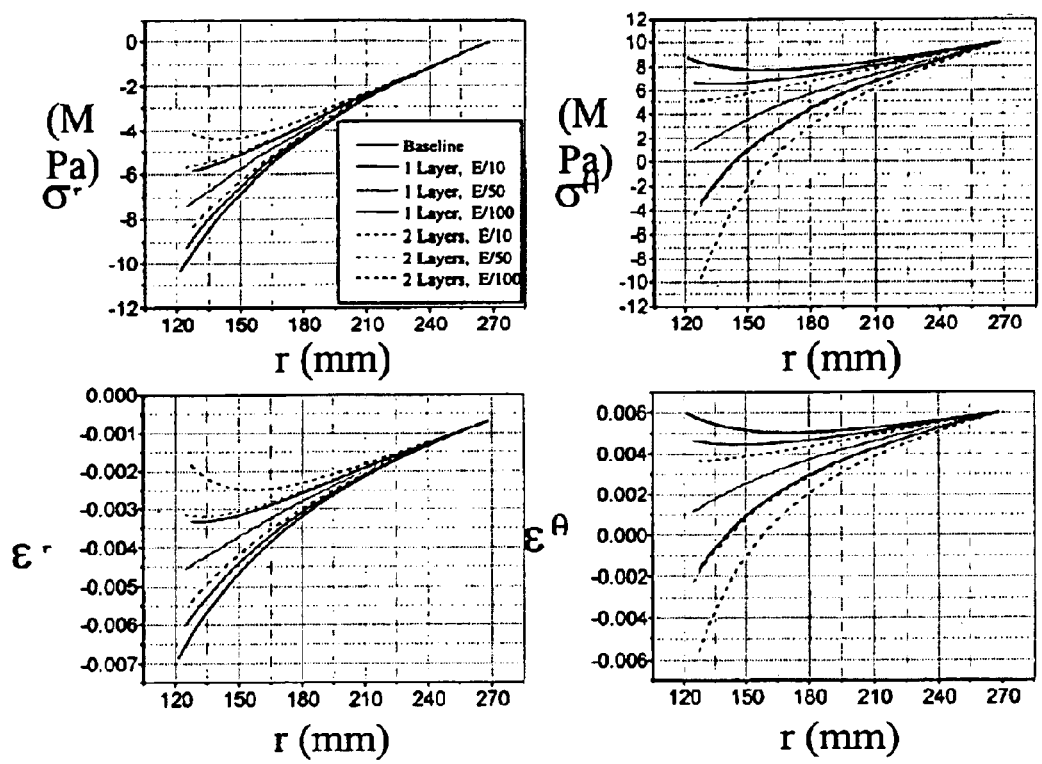
FIG. 24 is a graphical representation of radial and circumferential stress and strain distributions for different types of compliant layers on the core surface in the model shown in FIG. 19A.

In the present invention, the addition of a compliant layer (such as a soft pad) to the surface of the reel could influence the strain distribution in the wound material. In order to simulate a compliant layer on the reel, different material properties were assigned to the first layer in the model. The modulus for the regular material was taken to be 1.637 GPa, and Poisson's ratio was 0.1. Several cases were run with the modulus of the first layer reduced by 10.0, 50.0, and 100.0 times that of the regular material. The Poisson's ratio was 0.1 for the first layer in each case. Additional cases were run using the same set of reduced modulus values for both the first and second layers. The tension was kept constant at 30.0 N for each case. Plots of the radial and circumferential stress and strain are shown in FIG. 24. The curve labeled as baseline in the graphs is the case without a compliant layer. The stress and strain for the compliant layers are not shown in the graphs because they experience large deformation. Also, the stress levels in the compliant layer are of no interest since the rest of the layers would be representing the wound buffer tube material. The data indicates that the compliant layer helps to reduce the radial compression within the layers, with the most severe cases changing the concavity of the radial stress and strain curves. The reduction in radial compression causes a drop in the circumferential strain within the layers closest to the reel surface. A large reduction in the modulus of the compliant layer causes the circumferential strain to change from a state of tension to a state of compression in the layers near the surface of the reel. The concavity of the circumferential strain curve also changes as the modulus of the compliant layer is reduced.

Figure 25A:
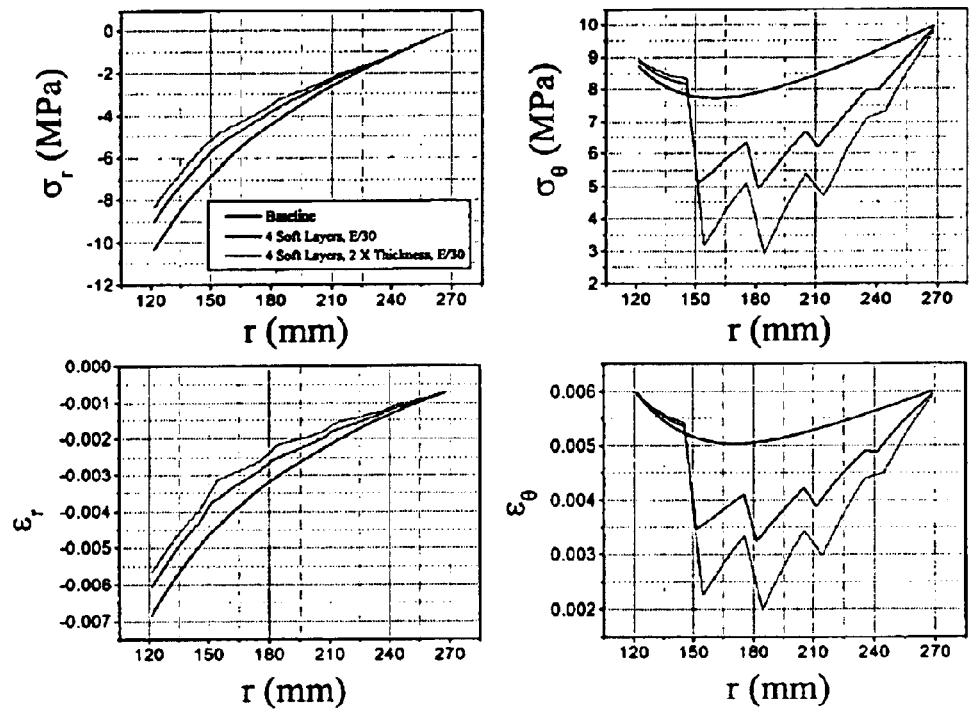
FIG. 25A is a graphical representation of radial and circumferential stress and strain distributions for different cases of distributed compliant layers in the model shown in FIG. 19A.

The concentric layer model was used to study the effect of compliant layers distributed among the regular material layers on the stress and strain distribution. A simulation was performed using a material with a reduced modulus in place of the regular material for layers number ten, twenty, thirty and forty. An additional simulation was performed for compliant material in place of layers ten, eleven, twenty, twenty one, thirty, thirty one, forty, and forty one. The modulus of the compliant material was reduced by a factor of thirty from the regular material to a value of 0.5456 GPa, and Poisson's ratio was taken to be 0.1. Plots of the radial and circumferential stress and strain are shown in FIG. 25A. The baseline case without compliant layers is also shown in the plots. The stress and strain values within the compliant layers are not included in the curves because the main focus is the resulting distribution within the regular material. The curves show that the compliant layers cause a significant amount of variation in the circumferential stress and strain when compared to the baseline case. This would lead to a greater variation in the EFL distribution than the baseline case.

Figure 25B:
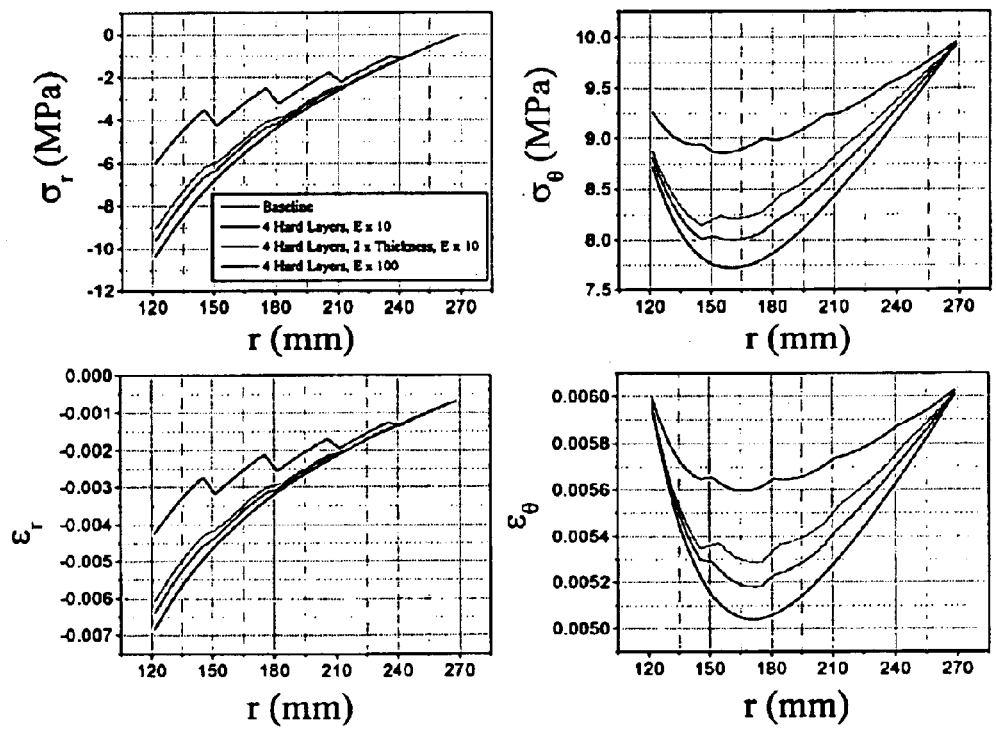
FIG. 25B is a graphical representation of radial and circumferential stress and strain distributions for different cases of distributed stiff layers in the model shown in FIG. 19A.

As an alternative to the distributed compliant layers, a case was considered with distributed stiff layers. Simulations were performed with stiff layers in the same configuration as the compliant layers discussed previously. The modulus of the stiff layers was increased ten times that of the regular material, to a value of 16.37 GPa, and Poisson's ratio was taken to be 0.1. An additional case was considered with a modulus one hundred times greater than the regular material, or 163.7 GPa. Plots of the radial and circumferential stress and strain are shown in FIG. 25B. The curves show that the stiff layers act to reduce the variation in circumferential stress and strain, and therefore would reduce the variation in EFL.

Figure 25C:
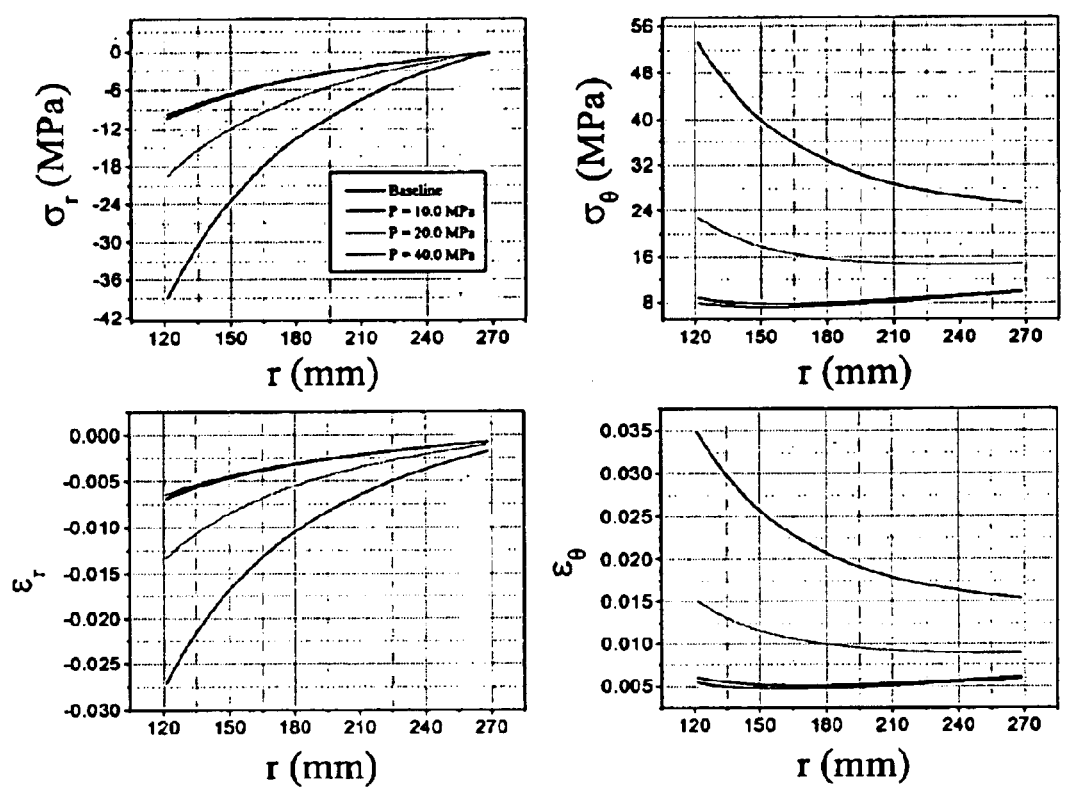
FIG. 25C is a graphical representation of radial and circumferential stress and strain distributions for different cases of internal pressure in the model shown in FIG. 19A.

Another case that was considered to control the distribution in EFL was an expandable core. This case was modeled by removing the constraints on the boundary of the inner layer, and applying a normal pressure to the surface. The boundary was released, and the pressure was applied after all layers were added. Simulations were performed with pressures of 10.0, 20.0, and 40.0 MPa, respectively. Plots of the radial and circumferential stress and strain are shown in FIG. 25C. The curves show that the pressure shifts the circumferential stress and strain curves up, and also changes the shape of the curves. The effect of the pressure is more pronounced within the layers closest to the reel surface. The increase in strain in the layers resulting from the pressure would cause a decrease in EFL. This effect would need to be combined with another method of EFL control in order to obtain a desirable EFL distribution. If this technique were to be used, it would need to be determined if the pressure would damage the layers of buffer tube near the reel surface. The curve for the 10.0 MPa pressure case is below the baseline curve, which indicates that the pressure was not high enough, and the layers moved inwards from the surface of the reel.

Figure 26A:
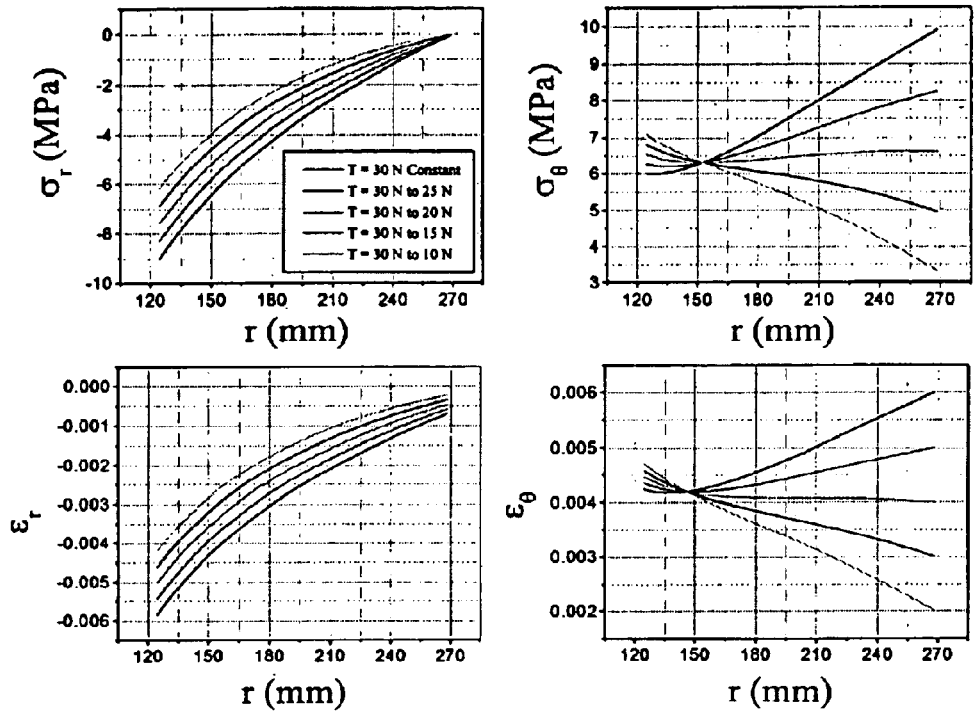
FIG. 26A is a graphical representation of radial and circumferential stress and strain distributions for a compliant layer combined with linearly decaying tension in the model shown in FIG. 19A.

Simulations were performed to investigate the combined effect of variable tension and compliant layers. A model with a compliant layer was used to run different cases of linearly decaying tension. The modulus of the compliant layer was 0.12 GPa, and the modulus of the regular material was 1.637 GPa. The Poisson ratio for both materials was 0.1. The tension was linearly decayed from a starting value of 30.0 N, to values of 25.0, 20.0, 15.0, and 10.0 N, respectively. Plots of the radial and circumferential stress and strain are shown in FIG. 26A. The curve for the 30.0 N constant tension case is also shown in the graphs for comparison. The curve on the circumferential strain plot, which corresponds to the 30.0 to 20.0 N tension case, helps to illustrate the effectiveness of the variable tension combined with a compliant layer. The strain in this case is relatively flat, which would correspond to a more uniform distribution of EFL along the length of a buffer tube. Refinements could be made to the tension curve, including non-linear variations, to produce the optimum distribution of strain.

Figure 26B:
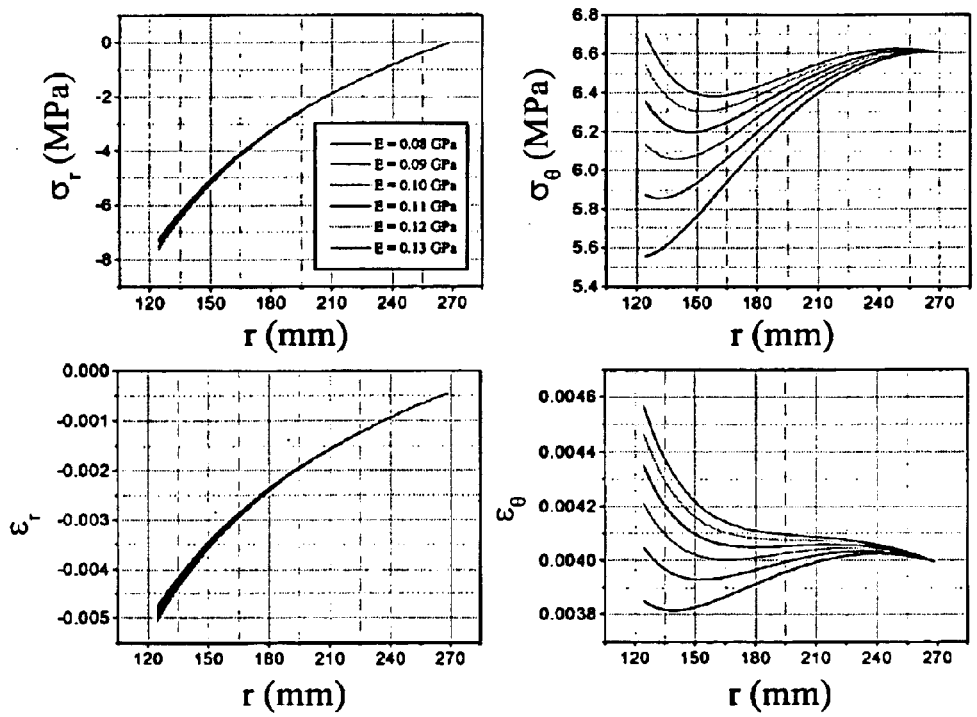
FIG. 26B is a graphical representation of radial and circumferential stress and strain distributions for a compliant layer combined with linearly decaying tension with varying values for Young's Modulus of the model shown in FIG. 19A.

Additional cases were run using the same form of decaying tension, and different values for the modulus of the compliant layer. A linearly decaying tension from 30.0 to 20.0 N was chosen, and the modulus of the compliant layer was varied from 0.08 to 0.13 GPa, in increments of 0.01 GPa. The modulus of the regular material was 1.637 GPa, and Poisson's ratio for both materials was 0.1. Plots of the radial and circumferential stress and strain are shown in FIG. 26B. The circumferential strain plot shows that the modulus of the compliant layer can be tuned to achieve a strain distribution with little variation.

Figure 27A:
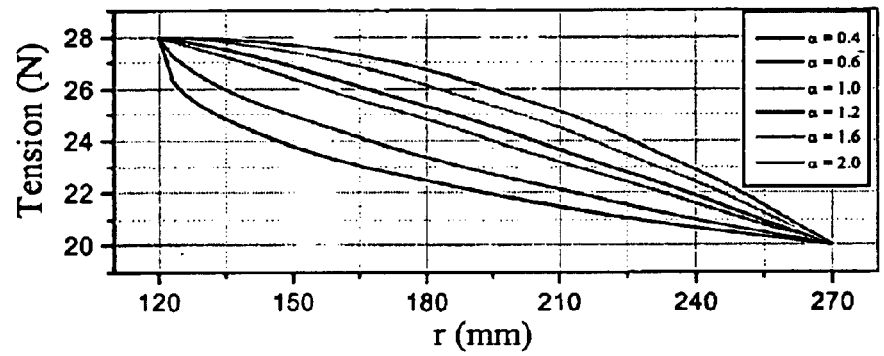
FIG. 27A is a graphical representation of tension curves for different values of the coefficient $\alpha$ in the model shown in FIG. 19A.

The effect of the shape of the decaying tension curve on the strain distribution was investigated using a series of curves. The tension curves were generated by the following equation:

$$T = T_i - (T_f - T_i)\left[\frac{r - r_o}{R - R_o}\right]^\alpha \qquad (5.2)$$

where $T_i$ is the starting tension, $T_f$ is the final tension, $r_o$ is the inner radius of the layers, R is the outer radius, and $\alpha$ is a coefficient influencing the shape of the curve. The starting tension was taken to be 28.0 N, and the final tension was 20.0 N. Values for the coefficient $\alpha$ were taken to be 0.4, 0.6, 1.0, 1.2, 1.6, and 2.0. The tension curves for these values are shown in FIG. 27A.

Figure 27B:
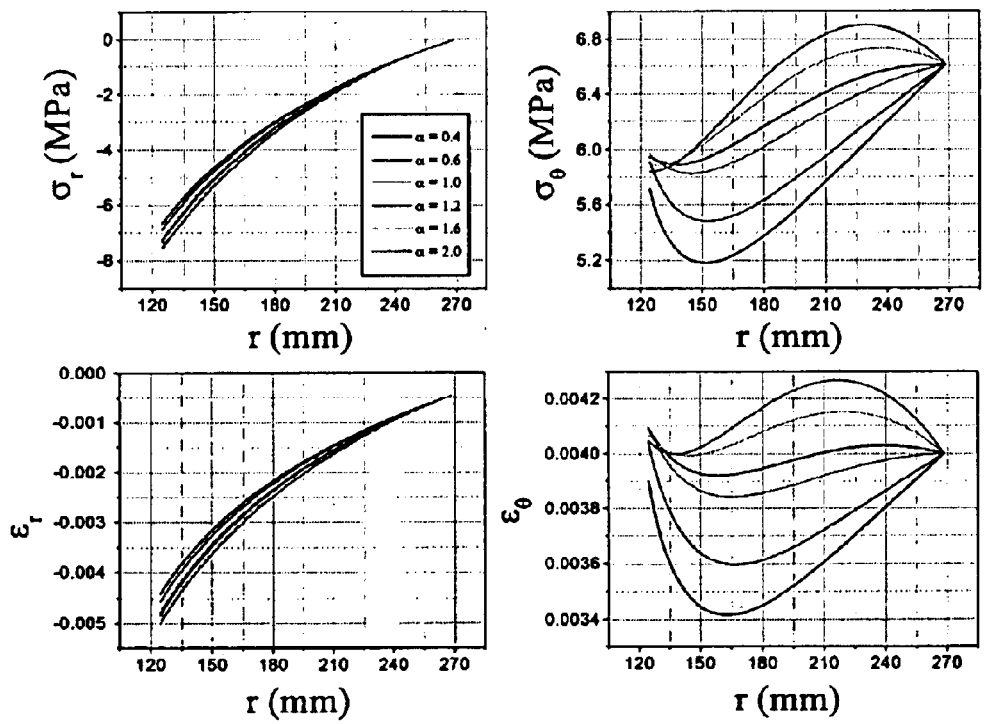
FIG. 27B is a graphical representation of radial and circumferential stress and strain distributions for a compliant layer combined with linearly and non-linearly decaying tensions in the model shown in FIG. 19A.

The model with a compliant layer was used to run the different cases of decaying tension. The modulus of the compliant layer was 0.12 GPa, and the modulus of the regular material was 1.637 GPa. The Poisson ratio for both materials was 0.1. Plots of the radial and circumferential stress and strain are shown in FIG. 27B. The tension curve for the $\alpha=1.2$ case, which is a slight deviation from linear, produces a circumferential strain with very little variation around a constant nominal value.

Figure 28:
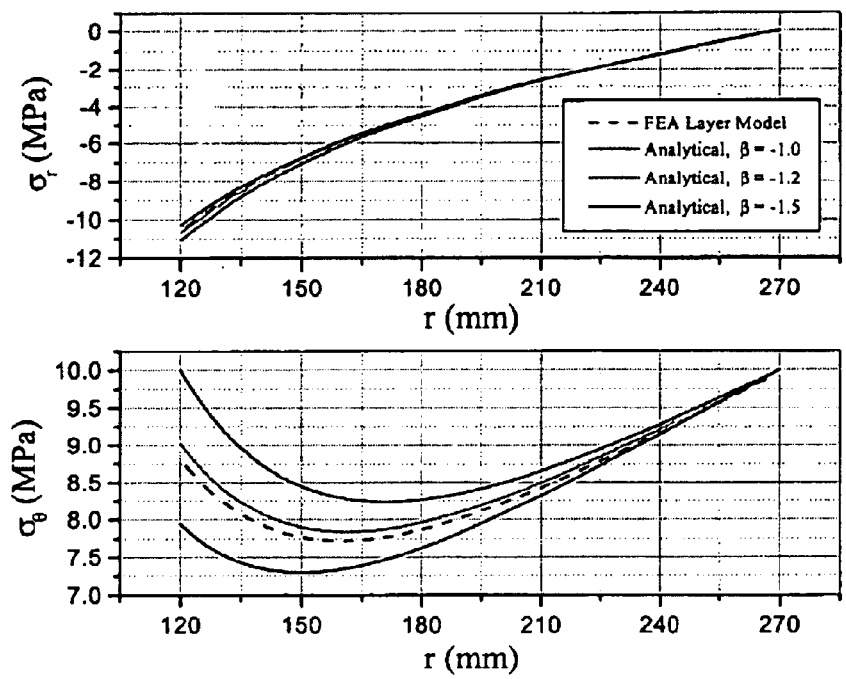
FIG. 28 is a graphical representation of radial and circumferential stresses obtained from a finite element layer model and an analytical model.

The results obtained using the concentric layer finite element model were compared to those obtained using the analytical model discussed previously. The material had a modulus of 1.637 GPa, and a Poisson's ratio of 0.1. A constant tension of 30.0 N was used for this case, and there was no compliant layer on the reel surface. The analytical model uses a parameter $\beta$ to characterize the interaction between the layers of material and the reel. A few values of $\beta$ were chosen to correspond to the case of a rigid reel that was considered in the finite element model. Plots of the radial and circumferential stress obtained from FEA and the analytical model are shown in FIG. 28. The stresses are in very good agreement when the appropriate choice of $\beta$ is made.

Figure 29:
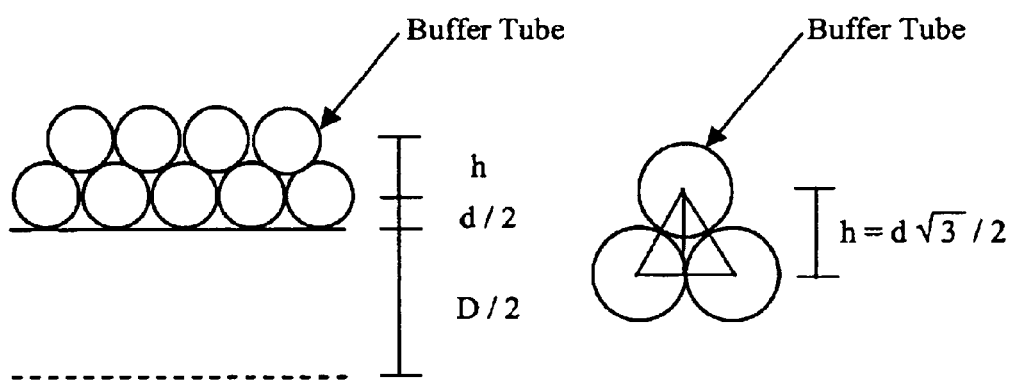
FIG. 29 is a diagrammatical representation of buffer tube packing on a reel.

Comparisons were made between the computed EFL obtained using the concentric layer finite element model and experimentally measured values. The experimental data was obtained from a series of buffering trials of 2.5 mm diameter tubes. In each trial, a 12000.0 km length was taken up on a reel that had an outer diameter of 401.7 mm, and a width of 376.0 mm. The number of layers for this length of tube was determined to be fifty-five from the following formula:

$$L = \sum_{n=1}^{N} \frac{W}{d}\left[d^2 + \pi^2\left(D + d + (n-1)d\sqrt{3}\right)^2\right]^{\frac{1}{2}} \quad (5.3)$$

where L is the length, W is the reel width, D is the reel diameter, d is the buffer tube diameter, n is the layer number, and N is the total number of layers. The equation for length was determined by assuming that each buffer tube layer is wrapped around the reel in the path of a helix, with a pitch equal to the buffer tube diameter. Also, perfect packing of the tubes is assumed, as shown in FIG. 29.

A concentric layer model was created with an inner radius of 200.0 mm, and fifty-five layers of 2.5 mm thickness each. Since each solid layer of material represents a hollow buffer tube filled with gel and fibers, assigning the isotropic material properties for solid polypropylene to each layer is not sufficient. An orthotropic material description was used to allow for a softer modulus in the transverse direction of the tube. A local coordinate system was used to define the material constants for each layer. The local 1 direction was defined through the thickness of the layers, the local 2 direction was defined along the length, and the local 3 direction was defined out of the plane. The material properties were defined as follows:

| | | |
|---|---|---|
| $E_{11}$ = 0.24 GPa | $V_{12}$ = 0.09 | $G_{12}$ = 0.60 GPa |
| $E_{22}$ = 1.20 GPa | $V_{23}$ = 0.09 | $G_{23}$ = 0.60 GPa |
| $E_{33}$ = 0.24 GPa | $V_{31}$ = 0.09 | $G_{31}$ = 0.60 GPa |

Figure 30:
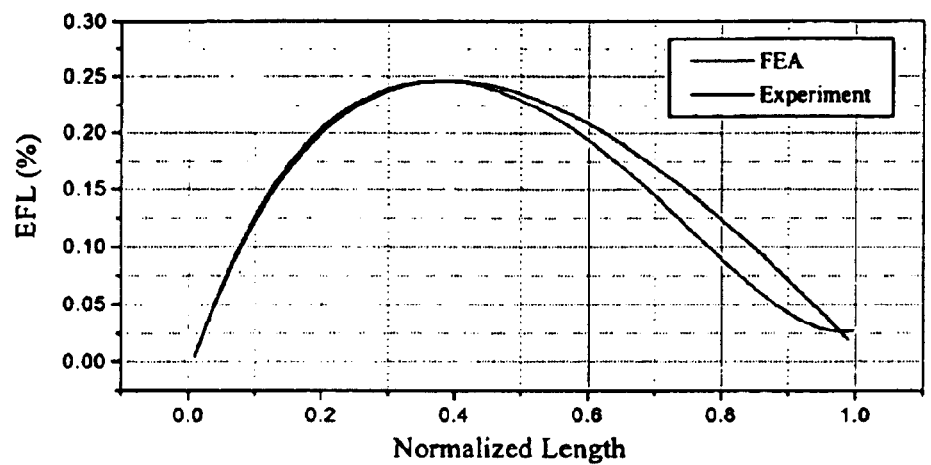
FIG. 30 is a graphical representation of EFL distributions obtained from a finite element analysis and through experimentation for a constant tension.

A simulation was performed for the case of 30.0 N constant tension, and the EFL was computed. The EFL was computed from the circumferential strain according to Equation 5.1, with an initial EFL value of 1.0%. The initial EFL for the buffering trials was not known so the value was approximated to achieve a reasonable agreement with the experiment. The computed and the experimentally measured EFL distribution are shown in FIG. 30. The length scale in the plot has been normalized to one. The results show good agreement between model and experiment except for a slight deviation on the right portion of the curves. The EFL values generated by the model are computed from a single strain point in each layer, so the values are only a representation of what the distribution may look like along the length of a buffer tube. Also, the experimental measurement technique can have some inaccuracy due to the way the EFL is sampled and the individual measurements are made. The technique consists of cutting the tube into short sections at discrete locations, and measuring the length of the fiber in each section. The shape of the EFL curve depends on the frequency of the sampling, and the accuracy of the handling and measurement of each section.

The numerical simulations did not take any thermal effects into consideration for the computation of strain. Thermal and material effects, such as expansion and contraction, and material crystallinity and shrinkage, influence the distribution of EFL within the tube. Also, relaxation of the material while it is on the reel has an effect on the EFL. In addition, the EFL curve predicted by the model represents the EFL while the buffer tube is still on the reel in a strained state. The measurements are taken when the buffer tube has been removed from the reel, and cut into pieces. There is the possibility that the EFL could change in this situation, and the values could not be directly compared to those predicted by the model. It is assumed that the EFL is locked in while the buffer tube is on the reel, and it does not change much when it is taken off, the model provides a reasonable approximation. Various thermal and material effects can be taken into consideration in the model, assuming the appropriate material data can be provided.

Figure 31:
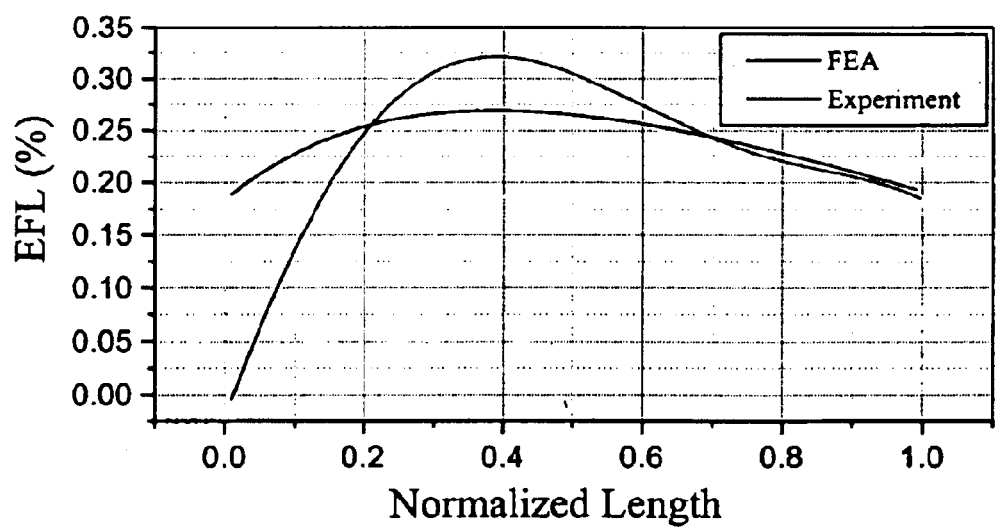
FIG. 31 is a graphical representation of EFL distributions obtained from a finite element analysis and through experimentation for a lower constant tension than that applied in FIG. 30.

Another simulation was performed to compare with an experimental buffering trial conducted with a constant tension of 10.0 N. In this case the shape of the EFL curve predicted by the model is not the same as the experiment, so the initial EFL value can not be determined by matching the curves. FIG. 31 shows the EFL curve from the experiment and from the model, calculated with an initial EFL of 0.52%. The model shows that the entire EFL curve shifts up due to less tension on the tube. This is reasonable since less strain on the tube would allow more EFL to accumulate, and would not greatly reduce the EFL already present. The experimentally measured EFL shows a very low EFL in the tube near the surface of the reel. This level of EFL seems to indicate that a tension higher than 10.0 N was on the tube at the beginning of the trial. The process may be slightly unstable at the beginning when the first few layers are going onto the reel, and transients are still present. Also, it is possible that for very low tensions the thermal effects on the material become more significant.

Figure 32A:
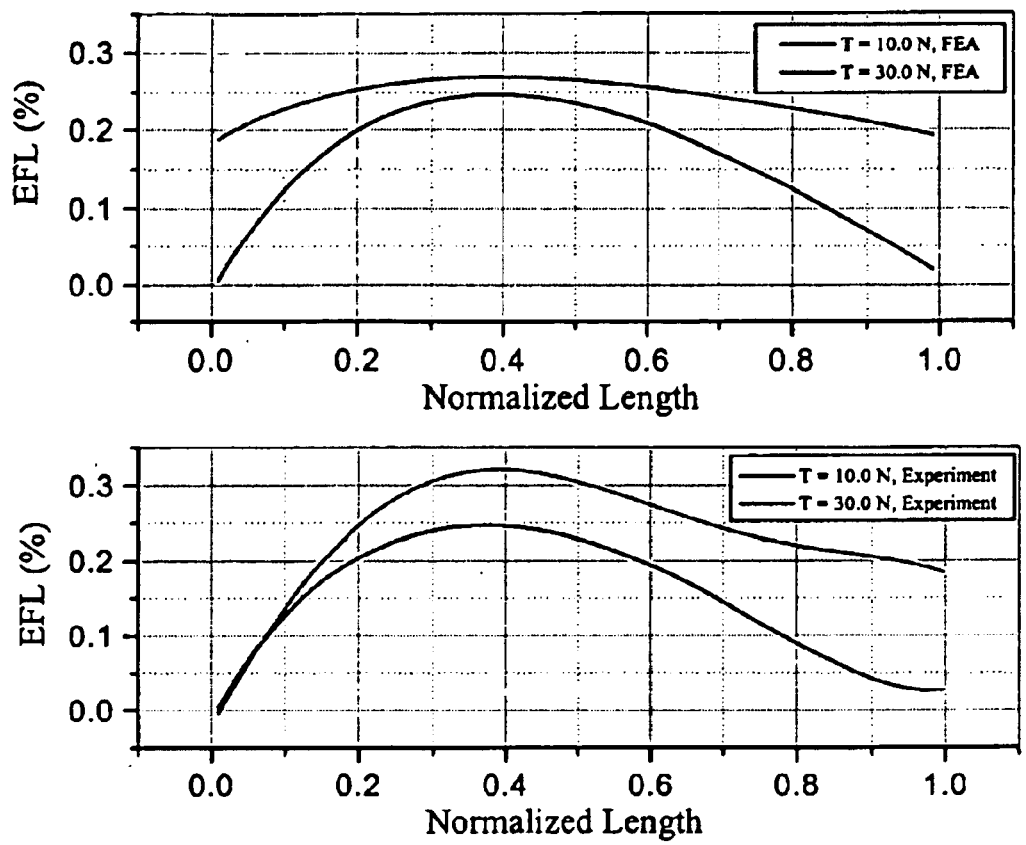
FIG. 32A is a graphical representation of EFL distributions obtained from a finite element analysis and through experimentation for two different cases of constant tension.

FIG. 32A shows a comparison of the EFL for the 10.0 N and 30.0 N tension cases, for both the model and experiment. The comparison between FEA and experiment shows the same trend in EFL except for the beginning portion of the experimental curve for the 10.0 N case.

Figure 32B:
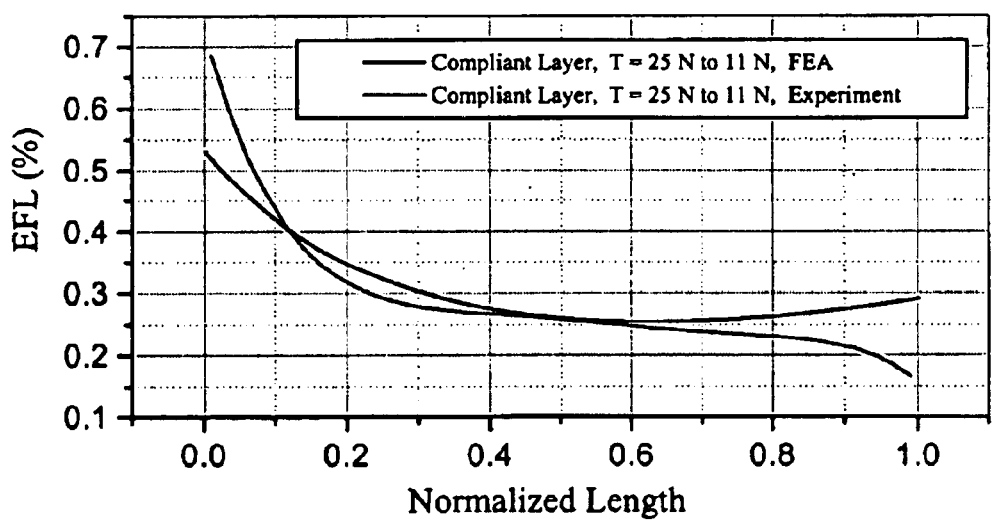
FIG. 32B is a graphical representation of EFL distribution obtained from a finite element analysis and through experimentation for the case of a compliant layer on the reel surface and variable tension applied to a buffer tube.

Another case that was compared included a thick compliant layer on the reel surface, and a linearly decaying tension. The material properties for the regular material were taken to be the same as in the simulations discussed previously, and the compliant layer had a modulus of 12.0 MPa, and a Poisson's ratio of 0.09. The first two layers of elements were taken to be the compliant material. The tension was decayed linearly from a starting value of 28.0 N to 11.0 N. FIG. 32B shows the EFL obtained from the model, and the experimentally measured distribution. An initial EFL of 0.65% was chosen for the model calculations. The trend of EFL is predicted quite well in this case, although there is a slight deviation from the measured values. There are several uncertainties in this case that could result in some differences in the measured and predicted EFL values. The properties of the actual compliant layer were not known, and the assumption of it being a linear elastic material may not be sufficient. Also, the tension in the experiment was adjusted manually in a step-wise manner, which may have introduced transients into the system and could have caused a deviation from the linear decay curve assumed.

The comparisons made between the model and the experiments show reasonably good agreement in the trend of the EFL distribution. This allows the model to be used in a predictive capacity to help determine the most favorable conditions for obtaining a uniform EFL distribution. Although there may be some uncertainties in material properties or other process parameters, the model can be used to help bracket a solution. The numerical simulations could be supplemented with carefully controlled experiments to help tune the solution further.

To validate and confirm the analysis performed, and presented above, various experiments were performed. The experiments were directed to determining the influence of a number of factors on EFL, including the influence of time on the reel, use of foam pads, constant and variable take-up tension, and variation in the line speed or angular velocity of the spool on the distribution of EFL in buffer tubes.

One of the first experiments conducted was the influence of the time the buffer tube stands on the reel after manufacture. Analysis of the EFL distribution in three 3-km long buffer tubes was performed. Results are summarized in FIG. 33 and Table I (shown below). The end points of lines 1*, 2*, and 3* were obtained the same day that the tubes were fabricated. Curves 1*–3* show the EFL distribution that was obtained when the tubes were cut and measured ten days later.

Figure 33:
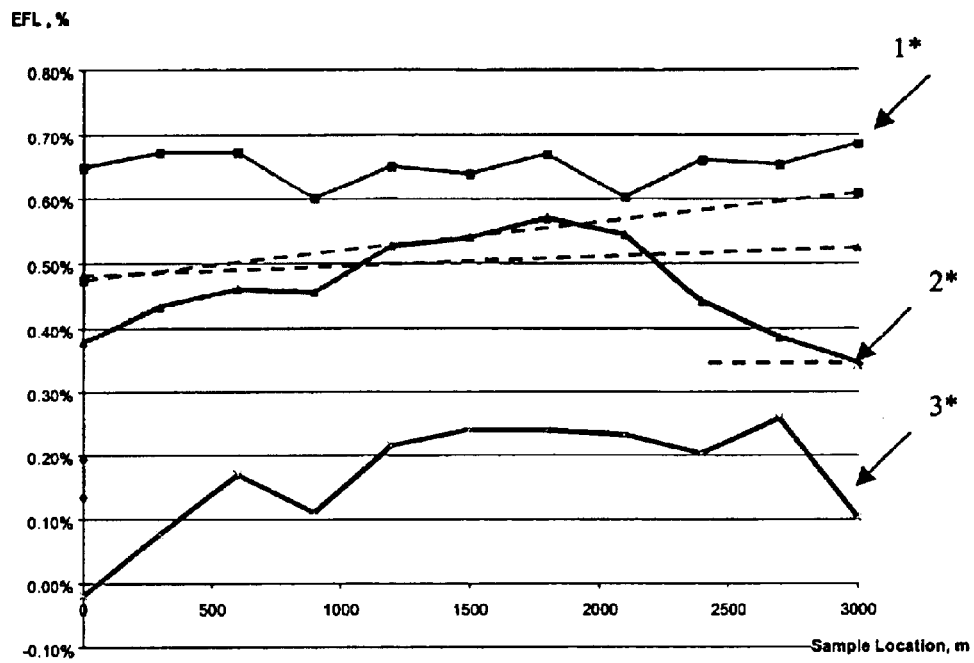
FIG. 33 is a graphical representation of the distribution of EFL in three different buffer tubes.

The curve 1* in FIG. 33 was obtained from a buffer tube that was not reeled on the spool. Instead, the buffer tube was placed in a box where it cooled to the room temperature. Variation of EFL in this case is from 0.60% to 0.69% without a clear "parabolic" distribution typical for reeled buffer tube.

The curve 2* corresponds to the case when the buffer tube was placed in the box for 7 days, then reeled under 1.5 kg tension on the reel, kept on the reel for 3 days, then unwrapped for an EFL measurement. This curve has features of a parabolic shape with 0.38% EFL at the beginning of the buffer tube, up to 0.57% in the middle, and 0.34% on the end of the buffer tube. Curve 2* is located below Curve 1*. The reduction in the levels of EFL is apparently due to the action of the circumferential forces of tension in the reeled buffer tube causing 3-day elongation (creep) of the polymeric material with respect to the fibers.

The parabolic-type curve 3* is located below curves 1* and 2*, apparently due to increased time (10 days) of stretching of the rolled buffer tube by circumferential stresses. The EFL values are ranging from −0.02% EFL at the beginning of the buffer tube, to 0.24% in the middle, and 0.10% on the end of the buffer tube.

Comparison of the curves obtained the same day and 10 days after fabrication of buffer tubes suggested the following. In the reeled tubes EFL reduced while in unreeled tubes EFL increased in time. This can be related to the thermal cooling and shrinkage of thermoplastic materials; in the reeled tubes the shrinkage is restricted by existing circumferential stresses. When the contribution from the stresses is higher than that of residual shrinkage, relative elongation of thermoplastic materials is higher than shrinkage. Consequently, the resulting elongation would result in a reduction of EFL. In contrast, in unreeled buffer tubes, the residual shrinkage is not restrained and final values of EFL increase.

Monotonic reduction in take-up tension should result in a flatter distribution of circumferential stresses in the roll. Consequently, changes in EFL are expected to be within a narrower range as compared to the case of constant take-up tension. In addition, finite element modeling showed that adding a soft foam pad on the core or periodically inserting soft pads into the roll should increase the range of variation of EFL.

Figure 34:
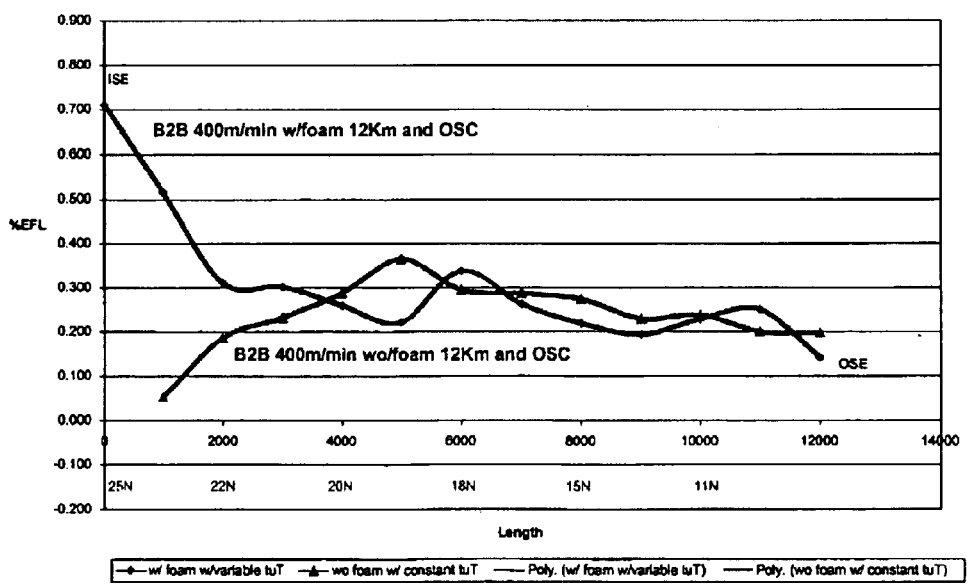
FIG. 34 is a graphical representation of variation of EFL in two buffer tubes, wherein one tube is reeled without a pad on the reel, and at constant take-up tension, and one tube is reeled with a monotonically reduced take-up tension on a reel with a thick soft pad.

Experiments were performed on the 12-km buffer tubes. The first buffer tube was wrapped around a spool at a constant take-up tension. The corresponding EFL curve is shown in FIG. 34. The second buffer tube was reeled on the same spool but with a double-layer of thick foam on the core. Also, in the case of the second buffer tube, the take-up tension was monotonically reduced from 25N to approximately 9N. The corresponding EFL curve is shown in FIG. 34. As can be seen from FIG. 34, the parabolic curve typical for reeled buffer tubes on a bare reel is actually shallower than the curve obtained with a pad and variable take-up tension. Based on these results, it was suggested to further study the possible nonlinear effect of a thinner soft pad on initial values of EFL toward the goal of obtaining a flatter curve.

Figure 35:
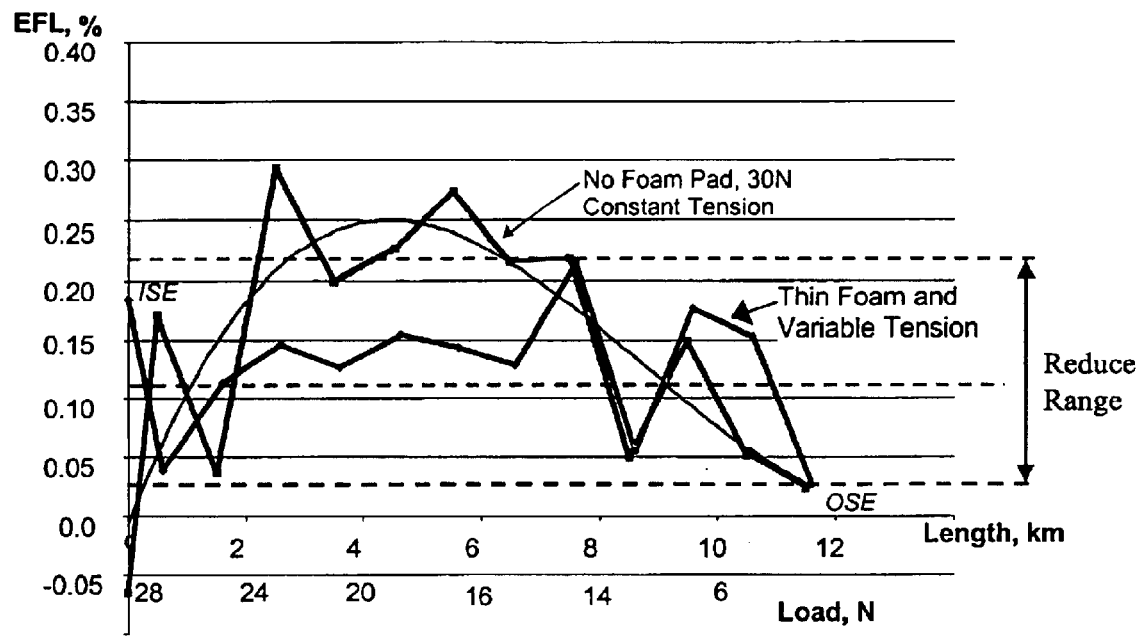
FIG. 35 is a graphical representation of variation of EFL in two buffer tubes, where on tube has a rigid reel core and constant take-up tension, while the other has a thin foam layer on the core and decaying take-up tension.

FIG. 35 illustrates an approach using a thin foam layer on the "regular-rigidity" core and decaying take-up tension to minimize the variation in the EFL values.

Typically, reeling is performed at a constant line speed, i.e. constant angular velocity of the rotating spool. As described previously, a variation in the line speed and the corresponding variation in angular velocity of the reel produces variations along the radius of the buffer tube roll in temperature and possibly tensile load. This resulted in the concept of using a monotonically variable angular velocity of the spool to control the stress state in the buffer tubes and subsequently the EFL.

Figure 36:
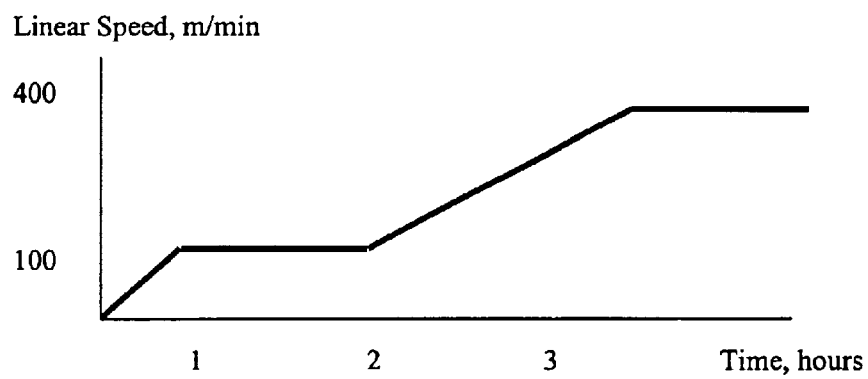
FIG. 36 is a graphical representation of linear speed of a tube as a function of time.

Experiments were focused on a three-step angular velocity process. The first step is an initial stage of the reeling process when angular velocity is increased from zero to a prescribed value. The second step is ramping or transition in angular velocity from 100 m/min to 400 m/min. The third step is a non-ramping scenario to the end of the reeling process, when the angular velocity is kept constant. These stages of the reeling process are depicted in FIG. 36, where the angular velocity, $\omega$, is related to the linear velocity, v, of the buffer tube and current radius, r, as shown below:

TABLE I

Measured Values of EFL in Three Buffer Tubes.

| Sample | Measurement time (days) | Sample Location (m) | Average EFL in Tube 0 (mm) | Agerage EFL in Tube 1 (mm) | Average EFL in Tube 2 (mm) | Average EFL in Tube 3 (mm) | Average EFL in Tube 0 | Average EFL in Tube 1 | Average EFL in Tube 2 | Average EFL in Tube 3 |
|---|---|---|---|---|---|---|---|---|---|---|
| OSE | 0 | 3000 | | 18.6 | 16.0 | 10.4 | | 0.61% | 0.52% | 0.34% |
| ISE-1 | 0 | 0 | 4.1 | 14.5 | 14.7 | | 0.13% | 0.47% | 0.48% | |
| ISE-2 | 7 | 0 | 5.9 | | | | 0.19% | | | |
| 1 | 10 | 0 | | 19.8 | 11.5 | −0.6 | | 0.65% | 0.38% | −0.02% |
| 2 | 10 | 300 | | 20.5 | 13.2 | 2.3 | | 0.67% | 0.43% | 0.08% |
| 3 | 10 | 600 | | 20.5 | 14.0 | 5.2 | | 0.67% | 0.46% | 0.17% |
| 4 | 10 | 900 | | 18.3 | 13.9 | 3.3 | | 0.60% | 0.46% | 0.11% |
| 5 | 10 | 1200 | | 19.8 | 16.0 | 6.5 | | 0.65% | 0.53% | 0.21% |
| 6 | 10 | 1500 | | 19.5 | 16.4 | 7.3 | | 0.64% | 0.54% | 0.24% |
| 7 | 10 | 1800 | | 20.4 | 17.4 | 7.3 | | 0.67% | 0.57% | 0.24% |
| 8 | 10 | 2100 | | 18.4 | 16.6 | 7.1 | | 0.60% | 0.54% | 0.23% |
| 9 | 10 | 2400 | | 20.1 | 13.4 | 6.2 | | 0.66% | 0.44% | 0.20% |
| 10 | 10 | 2700 | | 19.9 | 11.8 | 7.8 | | 0.65% | 0.39% | 0.26% |
| 11 | 10 | 3000 | | 20.9 | 10.5 | 3.1 | | 0.69% | 0.34% | 0.10% |

Figure 37:
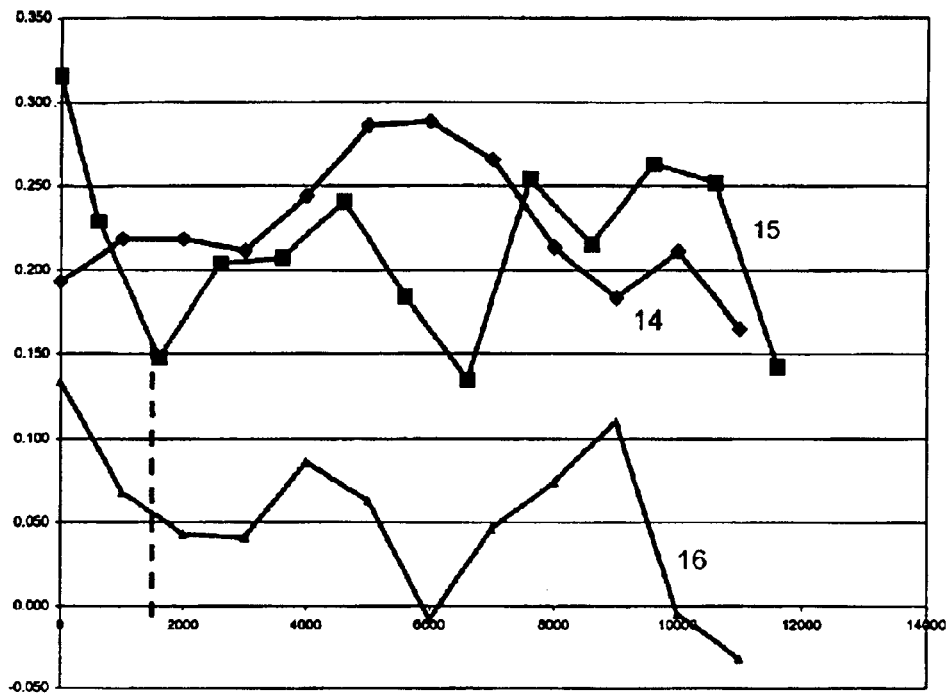
FIG. 37 is a graphical representation of three different EFL distributions as a function of length of the buffer tube and variations in angular speeds.

Results of several experiments (Exp. 14, Exp. 15 and Exp. 16) are summarized in FIG. 37, which shows EFL distribution as a function of length of the buffer tube. In all three cases shown, a thin soft pad on the reel core and decaying take-up tension were used. These results suggested the influence of the variable angular velocity on the EFL curves. Curve 14 is obtained at a relatively high constant linear speed of 400 m/min. As previously discussed, a high level of line speed reduces cooling time for the buffer tubes and reduces the time-to-stretch (creep, reduction in the Young's modulus), and consequently, produces relatively high levels of EFL.

Also, a transition from lower to higher line speed increases the cooling time for the initial part of buffer tubes, increases the time-to-stretch (creep, reduction in the Young's modulus), and consequently, reduces levels of EFL at the beginning of the buffer tube. Further, a dynamic transition from lower to higher speed adds inertia forces of tension and thus increases stretching of thermoplastic material and reduces EFL in the initial part of buffer tube length. Curve 15 is obtained via ramping when the linear velocity was monotonically increased (as a linear function) from an initial value of 100 m/min to 400 m/min, and achieved its maximum of 400 m/min when the tube length was about 1.5 km (dashed line in FIG. 37).

Constant lower line speed uniformly increases the cooling time, increases the time-to-stretch, and consequently, uniformly reduces levels of EFL. Curve 16 is obtained at a constant line speed of 100 m/min.

To further analyze one embodiment of the present invention, further analysis using thin foam pads on reels and monotonically decaying the take-up tension was investigated. For this purpose, a system based on a bucket of water and a valve was built and successfully used. It was found that this system provided results with good repeatability. The valve was used to accelerate water release to provide a parabolic decay in the tension. Friction of the bucket against a pole additionally provided a favorable reduction in the vibration of the load and presumably, smoother EFL curves.

Figure 39:
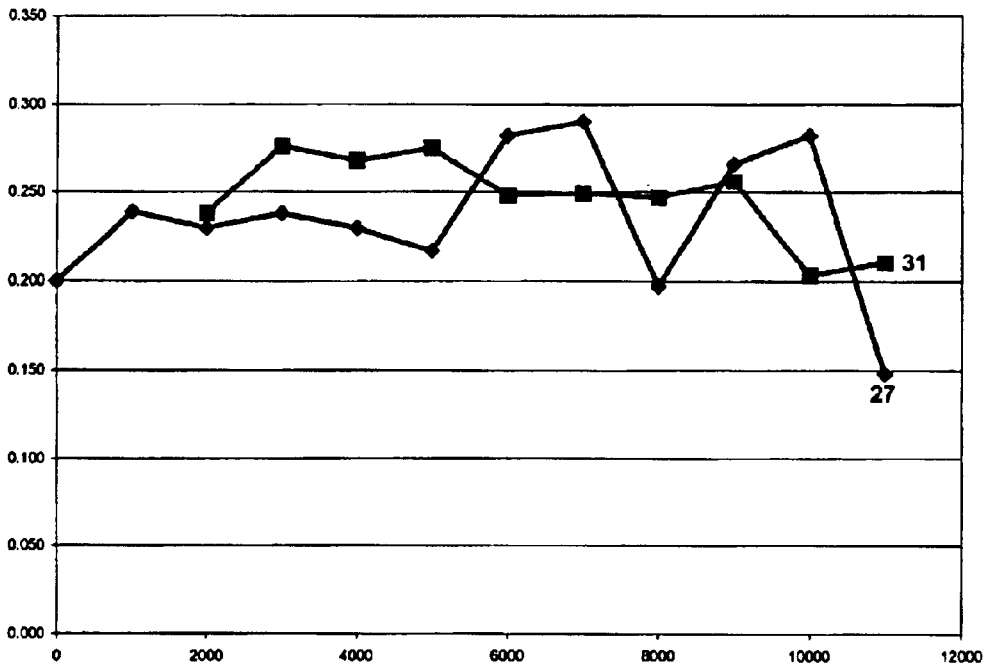
FIG. 39 is a graphical representation of EFL in two buffer tube samples after loading with a parabolically decaying take-up load.
Figure 38:
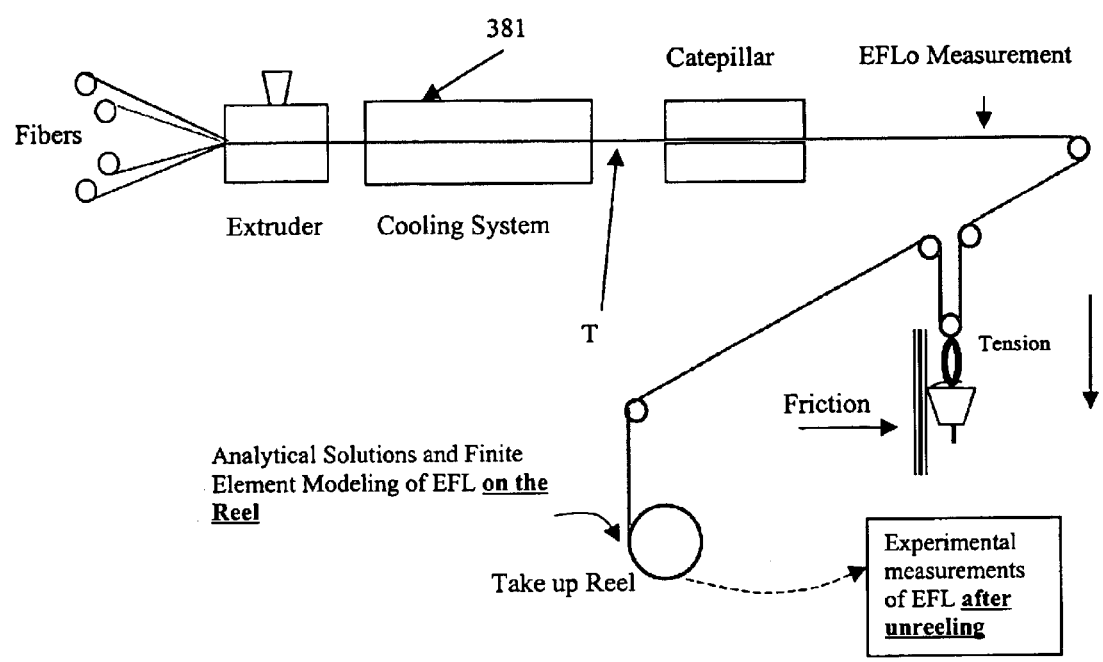
FIG. 38 is a diagrammatical representation of a buffer tube manufacturing system according to one embodiment of the present invention.

FIG. 38 shows a modified line according to the present invention that employed a bucket of water to control take-up tension in the form of a parabolically decaying function. FIG. 39 depicts the EFL curves for two experiments using the tension control. The case corresponding to curve Exp. 27 was performed with the following sequence of take-up load: start with 30N, after the first 4000 m the load is 27N, after 8500 m the load is 20N, then it decreases monotonically down to 12N. One thin layer of foam was wrapped around a regular steel core, and the line speed was kept constant at 400 m/min. Curve Exp. 31 represents another scenario: one thin layer of foam wrapped around a regular steel core, with an initial line speed of 350 m/min, and a take-up tension of 30 N. After 9 km of buffer tube was made, the flow rate of water was increased.

The main result of the experiments involving a bucket of water with a valve is controllability of the EFL using soft foam pads and decaying take-up tension. Based on the experiments, it is recommended that a pneumatic-controlled system for more accurate computer-controlled take-up tension is to be used to obtain a constant-value EFL, although any system capable of provide the control needed can be used.

In reviewing the above analysis and experimentation a number of embodiments of the present invention are contemplated, where various aspects of the buffer tube manufacturing process are used individually, or in combination, to achieve a buffer tube or cable having a substantially even EFL distribution along its length.

In a first embodiment of the present invention, the take-up tension of the buffer tube is monotonically decayed as the tube is wound on the reel. The exact function used to decay the tension would be governed by the individual characteristics of the manufacturing system to be used, but is to be optimized by taking into account all of the factors previously discussed, including, line speed, reel core diameter, material properties, etc. Although it is preferred that a monotonically decaying function be used, it is contemplated that other functions may also be used to decay the tensile load on the tube during manufacture, without expanding the scope or spirit of the present invention. Further, although one of the main purposes of the present invention is to create uniform EFL distribution throughout the length of a buffer tube, it is contemplated that the present invention can be used to create a controlled non-uniform EFL distribution throughout the length of the cable, where such a non-uniform distribution is desired.

In the preferred embodiment, the decaying tension is to be supplied by a pneumatic-controlled system for more accurate computer-controlled take-up tension and to obtain a constant-value EFL. However, any known or commonly used system that can provide the same control can be used, such as mechanical or hydraulic, which is capable or providing a functionally changing tensile force to the buffer tubes, as they are being wound.

Further, in this embodiment it is preferred that the reel core be covered with a stiffness-compliant pad or sleeve, such as a thin packaging foam pad, as previously discussed, to provide stress relief in the initial layers of the buffer tubes located near the reel core surface (as the windings of the tube closer to the reel core surface have a high increase in EFL). In the preferred embodiment, the thickness, porosity and Young's modulus of the pad is selected to provide the desired stress absorption in the inner layers and provide a substantially uniform EFL distribution in the tube. As with the decay function used, the pad used will be governed by the particular characteristics and design parameters of the manufacturing process.

In a second embodiment of the present invention, the angular velocity of the rotating take-up reel is varied in accordance with a monotonical function (similar to that in the first embodiment with regard to the draw tension) to provide a substantially uniform EFL distribution along the length of the tube. As with the first embodiment, the exact function used to decay the angular velocity would be governed by the individual characteristics of the manufacturing system to be used, but is to be optimized by taking into account all of the factors previously discussed, including, line tension, reel core diameter, material properties, etc. Although it is preferred that a monotonical function be used, it is contemplated that other functions may also be used to vary the reel angular velocity during manufacture, without expanding the scope or spirit of the present invention. Further, although one of the main purposes of the present invention is to create uniform EFL distribution throughout the length of a buffer tube, it is contemplated that the present invention can be used to create a controlled non-uniform EFL distribution throughout the length of the cable, where such a non-uniform distribution is desired.

It should be noted that unlike in the first embodiment, to achieve a substantially uniform EFL using the second embodiment of the present invention the function used should increase the angular speed over time through ramping (unlike the first embodiment which decreased the tension over time).

In the preferred embodiment, the angular speed variation can be provided by any known or commonly used system that can provide adequate control of the required speed variations to ensure the function chosen to control the speed is followed as accurately as possible. Existing cable manufacturing devices can be modified to change the speed of the buffer tube and reeling system to adjust the angular velocity of the take-up reel.

Further, in this embodiment it is preferred that the reel core be covered with a stiffness-compliant pad or sleeve, such as a thin packaging foam pad, as previously discussed, to provide stress relief in the initial layers of the buffer tubes located near the reel core surface (although as with the first embodiment the use of the pad is not necessary). As with the function used, the pad used will be governed by the particular characteristics and design parameters of the manufacturing process.

It should be noted that it is contemplated that a combination of the above two embodiments (use of monotonically decreased tension with variations of the reel angular speed) can be used to achieve a substantially uniform EFL distribution.

Figure 40:
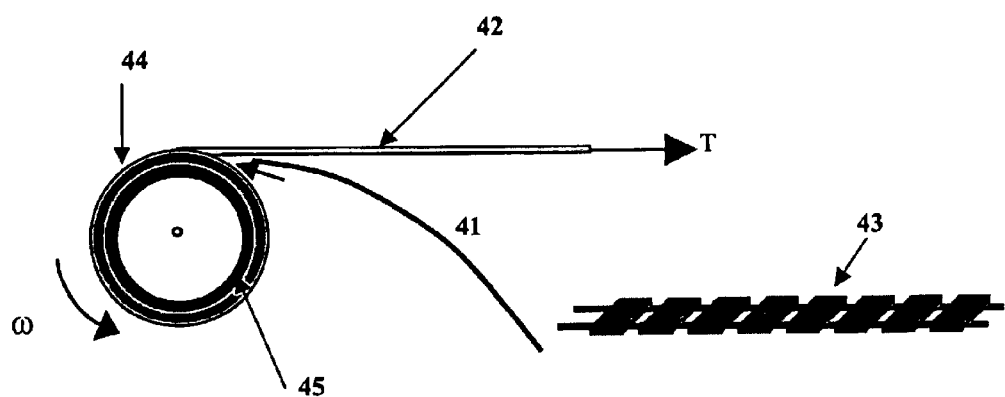
FIG. 40 is a diagrammatical representation of a pad or stiffness member being inserted into a buffer tube winding according to one embodiment of the present invention.

In a third embodiment of the present invention, soft-cushion pads are inserted periodically with the tubes during the reeling process. This is depicted in FIG. 40 where a pad 41 is periodically inserted in the winding of the tube 42. It is preferred that the pad 41 be the width of the spool 44 and a length equal to the spool circumference at the point of insertion. It is also preferred that the pad be of a material, such as foam sheets, which would accommodate shrinkage in the tube as it cools on the reel 44. It should be noted that as an alternative to using periodically inserted pads 41, it is contemplated that a continuous pad be fed with the buffer tube 42 onto the reel 44 so that a cushioning layer is provided continuously throughout the reeled buffer tube 42. It is further contemplated that a core pad 45, as previously described above, can also be used in this embodiment.

The use of the periodic insertion of pads 41 according to the present embodiment provides space to accommodate shrinkage in the layers of tube 42, so the wraps of the tube 42 are allowed to move in the radial direction and slide toward the center of the spool under the residual loads. The pads 42 act as energy absorbing elements and deform during the cooling of the tube 42 when additional stresses from the tube contraction (during cooling) are experienced. Further, the pads 42 act as spacers to reduce cumulative changes in stresses in very long buffer tube manufacturing. Instead of a long single tube (which was shown previously as having adverse effects on EFL distributions) the pads effectively create a set of smaller reeled windings separated by the cushions or pads 41.

The pads 41 to be used are to have a thickness, porosity and Young's modulus optimized for the particular manufacturing system and specifications and should be optimized to produce a substantially uniform EFL distribution throughout the length of the tube 42. It should be noted that although it is preferred that the pads 41 be of a softer material (having a Young's modulus less than that the of the tube 42) to allow distortion under the loads on the reel, it is also contemplated that a series of stiff panels or planks 43 can be periodically inserted into the tube 42 winding. The panels inserted into the windings are as wide as the spool or reel such that the panels 43 rest on shelves (not shown) on the inner surfaces of the edges of the spools 44. It is preferred that, these layers or planks 43 are pre-curved to avoid point contacts with the tubes and should be made of a material with a Young's modulus higher than that of the buffer tube 42 (unlike the pads 41). The panels 43 act as a shelf separating various groupings of windings of the tube 42 thus avoiding the effects of the compounding stresses of a single wound tube (previously shown and discussed).

In this embodiment, it is also preferred to re-reel the tube 42 onto a different reel after the tube 42 manufacture is complete, and it is allowed to cool to room temperature. It is preferred that the pads 41 be removed during this step to achieve optimum winding of the tubes 42 as they are re-wound on a second reel (not shown).

It is noted that it is contemplated that the above embodiment may be combined with either of the previously discussed embodiments to provide a substantially uniform EFL distribution, or an EFL distribution according to desired specifications. Further, it is contemplated that any of the aspects of the above embodiments may be combined in part or totally to achieve the desired EFL distributions.

Finally, it is noted that to obtain a substantially even EFL distribution other parameters can be optimized, such as increasing the diameter of the reel core to a relatively large starting size reducing the overall length of the manufactured cable to reduce the number of wraps which can create large combined residual loads and more intensive cooling of the tube prior to the spooling of the tube. It is important to note however, that the same dimensions may not be applicable in all cases, and the parameters may need to be adjusted and optimized depending on the materials and tube sizes used.

Figure 41:
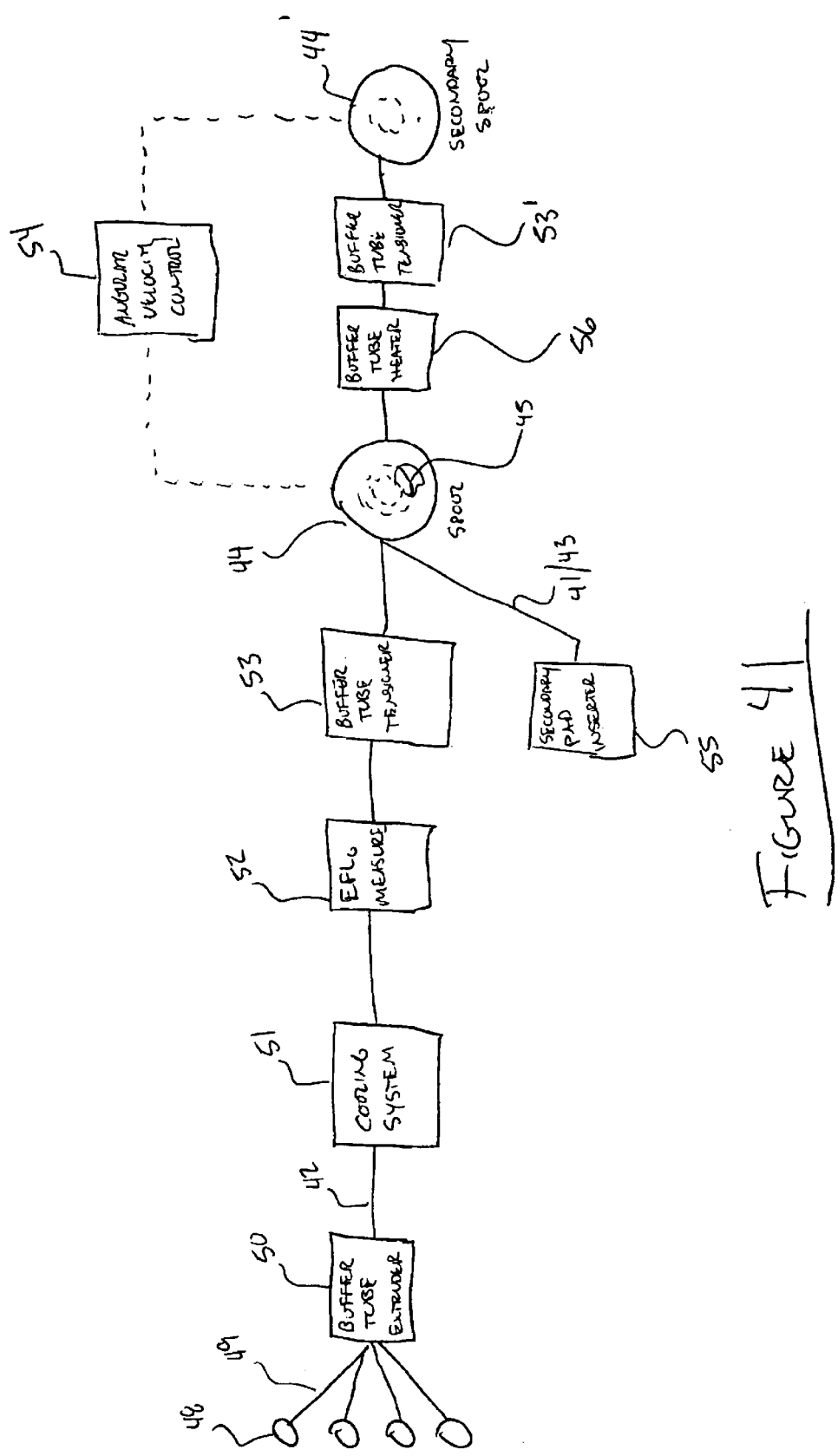
FIG. 41 is a diagrammatical representation of an apparatus to be used to perform the present invention.

FIG. 41 shows a schematic diagram of an apparatus or system that can be used to perform the method of the present invention. In the system shown, the optical fibers 49 are taken off of their respective payoff reels 48 and drawn through an extruder 50 which places the fibers 49 in a buffer tube 42 which is wound. It is noted that the fibers 49 shown can also be fiber optic ribbons or any other material or grouping to be wound. Further, it is noted that any commonly known devices and components can be used to perform these functions. After the buffer tubes 42 are extruded they are passed through an optional cooling device or system 51, which can be any commonly known or used cooling device. After the tube 42 is cooled the EFL of the tube 42 is measured by an EFL measuring device 52 which can be any commercially available EFL measurement device. After the EFL measurement, the tube passes through a buffer tube tensioner 53. The buffer tube tensioner applies a variable, i.e. non-constant tensile load onto the buffer tube according a desired function, such as monotonically decaying or parabolic function. In the preferred embodiment the tensioner is pneumatic and computer controlled so as to accurately control the tensile load on the buffer tube 42. However, the tensioner 53 can also be hydraulic or mechanical, as long as it is capable of functionally changing the tensile load on the buffer tube 42 in accordance with a desired function. After the tube 42 passes through the tensioner 53 it is wound on a spool 44, having a stiffness compliant pad 45 in accordance with the present invention. The use of the pad 45 is not necessary but is preferred. Further, in a preferred embodiment, a pad inserter 55 places either an additional pad 41 or planks 43 onto the spool 44 with the buffer tube 42 to aid in reducing the EFL. The inserter 55 can be any commonly known or used payout device used to place a material onto a wound spool and can be positioned at any reasonable position regarding the location of the spool 44. The angular velocity of the spool 44 is controlled by an angular velocity controller 54. The controller 54 is capable of controlling the angular velocity of the spool 44 in accordance with a desired or programmed function to optimize the operation of the system. Finally, in a preferred embodiment of the present invention, a second spool 44' is positioned near the primary spool 44 to allow the buffer tube 42 to be re-wound onto the second spool 44'. The second spool 44' can be either controlled by the same angular velocity control 54 (as shown in FIG. 41) or can be controlled by its own independent control (not shown). Further, the pad 41 or planks 43 can either be removed between the first spool 44 and second spool 44' or can be re-wound with the buffer tube 42 depending on the manufacture requirements or specifications of the system. It should also be noted that the second spool 44' can have a buffer pad (not shown) on its core to aid in controlling the EFL of the buffer tube 42.

Further, it should be noted that experiments have shown that heated thermoplastic tubes can be easily and permanently stretched after the tubes are heated. This can be done by using any existing heating techniques including heat radiation from a tubular heater 56 placed between the first 44 and second 44' spools. This procedure would be used in a situation where after the initial spooling of the buffer tubes is completed, and an EFL measurement is made on the spooled tubes, it is found that the EFL of the tube is still not at an acceptably high level or having large EFL variation along the tube length. Instead of scrapping the spooled buffer tubes they can be "re-spooled" onto a second spool 44' while a heater 56 (placed between the spools) heats the buffer tube 42 to allow it to stretch to correct the EFL error that existed in the tube after the first spooling. During the re-spooling and heating of the buffer tubes, the tubes can have an tensile load applied to them in accordance with a method described previously, where for example a second monotonically decaying function is used and applied as the buffer tube is being re-spooled through a second buffer tube tensioner 53'. The function used may be the same or different than that used for the first spooling of the buffer tube and the same or different methodology may be applied in the re-spooling process. For example, the tension on the tube may be monotonically decayed during the initial spooling of the buffer tube 42, and during the re-spooling of the buffer tube (if necessary) the angular velocity of the second spool may be functionally changed (instead of the tension applied) to correct any existing EFL error depending on the amount and type of correction needed. It should be noted that the present invention is not limited to the above example, and any combination of the previously discussed methods may be used to correct the tube EFL during the second spooling stage.

These additional features of the present invention are optional and may not be needed in all circumstances, depending on the manufacturing and production needs and characteristics. The heater 56 and secondary tensioner 53' are optional and are not required. Additionally, a single angular velocity controller 54 may be used to control both spools 44, 44', or individual controls may be used if such a configuration is more feasible. Additionally, it may be beneficial to use a stiffness compliant pad 45 on both the first 44 and secondary 44' spool depending on the methodology used to correct any error in buffer tube EFL.

Further, it is also known from experiments, that multiple re-spooling even under constant tension and ambient temperature often improve optical performance of the cables and buffered fibers presumably due to reduction in the micro-stress and micro-adjustment of the fiber position. Therefore, the present invention is not limited to only a first re-spooling of the tubes, but may be used with a multiple re-spooling where some of the disclosed methods of correcting EFL (discussed previously) may or may not be used.

It is of course understood that departures can be made from the preferred embodiments of the invention by those of ordinary skill in the art without departing from the spirit and scope of the invention that is limited only by the following claims.

It is further understood that the present invention is not limited to the manufacture of fiber optic buffer tubes, but can be applied to any other industry or application where long lengths of material is wound on spools or reels and it is desired to control, or reduce the adverse effects of, residual stresses and strains in the rolled or wound materials.

We claim:

1. A method for winding a material onto a spool comprising:
   placing a buffer pad on an outer surface of a core of said spool, wherein said buffer pad has a Young's modulus lower than that of said material;
   winding said material onto said buffer pad while applying a draw tension to said material; and
   functionally changing said draw tension as said material is wound onto said spool and said buffer pad.

2. The method as claimed in claim 1, wherein said changing occurs according to a monotonical function which monotonically varies said draw tension during said winding.

3. The method as claimed in claim 2, wherein said monotonical function monotonically decays said draw tension during said winding.

4. The method as claimed in claim 1, further comprising varying an angular speed of said spool while said material is winding onto said spool.

5. The method as claimed in claim 4, wherein said angular speed is increased while said material is winding onto said spool.

6. The method as claimed in claim 4, wherein said angular speed is varied according to a monotonical function.

7. The method as claimed in claim 1, further comprising winding a pad between successive layers of said material.

8. The method as claimed in claim 7, wherein said pad has a Young's modulus less than that of said material.

9. The method as claimed in claim 7, wherein said pad is continuously wound with said material.

10. The method as claimed in claim 7, further comprising:
    completing said winding of said material onto said spool; and
    winding said material onto a second spool while removing said pad from said winding.

11. A method for winding a material onto a spool comprising:
    placing a buffer pad on said spool prior to winding said material, wherein said buffer pad has a Young's modulus less than that of said material;
    winding said material onto a spool while applying a draw tension to said material; and
    functionally changing an angular velocity of said spool as said material is wound onto said spool.

12. The method as claimed in claim 11, wherein said changing occurs according to a monotonical function which monotonically varies said angular velocity during said winding.

13. The method as claimed in claim 12, wherein said monotonical function monotonically increases said angular velocity during said winding.

14. The method as claimed in claim 11, further comprising varying said draw tension while said material is winding onto said spool.

15. The method as claimed in claim 14, wherein said draw tension is decreased while said material is winding onto said spool.

16. The method as claimed in claim 14, wherein said draw tension is varied according to a monotonical function.

17. The method as claimed in claim 11, further comprising winding a pad between successive layers of said material.

18. The method as claimed in claim 17 wherein said pad has a Young's modulus less than that of said material.

19. The method as claimed in claim 17, wherein said pad is continuously wound with said material.

20. The method as claimed in claim 17, further comprising:
   completing said winding of said material onto said spool; and
   winding said material onto a second spool while removing said pad from said winding.

21. A method of winding a material on a spool comprising:
   winding said material onto a first spool while inserting a pad between successive layers of said material and providing a draw tension on said material; and
   winding said material onto a second spool from said first spool while removing said pad from said windings of said material.

22. The method as claimed in claim 21, further comprising placing a buffer pad on said first spool prior to winding said material.

23. The method as claimed in claim 22, wherein said buffer pad has a Young's modulus less than that of said material.

24. The method as claimed in claim 21, wherein said pad has a Young's modulus less than that of said material.

25. The method as claimed in claim 21, further comprising varying said draw tension while said material is winding onto said first spool.

26. The method as claimed in claim 25, wherein said draw tension is decreased while said material is winding onto said first spool.

27. The method as claimed in claim 25, wherein said draw tension is varied according to a monotonical function.

28. The method as claimed in claim 21, further comprising varying an angular speed of said first spool while said material is winding onto said first spool.

29. The method as claimed in claim 28, wherein said angular speed is increased while said material is winding onto said first spool.

30. The method as claimed in claim 28, wherein said angular speed is varied according to a monotonical function.

31. A method for winding a buffer tube having at least one optical fiber therein onto a spool comprising:
   placing a buffer pad on an outer surface of a core of said spool, wherein the Young's modulus of said buffer pad is lower than the Young's modulus of said buffer tube;
   winding said buffer tube onto said buffer pad while applying a draw tension to said buffer tube; and
   functionally changing said drawing tension as said buffer tube is wound onto said spool and said buffer pad.

32. The method as claimed in claim 31, wherein said changing occurs according to a monotonical function which monotonically varies said draw tension during said winding.

33. The method as claimed in claim 32, wherein said monotonical function monotonically decays said draw tension during said winding.

34. The method as claimed in claim 31, wherein a diameter of said spool at a point where said buffer tube is winding on said spool is larger than 100 mm.

35. The method as claimed in claim 31, wherein a length of said buffer tube is less than 10 km.

36. The method as claimed in claim 31, further comprising varying an angular speed of said spool while said buffer tube is winding onto said spool.

37. The method as claimed in claim 36, wherein said angular speed is increased while said buffer tube is winding onto said spool.

38. The method as claimed in claim 36, wherein said angular speed is varied according to a monotonical function.

39. The method as claimed in claim 31, further comprising winding a pad between successive layers of said buffer tube.

40. The method as claimed in claim 39 wherein said pad has a Young's modulus less than that of said buffer tube.

41. The method as claimed in claim 39, wherein said pad is continuously wound with said buffer tube.

42. The method as claimed in claim 39, further comprising:
   completing said winding of said buffer tube onto said spool; and
   winding said buffer tube onto a second spool while removing said pad from said winding.

43. A fiber optic buffer tube having at least one optical fiber therein made in accordance with the method claimed in claim 31.

44. A method for winding a buffer tube having at least one optical fiber therein onto a spool comprising:
   placing a buffer pad on said spool prior to winding said buffer tube, wherein said buffer pad has a Young's modulus less than that of said buffer tube;
   winding said buffer tube onto a spool while applying a draw tension to said buffer tube; and
   functionally changing an angular velocity of said spool as said buffer tube is wound onto said spool.

45. The method of as claimed claim 44, wherein said changing occurs according to a monotonical function which monotonically varies said angular velocity during said winding.

46. The method as claimed in claim 45, wherein said monotonical function monotonically increases said angular velocity during said winding.

47. The method as claimed in claim 44, wherein a diameter of said spool at a point where said buffer tube is winding on said spool is larger than 100 mm.

48. The method as claimed in claim 44, wherein a length of said buffer tube is less than 10 km.

49. The method as claimed in claim 44, further comprising varying said draw tension while said buffer tube is winding onto said spool.

50. The method as claimed in claim 49, wherein said draw tension is decreased while said buffer tube is winding onto said spool.

51. The method as claimed in claim 49, wherein said draw tension is varied according to a monotonical function.

52. The method as claimed in claim 44, further comprising winding a pad between successive layers of said buffer tube.

53. The method as claimed in claim 52, wherein said pad has a Young's modulus less than that of said buffer tube.

54. The method as claimed in claim 52, wherein said pad is continuously wound with said buffer tube.

55. The method as claimed in claim 52, further comprising:
   completing said winding of said buffer tube onto said spool; and
   winding said buffer tube onto a second spool while removing said pad from said winding.

56. A fiber optic buffer tube having at least one optical fiber therein made in accordance with the method claimed in claim 44.

57. A method of winding a buffer tube having at least one optical fiber contained therein on a spool comprising:

winding said buffer tube onto a first spool while inserting a pad between successive layers of said buffer tube and providing a draw tension on said buffer tube; and winding said buffer tube onto a second spool from said first spool while removing said pad from said windings of said buffer tube.

58. The method as claimed in claim 57, further comprising placing a buffer pad on said spool prior to winding said buffer tube.

59. The method as claimed in claim 58, wherein said buffer pad has a Young's modulus less than that of said buffer tube.

60. The method as claimed in claim 57, wherein said pad has a Young's modulus less than that of said buffer tube.

61. The method as claimed in claim 57, wherein a diameter of said first spool at a point where said buffer tube is winding on said first spool is larger than 100 mm.

62. The method as claimed in claim 57, wherein a length of said buffer tube is less than 10 km.

63. The method as claimed in claim 57, further comprising varying said draw tension while said buffer tube is winding onto said first spool.

64. The method as claimed in claim 63, wherein said draw tension is varied according to a monotonical function.

65. The method as claimed in claim 63, wherein said draw tension is decreased while said buffer tube is winding onto said spool.

66. The method as claimed in claim 57, further comprising varying an angular speed of said first spool while said buffer tube is winding onto said first spool.

67. The method as claimed in claim 66, wherein said angular speed is increased while said buffer tube is winding onto said first spool.

68. The method as claimed in claim 66, wherein said angular speed is varied according to a monotonical function.

69. A fiber optic buffer tube having at least one optical fiber therein made in accordance with the method claimed in claim 57.

70. A method for winding a fiber optic buffer tube onto a spool, comprising:

placing a buffer pad on an outer surface of a core of said spool;

winding said buffer tube onto said buffer pad while applying a first draw tension to said buffer tube;

functionally changing said first draw tension as said buffer tube is wound onto said spool and said buffer pad;

measuring EEL of said buffer tube and determining an error in said EFL; and re-spooling said buffer tube onto a second spool to correct said EEL error.

71. The method as claimed in claim 70, further comprising heating said buffer tube during said re-spooling.

72. The method as claimed in claim 70, further comprising functionally changing a second draw tension on said buffer tube as said buffer tube is re-spooling to correct said EEL error.

73. The method as claimed in claim 72, wherein functionally changing said second draw tension on said buffer tube as said buffer tube is re-spooling occurs according to a monotonical function which monotonically varies said second draw tension dwing said re-spooling.

74. The method as claimed in claim 72, wherein said functionally changing of said second draw tension uses a different function than that used for functionally changing said first draw tension.

75. The method as claimed in claim 70, further comprising placing a second buffer pad on an outer surface of a core of said second spool prior to said re-spooling.

76. The method as claimed in claim 70, further comprising varying an angular speed of said second spool while said buffer tube is winding onto said second spool.

77. The method as calmed in claim 70, further comprising placing a pad between successive layers of said buffer tube during said re-spooling.

78. A method for winding a buffer tube having at least one optical fiber therein onto a spool comprising:

placing a buffer pad on said spool prior to winding said buffer tube;

winding said buffer tube onto a spool while applying a draw tension to said buffer tube;

functionally changing an angular velocity of said spool as said buffer tube is wound onto said spool;

winding a pad between successive layers of said buffer tube;

completing said winding of said buffer tube onto said spool; and winding said buffer tube onto a second spool while removing said pad from said winding.

* * * * *